US012657209B1

(12) United States Patent (10) Patent No.: US 12,657,209 B1
Seela et al. (45) Date of Patent: Jun. 16, 2026

(54) TECHNIQUES FOR EFFICIENT ASYNCHRONOUS REPLICATION USING TRANSIENT SNAPSHOT POOLS

(71) Applicant: Dell Products L.P., Hopkinton, MA (US)

(72) Inventors: Nagapraveen Veeravenkata Seela, Cary, NC (US); Vamsi K. Vankamamidi, Hopkinton, MA (US); Mayank Ajmera, Cary, NC (US)

(73) Assignee: Dell Products L.P., Hopkinton, MA (US)

( * ) Notice: Subject to any disclaimer, the term of this patent is extended or adjusted under 35 U.S.C. 154(b) by 4 days.

(21) Appl. No.: 19/037,691

(22) Filed: Jan. 27, 2025

(51) Int. Cl.
  *G06F 16/00* (2019.01)
  *G06F 16/27* (2019.01)
(52) U.S. Cl.
  CPC .................................. *G06F 16/273* (2019.01)
(58) Field of Classification Search
  CPC ..................................................... G06F 16/273
  USPC ......................................................... 707/613
  See application file for complete search history.

(56) References Cited

U.S. PATENT DOCUMENTS

2020/0348980 A1* 11/2020 Meiri ..................... G06F 9/5061
2022/0342549 A1* 10/2022 Adams .................... G06F 3/067

OTHER PUBLICATIONS

U.S. Appl. No. 18/401,916, filed Jan. 2, 2024, "Tracking Writes and Snapshot Creation/Deletion in Memory to Improve Asynchronous Replication Performance and Support Lower Recovery Point Objectives (RPOS)".
U.S. Appl. No. 18/361,399, filed Jul. 28, 2023, "Managing Transient Snapshots for Reduced Metadata Writes".

* cited by examiner

*Primary Examiner* — Chelcie L Daye
(74) *Attorney, Agent, or Firm* — BainwoodHuang

(57) ABSTRACT

Techniques can include: receiving a request to enable a low RPO (recovery point objective) replication mode for a volume pair (V1, V2) configured for asynchronous replication; in response to receiving the request, creating a source pool of snapshot objects; taking replication related snapshots of V1, wherein taking each of the plurality of replication related snapshots includes: selecting a snapshot object from the source pool; and finalizing the snapshot object for use, including creating a replica of V1 and associating the replica of V1 with the snapshot object; completing asynchronous replication cycles each denoting a set of data changes to V1; and for each asynchronous replication cycle, copying a set of data changes from a source system to a target system and applying the set of data changes to V2.

19 Claims, 26 Drawing Sheets

Head 704

722 Write "DATA 3" to LUN 2, LBA 30

720 Write "DATA2" to LUN 2, LBA 20

718 Write "DATA1" to LUN1, LBA 0

714 Write "WXYZ" to LUN1, LBA 10

712 Write "EFGH" to LUN1, LBA 5

710 Write "ABCD" to LUN1, LBA 0

Tail 702

700

300

Increasing time order
301

302a    Take/create snap 1(V1), TF

302b    W1 (write LBA A of V1)

302c    W2 (write LBA B of V1)

302d    Take/create snap 2(V1), TF

302e    W3 (write LBA C of V1)

302f    W4 (write LBA D of V1)

302g    Delete snap1 (V1)

302h    Take/create snap 3 (V1), TF

302i    W5 (write LBA E of V1)

302j    Delete snap2 (V1)

400

410

420

Tracking ID=ID1

410a — LBA A (e.g., W1 302b)
410b — LBA B (e.g., W2 302c)

Tracking ID=ID2

420a — LBA C (e.g., W3, 302e)
420b — LBA D (e.g., W4, 302f)

..

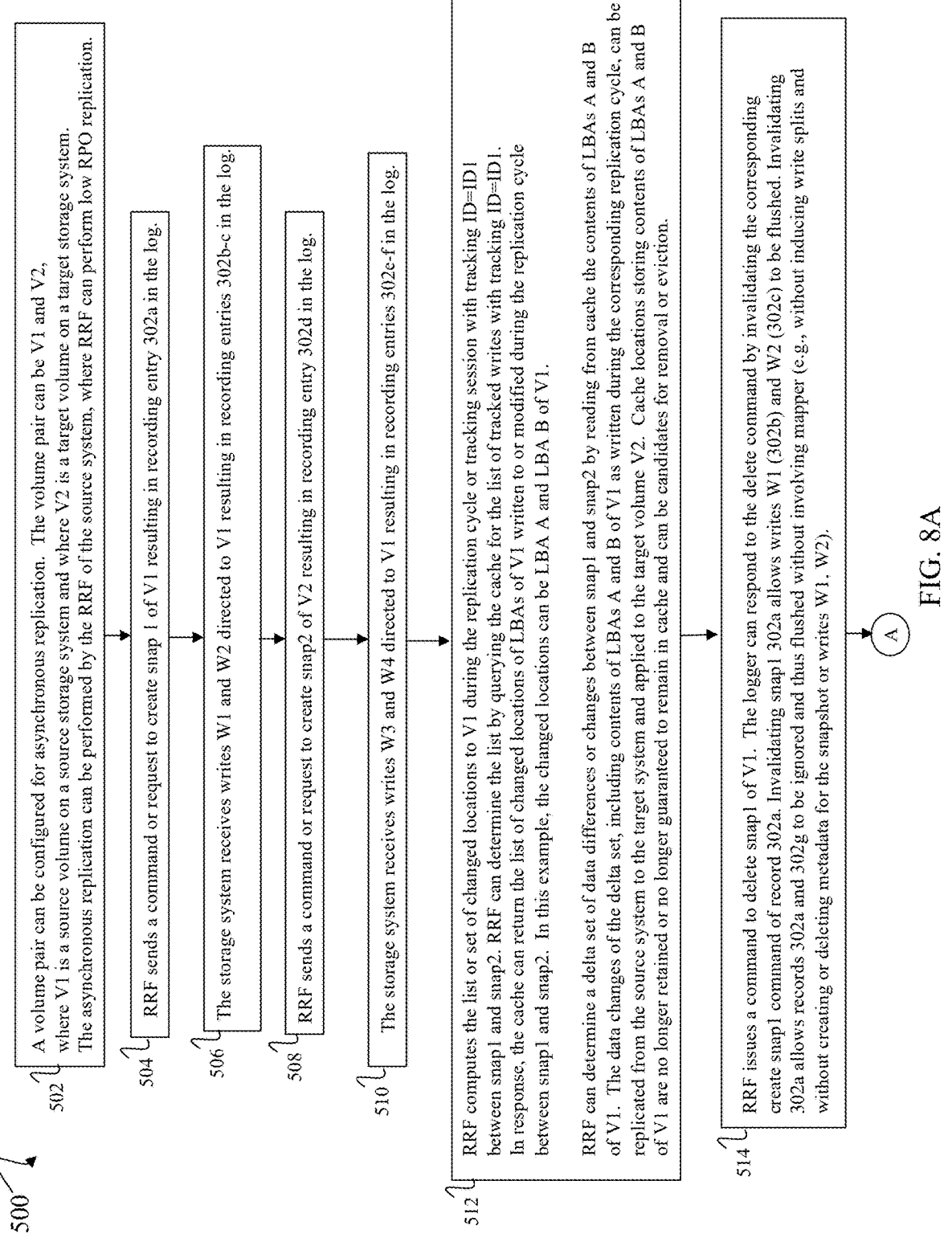

500

502 — A volume pair can be configured for asynchronous replication. The volume pair can be V1 and V2, where V1 is a source volume on a source storage system and where V2 is a target volume on a target storage system. The asynchronous replication can be performed by the RRF of the source system, where RRF can perform low RPO replication.

504 — RRF sends a command or request to create snap 1 of V1 resulting in recording entry 302a in the log.

506 — The storage system receives writes W1 and W2 directed to V1 resulting in recording entries 302b-c in the log.

508 — RRF sends a command or request to create snap2 of V2 resulting in recording entry 302d in the log.

510 — The storage system receives writes W3 and W4 directed to V1 resulting in recording entries 302e-f in the log.

512 — RRF computes the list or set of changed locations to V1 during the replication cycle or tracking session with tracking ID=ID1 between snap1 and snap2. RRF can determine the list by querying the cache for the list of tracked writes with tracking ID=ID1. In response, the cache can return the list of changed locations of LBAs of V1 written to or modified during the replication cycle between snap1 and snap2. In this example, the changed locations can be LBA A and LBA B of V1.

RRF can determine a delta set of data differences or changes between snap1 and snap2 by reading from cache the contents of LBAs A and B of V1. The data changes of the delta set, including contents of LBAs A and B of V1 as written during the corresponding replication cycle, can be replicated from the source system to the target system and applied to the target volume V2. Cache locations storing contents of LBAs A and B of V1 are no longer retained or no longer guaranteed to remain in cache and can be candidates for removal or eviction.

514 — RRF issues a command to delete snap1 of V1. The logger can respond to the delete command by invalidating the corresponding create snap1 command of record 302a. Invalidating snap1 302a allows writes W1 (302b) and W2 (302c) to be flushed. Invalidating 302a allows records 302a and 302g to be ignored and thus flushed without involving mapper (e.g., without inducing write splits and without creating or deleting metadata for the snapshot or writes W1, W2).

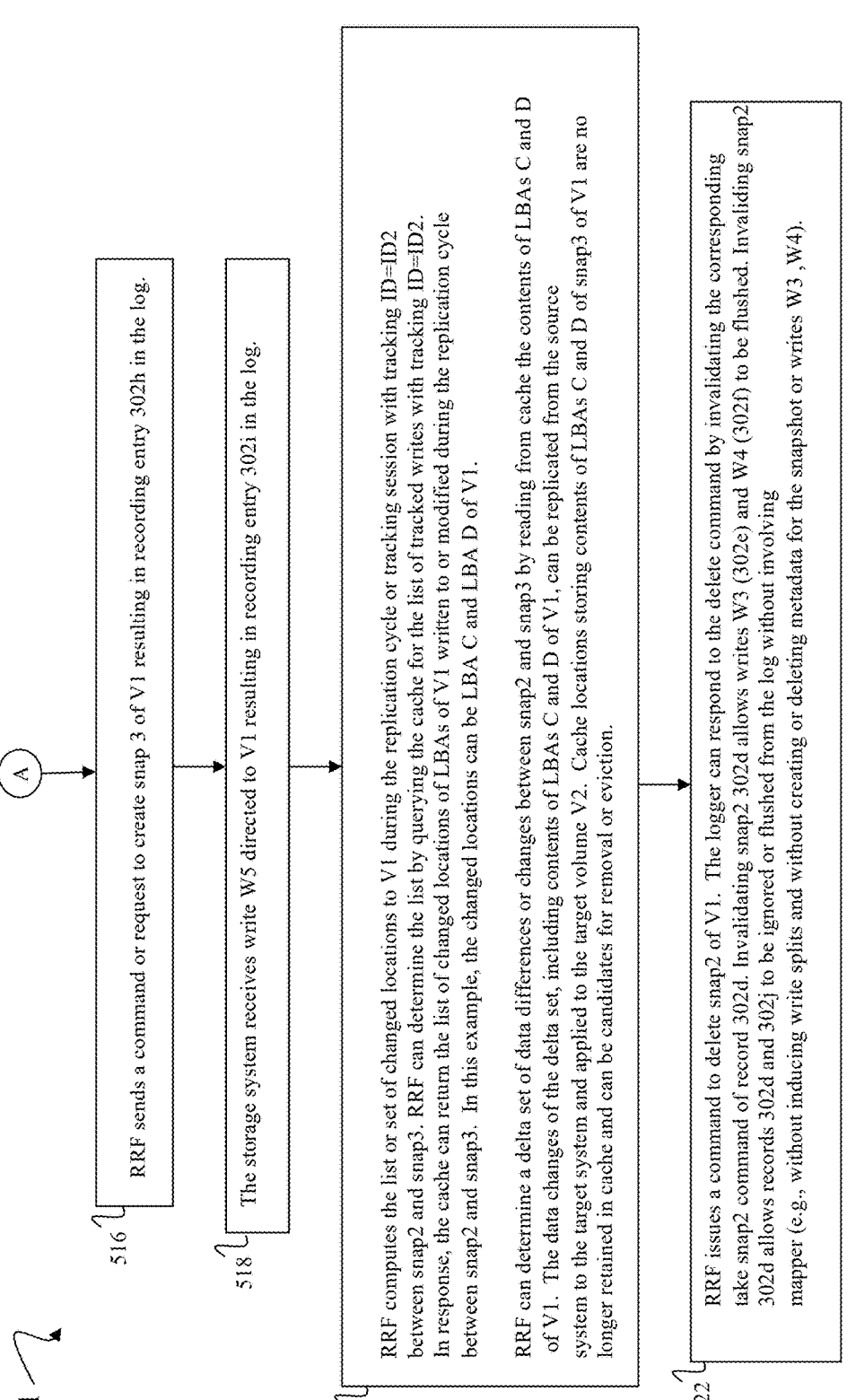

501

A

516   RRF sends a command or request to create snap 3 of V1 resulting in recording entry 302h in the log.

518   The storage system receives write W5 directed to V1 resulting in recording entry 302i in the log.

520   RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3. In this example, the changed locations can be LBA C and LBA D of V1.

RRF can determine a delta set of data differences or changes between snap2 and snap3 by reading from cache the contents of LBAs C and D of V1. The data changes of the delta set, including contents of LBAs C and D of V1, can be replicated from the source system to the target system and applied to the target volume V2. Cache locations storing contents of LBAs C and D of snap3 of V1 are no longer retained in cache and can be candidates for removal or eviction.

522   RRF issues a command to delete snap2 of V1. The logger can respond to the delete command by invalidating the corresponding take snap2 command of record 302d. Invalidating snap2 302d allows writes W3 (302e) and W4 (302f) to be flushed. Invalidating snap2 302d allows records 302d and 302j to be ignored or flushed from the log without involving mapper (e.g., without inducing write splits and without creating or deleting metadata for the snapshot or writes W3, W4).

FIG. 8B

File system logical
Address space 1030

1010

1   ...   100GB

1030a

MD mapping
structure 1008

Data blocks 1020

File system 1002

Storage object
1001

File
1004

Inode 1006

Inode # 1006a

Object type 1006b

Family ID 1006c

Object extent
location 1006d

1000

860

Figure 15A:
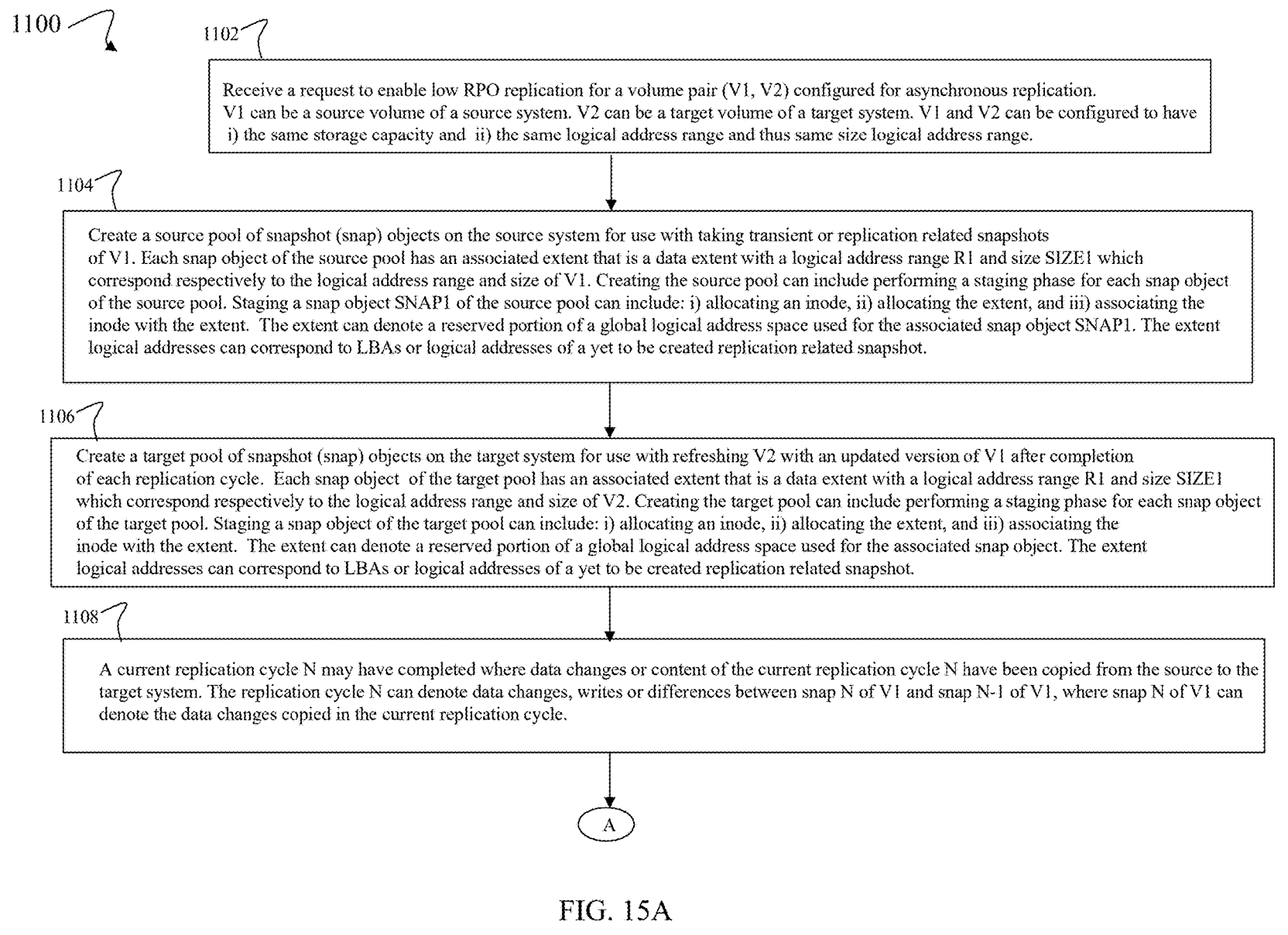

1100

1102

Receive a request to enable low RPO replication for a volume pair (V1, V2) configured for asynchronous replication. V1 can be a source volume of a source system. V2 can be a target volume of a target system. V1 and V2 can be configured to have i) the same storage capacity and ii) the same logical address range and thus same size logical address range.

1104

Create a source pool of snapshot (snap) objects on the source system for use with taking transient or replication related snapshots of V1. Each snap object of the source pool has an associated extent that is a data extent with a logical address range R1 and size SIZE1 which correspond respectively to the logical address range and size of V1. Creating the source pool can include performing a staging phase for each snap object of the source pool. Staging a snap object SNAP1 of the source pool can include: i) allocating an inode, ii) allocating the extent, and iii) associating the inode with the extent. The extent can denote a reserved portion of a global logical address space used for the associated snap object SNAP1. The extent logical addresses can correspond to LBAs or logical addresses of a yet to be created replication related snapshot.

1106

Create a target pool of snapshot (snap) objects on the target system for use with refreshing V2 with an updated version of V1 after completion of each replication cycle. Each snap object of the target pool has an associated extent that is a data extent with a logical address range R1 and size SIZE1 which correspond respectively to the logical address range and size of V2. Creating the target pool can include performing a staging phase for each snap object of the target pool. Staging a snap object of the target pool can include: i) allocating an inode, ii) allocating the extent, and iii) associating the inode with the extent. The extent can denote a reserved portion of a global logical address space used for the associated snap object. The extent logical addresses can correspond to LBAs or logical addresses of a yet to be created replication related snapshot.

1108

A current replication cycle N may have completed where data changes or content of the current replication cycle N have been copied from the source to the target system. The replication cycle N can denote data changes, writes or differences between snap N of V1 and snap N-1 of V1, where snap N of V1 can denote the data changes copied in the current replication cycle.

1101

1110

A

In response to completing replication cycle N, processing can be performed to commence a new next replication cycle N+1

Processing performed on the source system can include preparing the source pool snapshot object SNAP1, denoting snap N-1 of V1, for reuse. Preparing SNAP1 for reuse can include cleaning the extent of SNAP1 including deleting any associated mapping information of MD pages. Once SNAP1 has been prepared for reuse, it can be made available for reuse in connection with replication related snapshots of V1 by setting its state to available.

Processing can be performed to select an available snap object OBJX from the source pool, where OBJX will be used to represent the next replication related snap N+1 of V1. OBJX can be a snap object of the source pool selected for use or reuse for snap N+1 of V1.

Processing can be performed to finalize the snapshot object OBJX for use with the next replication related snapshot N+1 of V1. Finalizing OBJX can include creating a replica or point in time copy of V1 and associating the replica of V1 with OBJX whereby the replica is the snapshot N+1 of V1.

Write tracking can be commenced for the next replication cycle and data changes to be included in the next replication related snapshot N+2 expected to be taken at a later point in time.

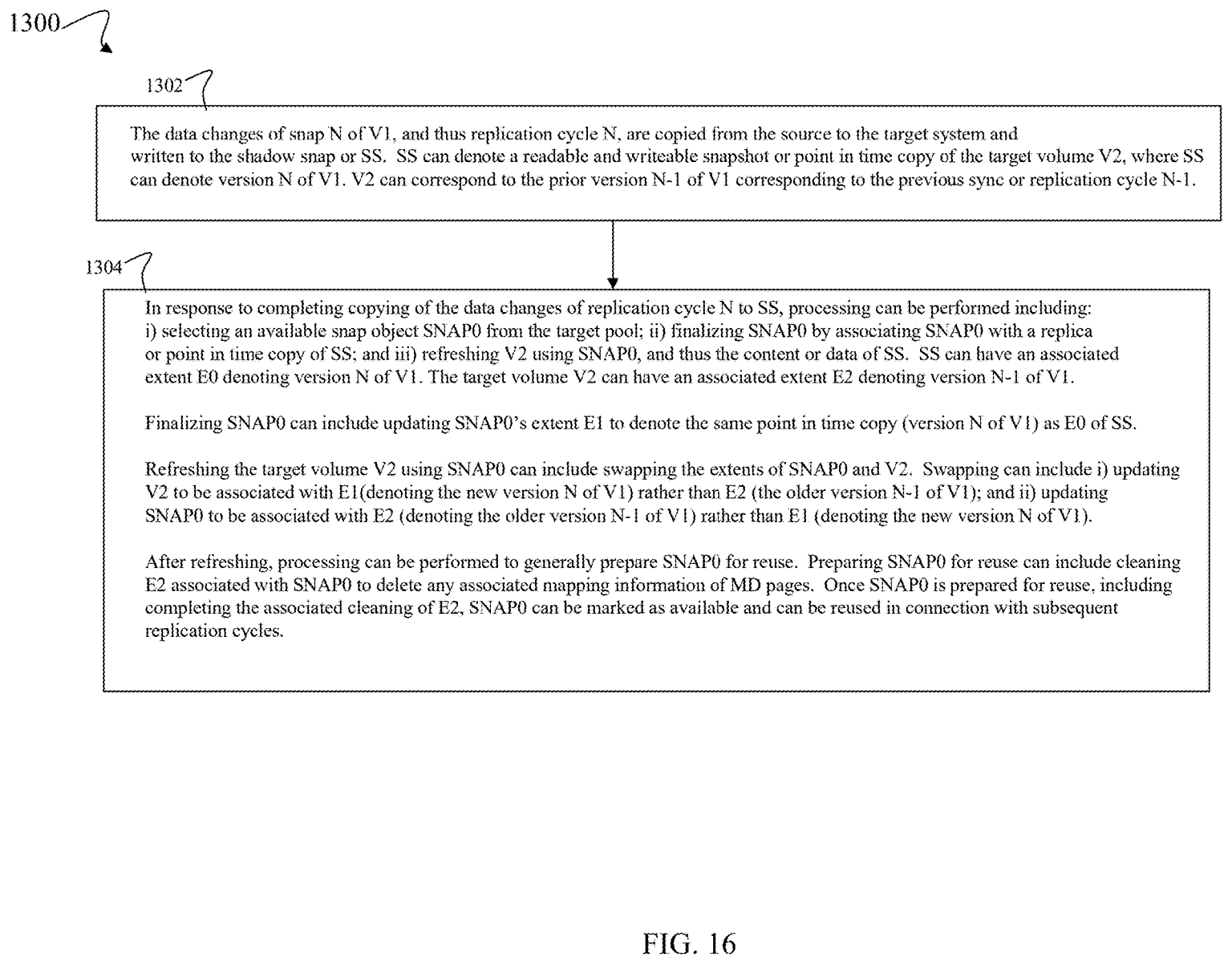

The data changes of snap N of V1, and thus replication cycle N, are copied from the source to the target system and written to the shadow snap or SS. SS can denote a readable and writeable snapshot or point in time copy of the target volume V2, where SS can denote version N of V1. V2 can correspond to the prior version N-1 of V1 corresponding to the previous sync or replication cycle N-1.

1304

In response to completing copying of the data changes of replication cycle N to SS, processing can be performed including:
i) selecting an available snap object SNAP0 from the target pool; ii) finalizing SNAP0 by associating SNAP0 with a replica or point in time copy of SS; and iii) refreshing V2 using SNAP0, and thus the content or data of SS. SS can have an associated extent E0 denoting version N of V1. The target volume V2 can have an associated extent E2 denoting version N-1 of V1.

Finalizing SNAP0 can include updating SNAP0's extent E1 to denote the same point in time copy (version N of V1) as E0 of SS.

Refreshing the target volume V2 using SNAP0 can include swapping the extents of SNAP0 and V2. Swapping can include i) updating V2 to be associated with E1(denoting the new version N of V1) rather than E2 (the older version N-1 of V1); and ii) updating SNAP0 to be associated with E2 (denoting the older version N-1 of V1) rather than E1 (denoting the new version N of V1).

After refreshing, processing can be performed to generally prepare SNAP0 for reuse. Preparing SNAP0 for reuse can include cleaning E2 associated with SNAP0 to delete any associated mapping information of MD pages. Once SNAP0 is prepared for reuse, including completing the associated cleaning of E2, SNAP0 can be marked as available and can be reused in connection with subsequent replication cycles.

FIG. 16

TECHNIQUES FOR EFFICIENT ASYNCHRONOUS REPLICATION USING TRANSIENT SNAPSHOT POOLS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a request to enable a low RPO (recovery point objective) replication mode for a volume pair (V1, V2) configured for asynchronous replication, wherein V1 is a source volume of a source system and V2 is a target volume of a target system; in response to receiving the request, creating a source pool of snapshot objects for use in connection with taking replication related snapshots of V1; taking a plurality of replication related snapshots of V1, wherein for each of the plurality of replication related snapshots, said taking includes: selecting a snapshot object from the source pool; and finalizing the snapshot object for use with said each replication related snapshot, including creating a replica of V1 and associating the replica of V1 with the snapshot object selected from the source pool; completing a plurality of asynchronous replication cycles each denoting a set of data changes to V1 determined with respect to two successive replication related snapshots of V1; and for each of the plurality of asynchronous replication cycles, copying a set of data changes of said each asynchronous replication cycle from the source system to the target system and applying the set of data changes to V2.

In at least one embodiment, selecting the snapshot object from the source pool can include reusing the snapshot object of the source pool wherein the snapshot object was previously used in connection with representing one or more prior replication related snapshots of V1.

In at least one embodiment, completing the plurality of asynchronous replication cycles can include: completing an asynchronous replication cycle N denoting a first set of data changes between snapshot N of V1 and snapshot N–1 of V1, wherein the snapshot N–1 of V1 is represented using a first snapshot object of the source pool; and responsive to said completing the asynchronous replication cycle N, performing first processing to prepare the first snapshot object for reuse in connection with another subsequent replication related snapshot, including cleaning a first extent of the first snapshot object, wherein the first extent corresponds to a first logical address space of the first snapshot object and denotes content of a point in time copy corresponding to the snapshot N–1 of V1, wherein said cleaning the first extent includes deleting any mapping information of metadata (MD) pages which are associated with the first extent and used to map fist logical addresses of the first extent to corresponding first content stored at the first logical addresses.

In at least one embodiment, creating the source pool can include creating the first snapshot object comprising: allocating a first extent; and allocating a first index node (inode) structure that references the first extent, and wherein the first snapshot object is associated with the first inode structure that references the first extent, and wherein said first processing does not deallocate the first extent and does not deallocate the first inode structure so that the first extent and the first inode structure can be reused in connection with representing one or more subsequent replication related snapshots of V1. Processing can include: determining that the first processing to prepare the first snapshot object for reuse has completed; and responsive to said determining that the first processing has completed whereby the first snapshot object is ready for reuse, marking the first snapshot object as available for reuse in connection with representing a subsequent replication related snapshot of V1.

In at least one embodiment, processing can include, in response to receiving the request, creating a target pool of snapshot objects for use on the target system in connection with updating V2 to include the sets of data changes that are i) replicated in the plurality of asynchronous replication cycles from the source system to the target system, and ii) determined using a low RPO replication technique enabled by the low RPO replication mode. For each of the plurality of asynchronous replication cycles, second processing can be performed including writing the set of data changes of said each asynchronous replication cycle to a shadow snapshot on the target system. The plurality of asynchronous replication cycles can include an asynchronous replication cycle N. Processing can include: writing a first set of data changes of the asynchronous replication cycle N to the shadow snapshot, wherein after said writing the first set of data changes, i) the shadow snapshot denotes version N of V1, and ii) V2 denotes version N–1 of V1 corresponding to asynchronous replication cycle N–1; selecting a second snapshot object of the target pool; and finalizing the second snapshot object, including associating the second snapshot object with a replica of the shadow snapshot after performing said writing. Processing can include refreshing V2 using the second snapshot object including updating V2 to denote version N of V1. The shadow snapshot can be associated with a first extent E0 denoting version N of V1, and the second snapshot object can be associated with a second extent E1. Finalizing the second snapshot object can include updating E1 of the second snapshot object using E0 so that E1 denotes version N of V1. Prior to said refreshing, i) V2 can be associated with a third extent E2 denoting version N–1 of V1, and ii) the second snapshot object can be associated with E1 denoting version N of V1.

In at least one embodiment, refreshing can include: associating V2 with E1 rather than E2 so that V2 denotes version N of V1; and associating the second snapshot object with E1 rather than E2 so that the second snapshot object denotes version N–1 of V1. After said refreshing, third processing can be performed to prepare the second snapshot object for reuse in connection with refreshing V2 with another updated version of V1 after completion of another corresponding asynchronous replication cycle. The third processing can include cleaning E1 associated with the second snapshot object, including deleting any mapping information of MD pages associated with the E1. After completing the third processing whereby the second snapshot object is prepared for reuse, the second object can be marked as available for reuse in connection with refreshing V2 with updated version of V1 corresponding to a subsequent asynchronous replication cycle.

In at least one embodiment, the target pool can include a first set of snapshot objects each assigned an integer identifier (ID) denoting an integer from a sequence of consecutive integers. Selecting the second snapshot object from the target pool can include rotating through the second set of snapshot objects in accordance with their respective assigned integer IDs to locate an available snapshot object of the second set. The source pool can include a first set of snapshot objects each assigned an integer identifier (ID) denoting an integer from a sequence of consecutive integers. Selecting the second snapshot object from the source pool can include rotating through the first set of snapshot objects in accordance with their respective assigned integer IDs to locate an available snapshot object of the first set.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 8A, 8B, 15A, 15B and 16 are flowcharts of processing steps that can be performed in at least one embodiment in accordance with the techniques of the present disclosure.

DETAILED DESCRIPTION OF EMBODIMENT(S)

Figure 1:
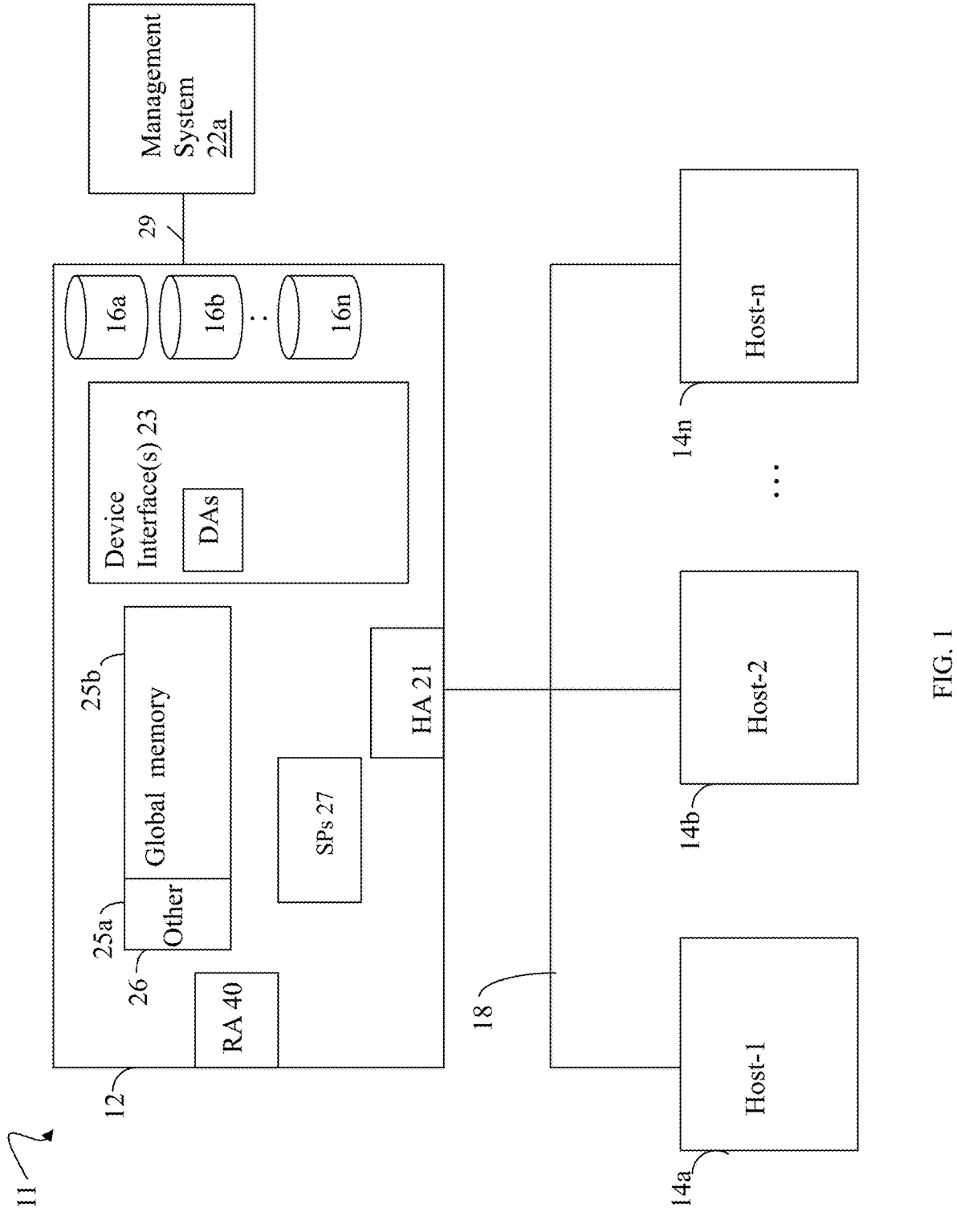
FIG. 1 is an example of components that can be included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote target storage object on the remote target system. The remote storage target object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be automatically replicated to a corresponding remote target storage object on the remote target system.

The source storage system can present data storage resources or objects, such as a volume or logical device, to a client, such as a host. A replication session can be defined for a volume pair including a source volume V1 of the source storage system and a target volume V2 of the target storage system, where the replication session can be further characterized as one-way replication where, as noted above, writes to the source volume V1 are automatically replicated in a continuous ongoing manner to the target volume V2. In at least one embodiment, V1 can be exposed to an external host over paths from the source storage system and V2 may not be exposed to the host such that the host can issue I/Os to V1 over paths to the source storage system but cannot issue I/Os directly to V2 on the target storage system.

One mode or methodology of one-way remote replication can be referred to as asynchronous remote replication (sometimes referred to as asynchronous replication) where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. The RPO can be specified at a time granularity that can range typically, for example, from hours to a number of minutes.

In at least one embodiment, asynchronous replication can capture data changes or differences to be copied from the source storage object or volume, such as V1, to the target storage object or volume, such as V2, in repeated cycles using a snapshot difference technique. A snapshot of a storage object such as a volume or logical device can be defined as a point in time version of the storage object, where the snapshot captures the state of the storage object, such as with respect to the current content of the storage object, when the snapshot is taken. The snapshot difference technique can be utilized where the source system continually takes successive snapshots of the source storage object at a specified defined rate or frequency based on the defined RPO. The snapshots can sometimes be referred to as transient snapshots or replication related snapshots in that they are used only internally in the source system for asynchronous replication purposes. The source system can determine a difference in content between the current snapshot N of the source storage object and the immediately prior snapshot N−1 of the source storage object, where the data changes replicated to the target system correspond to the difference in content between the snapshots N and N−1 of the source storage object. Thus, the difference in content between each pair of successive snapshots can denote the set of data changes or writes that is replicated from the snapshot N of the source object to the target storage object of the target system. Generally, as the RPO gets smaller, the frequency or rate at which snapshots are taken and differences determined using the snapshot difference technique increases. In at least one version of the snapshot difference technique (sometimes referred to as the legacy version), resource intensive processing can be performed that includes creating the two successive snapshots N−1 and N, and then subsequently deleting the two snapshots in a very short time period solely for the purposes of replication. Thus, for very small RPOs that can be desired, taking replication related snapshots at a high rate or frequency and repeatedly using the snapshot difference technique to determine each set or cycle of data changes replicated can be inefficient and have an adverse effects including excessive overhead costs.

It can be desirable to support specifying an even smaller time granularity for an RPO such as less than a minute or a number of seconds. It can further be desirable to provide for efficient asynchronous replication resulting in a low RPO that is a number of seconds or generally less than a minute.

Accordingly, a more efficient asynchronous replication technique or mode sometimes referred to as a low RPO replication technique or a near-zero (NZ) replication technique can be used in at least one embodiment in accordance with the techniques of the present disclosure. Additionally in at least one embodiment, the low RPO or NZ replication technique or mode can perform various optimizations that provide for efficient asynchronous replication of a configured volume pair including a corresponding source storage object or volume of a source system and a corresponding target storage object or volume of a target system.

In at least one embodiment in accordance with the techniques of the present disclosure, the low RPO or NZ replication technique can be supported and performed along with a second asynchronous replication technique. In at least one embodiment, the low RPO replication technique can perform multiple optimizations as discussed herein, and the second alternative asynchronous replication technique can be a legacy snapshot difference or snap diff technique that generally does not perform the optimizations as performed by the low RPO replication technique. For example in at least one embodiment, the low RPO replication technique can perform an optimization that uses cache for tracking writes made to a configured volume between consecutive replication-related snapshots taken of the volume for determining the data difference to be copied or migrated from the source to the target. In contrast in at least one embodiment, the second asynchronous replication technique may not perform the foregoing optimization and can rather perform a snapshot difference operation of two successive replication-related snapshots to determine the data differences copied from the source to the target in a replication cycle.

In at least one embodiment, the low RPO replication technique or mode described herein provides for asynchronous replication that results in a near zero RPO or more generally a low RPO. For a configured replication session of a volume pair that perform asynchronous replication using the low RPO replication technique, multiple optimizations can be performed in connection with asynchronous replication that provide for achieving the very low RPO with the low RPO replication technique. One of the optimizations provides for tracking writes and keeping a record in cache of such writes made to a volume between successive snapshots. In at least one embodiment, the low RPO replication technique can also perform additional optimizations all of which can be dependent on the write tracking being performed where such the particular addresses or locations of the writes made to the volume between successive replication-related snapshots are tracked in cache.

In at least one embodiment, an asynchronous replication session operating using the low RPO replication technique can provide for efficient asynchronous replication for a volume pair that results in a very small RPO that is on the scale of a number of seconds or generally less than a minute. For example in at least one embodiment, the RPO can be less than 30 seconds and, as noted above, can sometimes be referred to herein as "near zero" or low RPO replication using a "near zero" RPO due to the very small RPO. With near zero (NZ) or low RPO replication in at least one embodiment, snapshots can be taken in a continuous ongoing manner such that when the data changes of a current replication cycle have been replicated or copied from the source to the target system, the source system can take a next snapshot of the source storage object and then replicate the data changes of the next replication cycle to the target system. The foregoing can be performed in an ongoing manner in at least one embodiment. In at least one embodiment, rather than taking replication related snapshots at a frequency based on a defined RPO value or setting, the near zero or low RPO replication can perform asynchronous replication by continually taking snapshots of the source storage object in an ongoing manner and then replicating data changes of the latest replication cycle. A replication cycle can occur between two successive replication related snapshots of a source volume where the writes made to the source volume between the time period when the two successive snapshots are taken are included in the replication cycle. Thus with near zero or low RPO replication for a configured volume pair (V1, V2) where V1 is the source volume configured for asynchronous remote replication to the target volume V2, in at least one embodiment, once the current replication cycle of data changes to V1 is copied or replicated from the source system to the target system, the source system can immediately commence the next replication cycle without regard to taking snapshots at a defined frequency.

In at least one embodiment, a replication related snapshot can denote a snapshot taken for replication related purposes such as for asynchronous replication using the near zero or low RPO replication technique described herein. In at least one embodiment, replication related snapshots can be used internally by the source storage system to capture data changes that are copied or replicated in ongoing replication cycles to the target system for a configured volume pair (V1, V2) where V1 is the source volume configured for asynchronous remote replication to the target volume V2. In at least one embodiment, the low RPO replication technique can be used where records of such replication related snapshots are transient and are retained in a log without flushing, and thus without actually creating the corresponding snapshots and corresponding metadata.

In at least one embodiment, the low RPO or near zero replication as discussed in more detail below can provide a low RPO by utilizing limited or finite resources of the storage system, where such resources can include cache resources and the log resources. In at least one embodiment, writes and other operations can be recorded in a persisted log and also in a volatile memory cache. Once the write or other operation has been recorded in the persisted log, an acknowledgement regarding completion of the operation can be returned to the client that sent the operation.

In at least one embodiment of the present disclosure, a low RPO or near zero RPO replication technique can perform multiple optimizations including: write tracking where tracked write locations between successive replication related snapshots are stored in write tracking cache or memory; using transient snapshots or snaps that can be retained in the log without flushing until deleted from the log; and holding or maintaining data to be replicated in a cache of the source system until the data has been asynchronously replicated to the target system.

In at least one embodiment, the low RPO replication technique of the present disclosure can determine data changes or writes that are replicated in a replication cycle without performing the expensive snapshot difference technique such as noted above where the snapshots are actually flushed from the log and created such as by a mapper component discussed elsewhere herein. In at least one embodiment using the low RPO replication technique, a cache or caching layer can perform write tracking of tagged writes where the cache can identify all writes tagged with a particular tracking identifier (ID). The particular tracking ID can uniquely identify tracked writes of a particular replication cycle between two successive snapshots of a source volume.

All writes tracked with the particular tracking ID can denote the data changes in the replication cycle for a particular source volume. Thus in at least one embodiment, the above-noted write tracking can be used with the low RPO replication technique to determine corresponding locations in the source volume of the data changes to be replicated to the target system, where such tracked write locations are stored in the write tracking cache or memory. Thus such tracked data changes of the source storage object on the source system can denote source volume locations or offsets of written or changed data that is replicated from the source to the remote target system in a single replication cycle and then applied to the corresponding target storage object.

In at least one embodiment, the low RPO replication techniques of the present disclosure can include retaining the changed or written data (to be replicated in connection with asynchronous replication for a source volume) in the cache of the source system until the changed or written data has been replicated from the source to the target system. In at least one embodiment, the changed or written data can remain in the source system's cache until the source system receives an acknowledgement from the target system that the changed data has been successfully received and committed.

In at least one embodiment, the low RPO replication techniques of the present disclosure can utilize a mechanism for write tracking of write I/Os in the data path where a cache or caching layer, such as a transactional caching layer, can track tagged write I/Os (e.g., tagged with a tracking ID). In at least one embodiment with the low RPO replication technique or mode, the cache or caching layer of the source storage system can track metadata or information about the tagged write I/Os directed to a corresponding source storage object or volume, where the information can include a volume, offset (e.g., logical block address or LBA), and length corresponding to each tracked write I/O. The volume, offset and length can correspond to a target address or location of the write I/O to which data or content is written by the write I/O. At a later point in time in at least one embodiment, the information or metadata regarding tracked writes having a particular tracking ID can be requested and collected. The collected information or metadata for the particular tracking ID can describe, for example, the offsets or locations corresponding to the data changes or writes included in a particular replication cycle for the source storage object or volume. In at least one embodiment, the collected information regarding tracked writes can be stored in the write tracking cache or memory.

In at least one embodiment of the low RPO replication technique or mode, the data changes or differences between two successive replication related snapshots N−1 and N of the source object can be identified by the tracked writes having a particular tracking ID. In at least one embodiment, data changes corresponding to successive snapshots of the source object can be identified by tracked writes directed to the source object, where such tracked writes can be tagged with corresponding tracking IDs uniquely associated with corresponding replication cycles.

In at least one embodiment for a replication session configured for low RPO replication that is one way asynchronous replication for a volume pair V1, V2, where V1 is the source volume on the source system and V2 is the target volume on the target system, the caching layer on the source system can track tagged write I/Os directed to the source volume V1 on the source system in connection with replication related snapshots for near zero or low RPO replication. In at least one embodiment of the low RPO technique, the tracked writes can denote a list of changed offsets or locations of V1 modified between successively taken replication-related snapshots of V1. The tracked writes can be stored as a list in a portion of a volatile memory cache of the source system. Low RPO replication techniques can then use the list of tracked writes as stored in cache (e.g., the write tracking cache) to identify the content to be replicated from the source system to the target system without having to use a more resource intensive technique. Additionally in at least one embodiment, retaining the content or data of the tracked writes in cache until such content or data has been replicated allows the low RPO replication technique to efficiently retrieve the content or data to be replicated from cache, as opposed to the more costly and time consuming processing of reading the data or content to be replicated from backend (BE) non-volatile storage.

Thus in at least one embodiment, the low RPO technique can store the list of tracked writes in cache where the list identifies logical addresses of the content to be replicated. In at least one embodiment, the low RPO technique can traverse the list of tracked writes to identify logical addresses or locations of V1 to be replicated, where the content or data of such logical addresses or locations can also be retrieved efficiently from cache without incurring the expensive processing of a read cache miss.

In at least one embodiment in accordance with the techniques of the present disclosure, the low RPO techniques can further utilize transient snapshots that are successively and continuously taken replication related snapshots. In low RPO replication, replication related snapshots can be created and deleted in a relatively short amount of time. In at least one embodiment, a snapshot request corresponding to a request to create a replication related snapshot of the source volume V1 can be received at the source system. In at least one embodiment, a log on the source system can be used to record, in time order, write I/Os of V1 and other operations such as commands to create and delete snapshots including replication related snapshots of V1. In such an embodiment, a record denoting the replication related snapshot creation or request can be recorded in the log having a relative position or location with respect to recorded writes that are included in the particular snapshot. Thus the log can include records in a time ordered sequence denoting the order in which recorded operations are received and applied.

In at least one embodiment, the low RPO replication technique can provide for retaining in the log replication related snapshot commands that create transient snapshots without flushing them from the log until deleted from the log. In at least one embodiment, transient snapshots can be created and deleted by a replication service that performs the low RPO replication technique. In this manner, the replication service can create a transient snapshot and then delete the transient snapshot when the service is done using the transient snapshot for its replication purposes. In at least one embodiment, the record of the log denoting the request to create or take the replication related snapshot can be marked as transient indicating that the particular snapshot created is a replication related or transient snapshot. In at least one embodiment of the low RPO replication technique, a transient flag or indicator of a log record for a create snapshot command can indicate that the log records corresponding to the snapshot and the snapshot's (dirty) write data be retained in the log and not flushed from the log until the snapshot has been deleted, as denoted by an entry recorded in the log for the delete snapshot operation. In at least one embodiment, once the low RPO technique has replicated content or write data of write I/Os received between successive transient snapshots N−1 and N from the source system to the target system, the log record of the transient snapshot N−1 can be deleted and the log records of write I/Os between transient snapshots N−1 and N can be flushed from the log. In at least one embodiment of the low RPO replication technique, the foregoing of retaining records for the transient snapshot in the log until deleted can be performed, for example, rather than incur additional performance penalties associated with flushing records of the transient snapshot creation and subsequent write I/Os from the log, and then performing processing to delete the transient snapshot after it has been flushed from the log and created.

In at least one embodiment, flushing records of the transient snapshot from the log can be an expensive operation and can include creating and storing corresponding metadata for the transient snapshot. Furthermore, subsequent flushed writes to the source volume occurring after taking the transient snapshot of the source volume can also result in write splits causing additional metadata updates. In at least one embodiment, deleting the flushed transient snapshot can be an expensive operation in that the corresponding metadata for the snapshot is deleted and/or updated. Furthermore, processing can also be performed to undo any previously performed operations in connection with the write splits. In at least one embodiment, a write split can be performed with respect to a metadata page and includes allocating a new metadata page where the content of an existing metadata page is copied to the new metadata page. In connection with taking a snapshot of a source volume, the source volume and the snapshot include the same content initially and can thus share one or more same metadata pages. Subsequently, writes can be applied to the source volume resulting in differences in stored content of the source volume and snapshot. As a result of the writes, a write split can be performed where, prior to the writes, the snapshot and the source volume may share the same metadata page. Subsequent to applying the writes such as to the source volume, a first metadata page that is shared by both the snapshot and the source volume may be modified to reflect the writes applied to the source volume. However, prior to modifying the existing first metadata page for use with the source volume writes, a write split operation can be performed to preserve or duplicate the existing first metadata page content in a new page for use with the snapshot. Thus in at least one embodiment in connection with the low RPO replication technique, retaining a transient snapshot in the log (e.g., retaining in the log a record to create a transient snapshot) until deleted can avoid expensive processing, such as write splits noted above, that can be associated with a flushed transient snapshot.

In at least one embodiment, dirty write data can generally be retained in cache until the BE non-volatile storage has been updated to persistently store the write data, whereby the write data can now be characterized as clean and can be a candidate for eviction from the cache. As may be needed in at least one embodiment, records of the transient snapshot can be flushed from the log such as, for example, if there is an insufficient amount of log space and/or cache. However in at least one embodiment using the low RPO replication technique, even though write data of the transient snapshot may be flushed from the log, write data can be retained in, and not evicted from, the cache even after being flushed from the log and characterized as clean.

In at least one embodiment, log records, such as records of transient snapshots and writes recorded in the persistent log, can also be stored in a volatile memory cache. While recorded writes of the log remain in the log, the write data can remain in the cache as dirty data that has not yet been flushed. Such dirty write data can be retained in the cache and may not be a candidate for removal or eviction. In at least one embodiment as part of normal processing in the data path, once the corresponding log records of the write data have been flushed from the log, the write data of the cache can be marked as clean, where clean data of the cache can be a candidate for removal or eviction. In at least one embodiment of low RPO replication, even if write data is flushed from the log, the write data can be retained in the cache of the source system until replicated to the target system.

In at least one embodiment, low RPO replication with respect to a volume pair (V1, V2) can denote one way asynchronous replication from a source volume V1 of a source system to a corresponding target volume V2 of a target system. In at least one embodiment, low RPO replication for the volume pair can replicate source volume data changes to the target system continuously such that as soon as one replication cycle ends, the next replication cycle begins. With low RPO replication in at least one embodiment, the cache can track tagged writes that are tagged with a tracking ID, and can store the list of tagged writes in cache. In at least one embodiment, tracking writes can include recording in cache information about the tagged writes such as volume, offset and length corresponding to the writes. In at least one embodiment, the tracking ID can be uniquely associated with a particular replication cycle of a particular source volume configured for near zero or low RPO replication. In this manner, querying the cache for tracked writes tagged with a particular tracking ID can denote the list of writes or data changes included in a particular corresponding replication cycle for a particular source volume. In at least one embodiment, low RPO replication can further include: retaining transient snapshots in the log; and retaining content to be replicated in the cache of the source system until such content has been replicated.

In at least one embodiment of low RPO replication, the following optimizations can be performed in connection with asynchronous replication for a configured volume pair (V1, V2): write tracking can be performed where the list of changes or writes to V1 to be replicated for a particular snapshot can be stored in cache; transient snapshots can be held in the log without flushing until deleted; and content to be replicated can remain in the cache until replicated. Thus for the low RPO replication in at least one embodiment, all content or data to be replicated can be dirty and can remain in cache on the source system until replicated to the target system.

Thus consistent with discussion above, asynchronous replication techniques can take replication related snapshots. With asynchronous replication techniques having a very low RPO, such as the low RPO or NZ replication technique noted above, such replication related snapshots can be taken at a high rate or frequency. The creation of snapshots, including replication related snapshots, can be characterized as a heavy-weight process. For example in at least one embodiment of the low RPO replication technique, creating a snapshot includes processing to allocate of an inode (index node) and an extent corresponding to a portion of logical address space for the snapshot being created. Doing this at a high frequency needed to support the low RPO replication can pose a bottleneck to achieving very low RPOs. Furthermore, some of the operations such as allocating an inode and allocating an extent, can utilize global resources that can be accessed by multiple processes or tasks. As a result, performing such operations can be expensive in that, for example, an expensive locking or synchronization technique can be utilized. Furthermore, there can be contention for such global resources thereby further increasing associated processing time and costs. Additionally, processing to allocate and utilize an inode can include, for example, persistently recording that the inode number is allocated and then formatting a corresponding inode structure. Allocating an extent can include persistently recording that the particular extent and associated portion of the logical address space has been allocated.

In connection with the low RPO technique in at least one embodiment, the replication related snapshots are created periodically as transient snapshots that are likely to be deleted without ever being flushed from the log to a mapping component (sometimes referred to as mapper).

Considering the foregoing, an embodiment in accordance with the techniques of the present disclosure can further utilize a pool of snapshot (snap) objects that the system cycles through for use in connection with replication related snapshots for asynchronous replication. In at least one embodiment, the pool of snap objects can be used in connection with the low RPO replication technique. In at least one embodiment, the pool can include multiple snap objects that are preallocated and initialized prior to being needed or used in connection with a replication cycle of the low RPO replication technique for a volume. In at least one embodiment, such preallocation of snap objects of the pool can include creating or allocating an inode and extent for each snap object. In at least one embodiment, an extent can correspond to a portion of global (system) logical address space allocated or reserved for use such as in connection with a snapshot or other corresponding object. When a new replication related snapshot is taken or created, one of the snap objects from the pool can be utilized. When the replication related snapshot is to be deleted, rather than deleting the snap object and releasing the corresponding inode and extent, at least one embodiment can include performing processing to reuse the snap object and its corresponding inode and extent. In at least one embodiment, such processing can include cleaning or reinitializing the corresponding extent to remove or disassociate any existing data or content whereby a cleaned or initialized extent can then be available for reuse with its associated snap object of the pool. In at least one embodiment, the corresponding inode and extent can remain associated with its corresponding snap object of the pool. In this manner in at least one embodiment, the pool's snap object, its corresponding inode, and its corresponding extent can be reused in connection with a subsequent replication related snapshot to avoid the additional processing associated with creating and allocating the snap object and its corresponding inode and extent.

In at least one embodiment, the techniques of the present disclosure can further utilize a pool of snap objects, associated inodes, and associated extents in order to avoid the frequent allocation of such items in connection with replication related snapshots for asynchronous replication. In this manner in at least one embodiment, the techniques of the present disclosure can utilize the pool of snap objects to reduce the overall processing associated with the high-frequency operation of snapshot creation in connection with asynchronous replication such as the low RPO replication technique.

The foregoing and other aspects of the techniques of the present disclosure are described in more detail in the following paragraphs.

Referring to the FIG. 1, shown is an example of an embodiment of a system 11 that can be used in connection with performing the techniques described herein. The system 11 includes a data storage system 12 connected to the host systems (also sometimes referred to as hosts) 14a-14n through the communication medium 18. In this embodiment of the system 11, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 11.

Each of the host systems 14a-14n and the data storage system 12 included in the system 11 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 11 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

In at least one embodiment, reading contents stored at a logical address LA1 such as to service a read I/O in response to a read cache miss can including traversing the mapping information of the chain of metadata pages mapping the logical address to a physical location or address of the content of LA1 as stored in BE non-volatile storage.

In at least one embodiment, a write I/O that writes content C1 to LA1 can be persistently recorded, such as in a log discussed elsewhere herein, and then an acknowledgement can be returned to the issuing client. Subsequently, the recorded write I/O can be flushed from the log. Flushing the recorded write I/O can include storing C1 at a physical location or address, and then creating and/or updating corresponding mapping information that maps LA1 the physical location of C1.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2A:
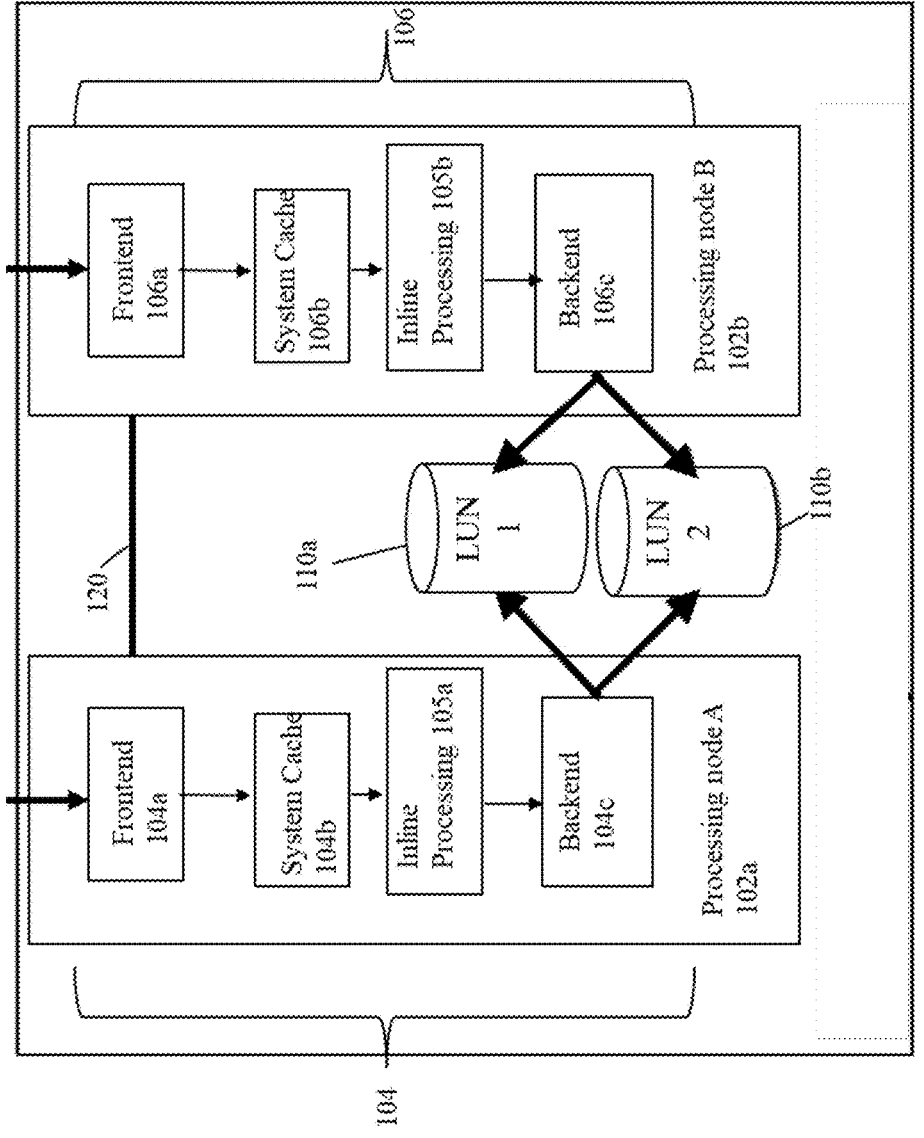
FIG. 2A is an example illustrating the I/O path or data path in connection with processing data in an embodiment in accordance with the techniques of the present disclosure.

With reference to the FIG. 2A, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102*a* and 102*b*, the example 100 illustrates what is also referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowl-edgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be per-formed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network inter-connect 120 between the nodes 102*a*, 102*b*. In at least one embodiment, the interconnect 120 can be used for internode communication between the nodes 102*a*, 102*b*.

In connection with at least one embodiment in accordance with the techniques herein, each processor or CPU can include its own private dedicated CPU cache (also some-times referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be imme-diately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that par-ticular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodi-ment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a*-*b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expan-sion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each pro-cessor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

In at least one embodiment, a persisted log can be used for logging user or client operations, such as write I/Os. In at least one embodiment as discussed in more detail elsewhere where herein, the log can also be used to log or record other operations such as operations to create and delete snapshots of storage objects such as volumes or logical devices.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write or other operation in the log, the write or other operation is flushed or destaged from the log. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation. More generally, once an entry of recorded operation of the log is flushed from the log, the log space of the flushed entry can be reclaimed and reused.

In the log in at least one embodiment, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
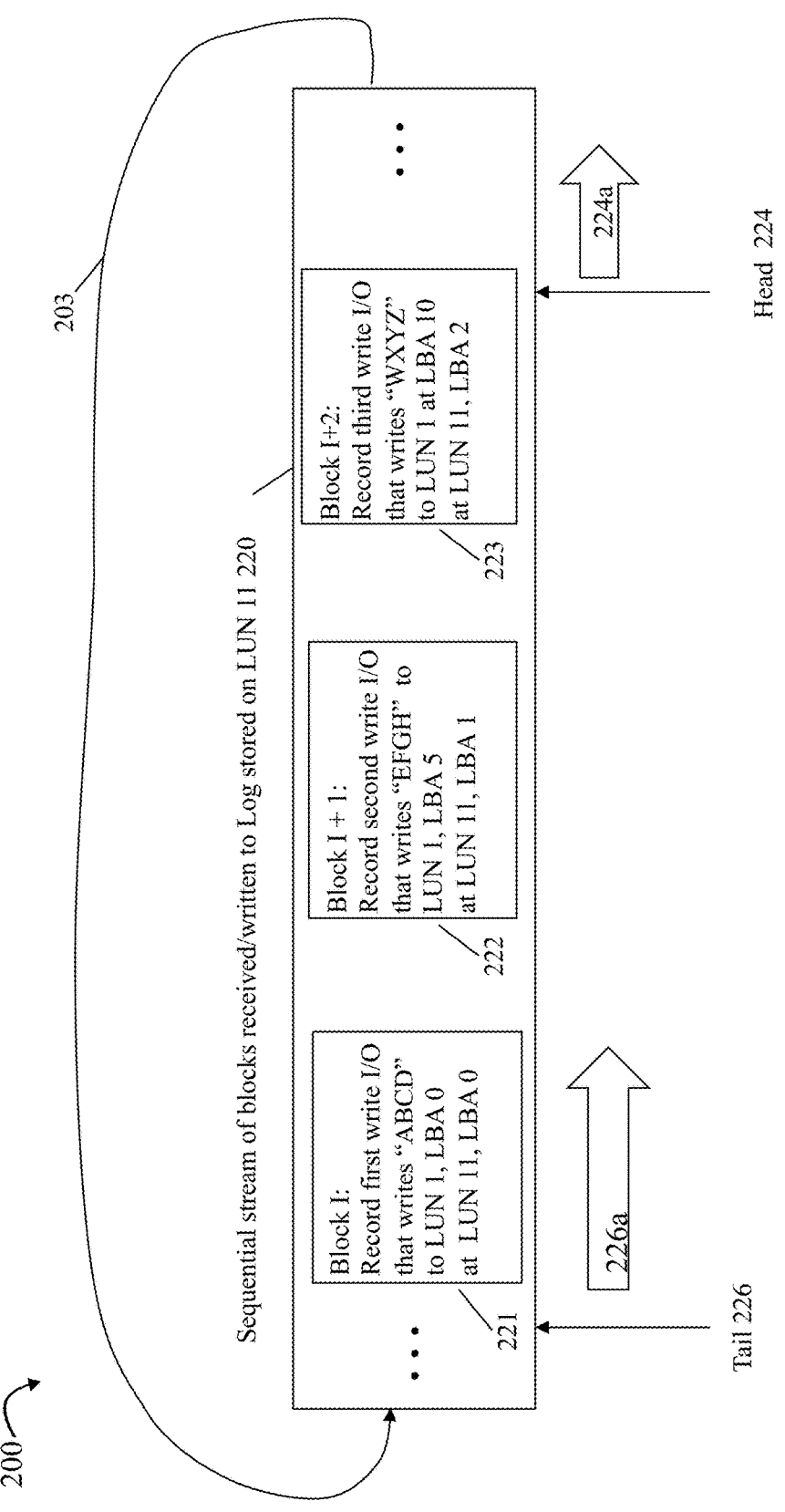
FIGS. 2B, 2C, 2D and 6 are examples illustrating use of a log in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
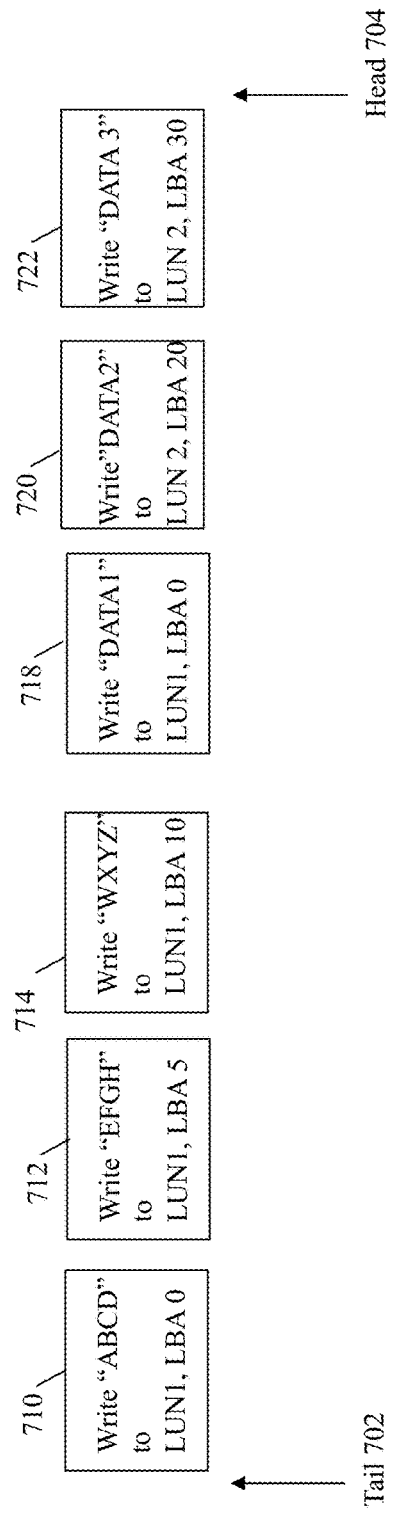

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
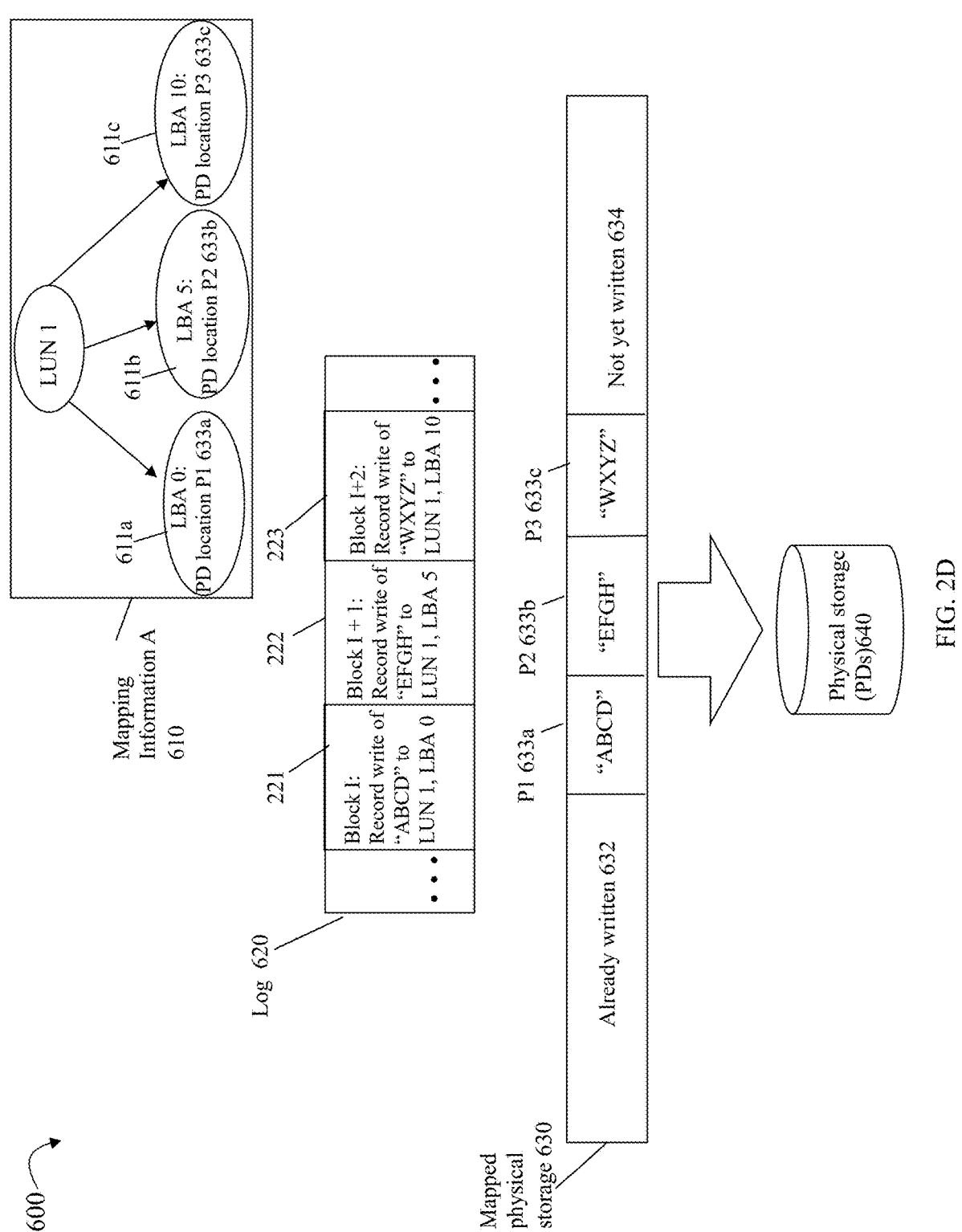

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
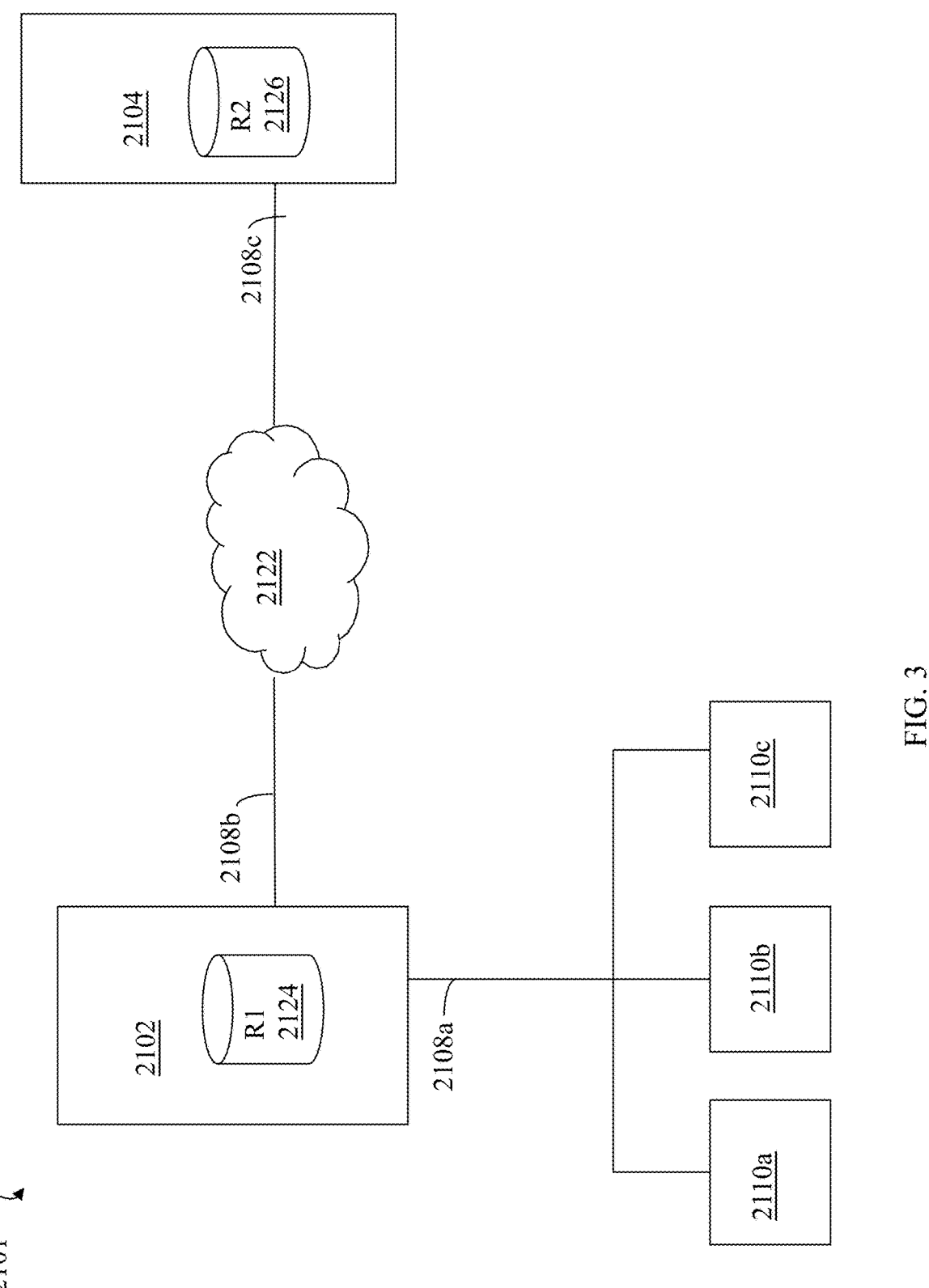
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 2104 can be characterized as remote with respect to the hosts 2110a, 2110b and 2110c. The R1 and R2 devices can be configured as LUNs.

The host 2110a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary or production storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 2110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110a can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110a regarding completion of the write. Thus, the acknowledgement sent from the system 2102 to the host 2110a regarding completion of the write is sent independent of any replication or communication of the write to the remote R2 system 2104. Additionally, the RRF operating in the asynchronous mode can replicate or propagate the write across an established connection or link (more generally referred to as a the remote replication link or link) such as over 2108*b*, 2122, and 2108*c*, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write. Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
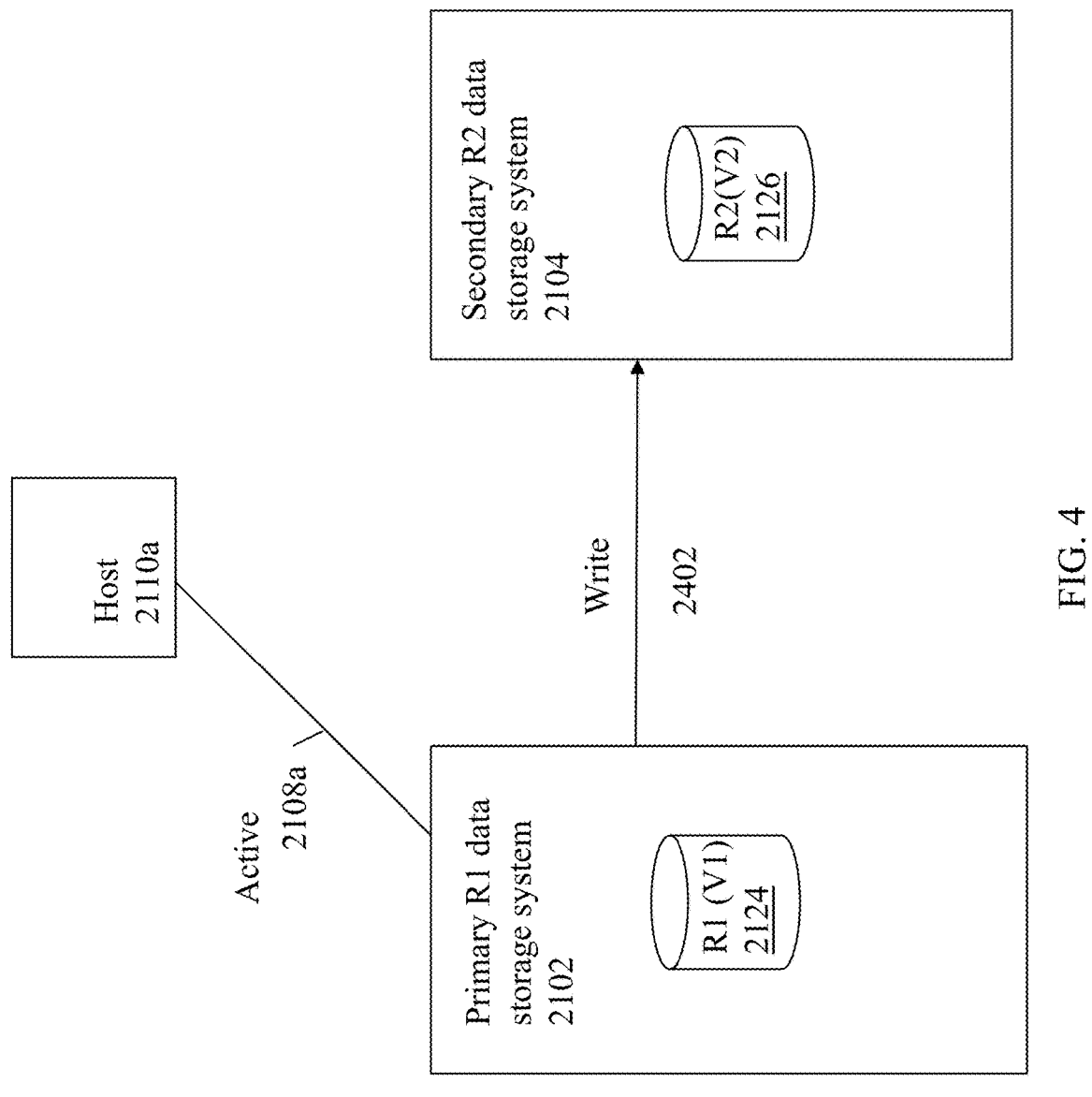
FIG. 4 is an example illustrating a replication configuration in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2A. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110*a* issues a write, or more generally, all I/Os including reads and writes, over a path to only the primary R1 data storage system 2102. The host 2110*a* does not issue I/Os directly to the R2 data storage system 2104. The configuration of FIG. 4 is a configuration with asynchronous replication performed from the R1 data storage system 2102 to the secondary R2 system 2104. With the configuration of FIG. 4, the host 2110*a* has an active connection or path 2108*a* over which all I/Os are issued to only the R1 data storage system. Writes issued over path 2108*a* to the R1 system 2102 can be asynchronously replicated to the R2 system 2104.

In at least one embodiment of the configuration of 2400, the R1 device 2124 (e.g., volume V1) and the R2 device 2126 (e.g., the volume V2) can be configured as an asynchronous volume pair where writes to V1 2124 are automatically asynchronously replicated to the R2 system 2104 and applied to the target volume V2 2126. Thus in the example 2400, the host 2110*a* can have write access over the active path 2108*a* to the source or R1/V1 volume (2124) but have no direct write access to the target or R2 volume (2126).

In at least one embodiment, the target volume or R2 volume 2126 can be used in the event of a failure of any one or more of: the host 2110*a*, link 2108*a* and/or system 2102. Although not illustrated in FIG. 4, another second host can be connected to the system 2104 where the second host can use the target volume or R2 volume 2126 due to the foregoing failure.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, one or more file systems, a virtual volume or vvol used in connection with virtual machines, one or more files, one or more directories of files or other object, and any other suitable storage resource or object.

Generally, the primary or R1 storage system 2102 can also be referred to as a source system or site; the secondary or R2 storage system 2104 can also be referred to as a destination, target or disaster recovery (DR) system or site; the R1/V1 device 2124 can also be referred to as a production or source volume or LUN having a corresponding R2/V2 device 2126 which can also be referred to as a target, destination or replica volume or LUN.

Consistent with discussion above, the RRF or remote replication facility can perform asynchronous replication for a configured pair of volumes, resources or objects in at least one embodiment. The asynchronous replication configuration can be generally as discussed herein such as the asynchronous remote replication configuration as in FIG. 4. In at least one embodiment, the asynchronous replication configuration can be a near zero or low RPO replication configuration of a volume pair (V1 2124, V2 2126), where the RRF performs processing of the low RPO replication technique.

Consistent with discussion above, the asynchronous replication for the volume pair can be performed using the low RPO techniques discussed herein. The low RPO replication techniques in at least one embodiment can perform several optimizations that provide for the very low or near zero RPO achieved for a volume pair, or more generally, an object pair configured for asynchronous replication. A volume pair can be configured for asynchronous replication, in particular for low RPO replication, from a volume pair (V1, V2), where V1 denotes the source volume on the source system, and where V2 denotes the corresponding target volume on the target system.

Below is an initial discussion of further details regarding the various optimizations that can be performed by the low RPO replication technique in at least one embodiment in accordance with the present disclosure. Subsequently, there is a discussion regarding other features and embodiments of the techniques of the present disclosure.

In at least one embodiment, performing asynchronous replication using the low RPO replication mode or technique can have a lower adverse impact on the storage system than other asynchronous replication techniques such as the legacy snapshot difference technique. In at least one embodiment, the foregoing can be based, at least in part, on i) the list of differences between successive replication related or transient snapshots being maintained in the cache or memory and/or ii) the ability to retain such replication related or transient snapshots in the log. By retaining the transient snapshots in the log until related content has been replicated, the transient snapshots can be deleted or removed efficiently without incurring more expensive processing when such snapshots are flushed with corresponding metadata created, and then when such snapshots are subsequently deleted.

In the following paragraphs, examples can be provided in embodiments for a volume pair (V1, V2) where V1 is a source volume of the source system and V2 is the corresponding unique target volume of the target system. More generally, the techniques of the present disclosure can be used with other types of storage objects.

The foregoing and other aspects of the techniques of the present disclosure are described in more detail in the following paragraphs.

Figure 5A:
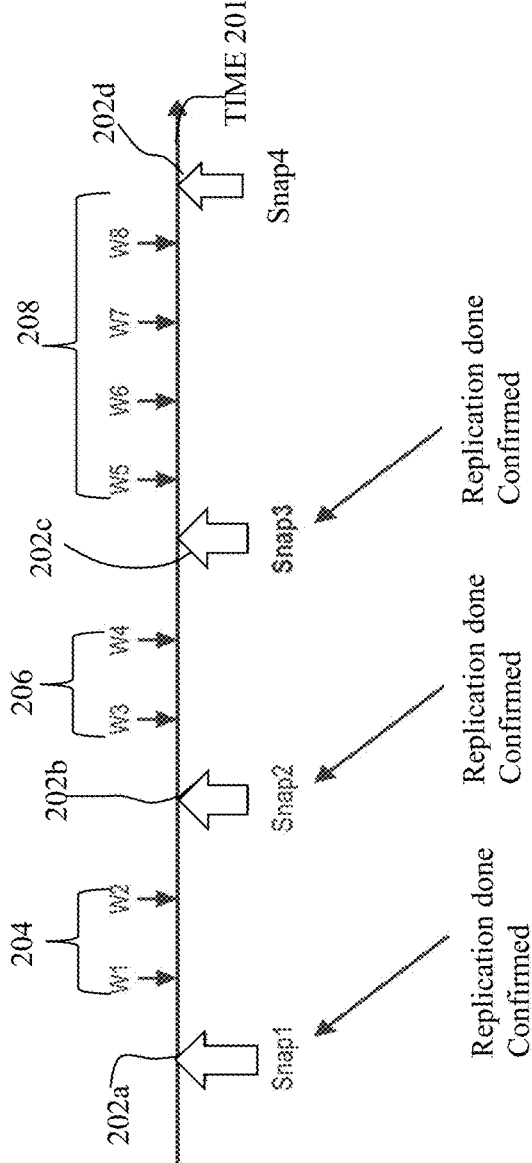
FIG. 5A is an example illustrating determining data differences for a replication configuration in at least one embodiment in accordance with the techniques of the present disclosure.

Referring to FIG. 5A, shown is an example 200 illustrating general use of replication related or transient snapshots in connection with asynchronous replication for volume pair (V1, V2), such as with the low RPO replication technique as well as the snapshot difference technique, in at least one embodiment in accordance with the techniques of the present disclosure.

The example 200 illustrates replication related snapshots 202*a-d* of a storage object such as a source volume V1 of a source storage system taken at various points in time along a timeline 201. The snapshot snap1 202*a* is taken at a first point in time P1 and can be marked as a replication related snapshot. The snapshot snap2 202*b* is taken at a second point in time P2 (subsequent to taking snap1 202*a* at P1) and can be a marked as a replication related snapshot. The snapshot snap3 202*c* is taken at a third point in time P3 (subsequent to taking snap2 202*b* at P2) and can be marked as a replication related snapshot. The snapshot snap4 202*d* is taken at a fourth point in time P4 (subsequent to taking snap3 202*c* at P3).

In at least one embodiment, each of the replication related snapshots 202*a-d* can also be marked or flagged as a transient snapshot.

The writes W1 and W2 of 204 denote the writes occurring between taking snapshots 202*a* and 202*b*, whereby writes of 204 denote data changes between snapshots 202*a-b*. The writes W3 and W4 of 206 denote the writes occurring between taking snapshots 202*b* and 202*c*, whereby the writes of 206 denote data changes between snapshots 202*b-c*. The writes W5-W8 of 208 denote the writes occurring between taking snapshots 202*c* and 202*d* whereby the writes of 208 denote data changes between the snapshots 202*c-d*.

The writes 204 can denote the replicated writes of a single asynchronous replication cycle between snapshots 202*a-b*; the writes 206 can denote the replicated writes of a single asynchronous replication cycle between snapshots 202*b-c*; and the writes 208 can denote the replicated writes of a single asynchronous replication cycle between the snapshots 202*c-d*.

In at least one embodiment, the writes 204 can be included in the snapshot 202*b*; the writes 206 can be included in the snapshot 202*c*; and the writes 208 can be included in the snapshot 202*d*.

Consistent with discussion elsewhere in at least one embodiment in accordance with the techniques of the present disclosure with the low RPO replication technique or mode, write tracking can be performed by a caching layer or cache to determine the replicated writes of each replication cycle corresponding to a particular tracking ID that uniquely identifies a particular replication cycle of the particular source volume. Processing can be performed to extract data changes of a replication cycle based on the tracked writes with the particular tracking ID as identified by the cache or caching layer.

Consistent with other discussion herein in connection with at least one embodiment of the low RPO replication, records of the writes 204 can remain in the cache until the writes 204 have been replicated from the source system to the target system whereby the replication of such subsequent writes 204 following the snap 202*a* are confirmed as committed on the target system. Records of the writes 206 can remain in the cache until the writes 206 have been replicated from the source system to the target system whereby the replication of such subsequent writes 206 following the snap 202*b* are confirmed as committed on the target system. Records of the writes 208 can remain in the cache until writes 208 have been replicated from the source system to the target system whereby the replication of such subsequent writes 208 following the snap 202*c* are confirmed as committed on the target system.

In at least one embodiment, the replication snapshot operation N and all subsequent writes prior to the next successive replication snapshot N+1 taken for replication can be held or retained in the cache until all such subsequent writes have been replicated to the target system where the target system has confirmed or acknowledged the replication of such writes.

In at least one embodiment, records of the transient snapshots as recorded in the log can remain in the log and not flushed until deleted, such as by a remote replication facility or RRF performing asynchronous replication using the low RPO replication techniques described herein.

In at least one embodiment of the low RPO replication techniques, processing can be performed such as by a cache or caching layer to generally track changed data locations of the source volume or storage object on the source system, where the contents of the changed locations is what need to be replicated to the target volume or storage object of the target system. In at least one embodiment, such data changes can be read by the source system, replicated to the target system, and written to the target volume of the target system on each replication cycle. With the low RPO technique, optimizations can be enabled and applied that provide for tracking the changed locations of volumes that have been written to between successive replication related snapshots where such changed locations can be stored in the cache in the write tracking memory or cache. Additionally, the low RPO technique can provide for retaining data to be replicated in the cache and thus read from cache (as opposed to reading from BE non-volatile storage) by asynchronous replication processing.

In at least one embodiment, processing of the low RPO replication technique can include continually taking replication related snapshots or snaps of a source volume V1; tracking, in the write tracking memory or cache, writes of each replication cycle between two successive replication related snapshots using a unique tracking ID; using metadata or information recorded in the write tracking memory for the tracked writes to determine a set or list of corresponding locations of V1 denoting locations of V1 that have been modified or written in a particular replication cycle; extracting data changes of the corresponding locations for the corresponding replication cycle; and replicating the data changes of the replication cycle from the source system to the target system. Additionally, as the data or writes between successive snapshots N−1 and N are replicated from the source system to the target system, the low RPO replication technique can further include deleting the replication related snapshot N−1; and also deleting or otherwise reusing the cache storage consumed for the list of tracked writes. If the replication related snapshot is in the log and thus deleted from the log, the writes subsequent to the deleted snapshot can now be flushed from the log. If the replication related or transient snapshot has been flushed from the log and is deleted after the log entry to create the snapshot has been flushed, deleting the replication related snapshot can include deleting any associated metadata of the deleted snapshot. If the replication related snapshot has been flushed from the log, records of subsequent writes may have also been flushed from the log but retained in cache until replicated. If the replication related snapshot has not been flushed from the log, records of the subsequent writes are also not flushed, where the write data of such subsequent writes is dirty and can remain in the cache until replicated and flushed.

In at least one embodiment, the data differences or changed content can be determined, replicated or written to the target system, and then applied to the corresponding target volume. In at least one embodiment, the list of locations having content to be replicated can be obtained from the list maintained in the cache by write tracking. The content or data replicated can be read from cache since in at least one embodiment of the low RPO replication technique, the content or data to be replicated for a particular replication cycle can remain in cache until replicated.

Figure 5B:
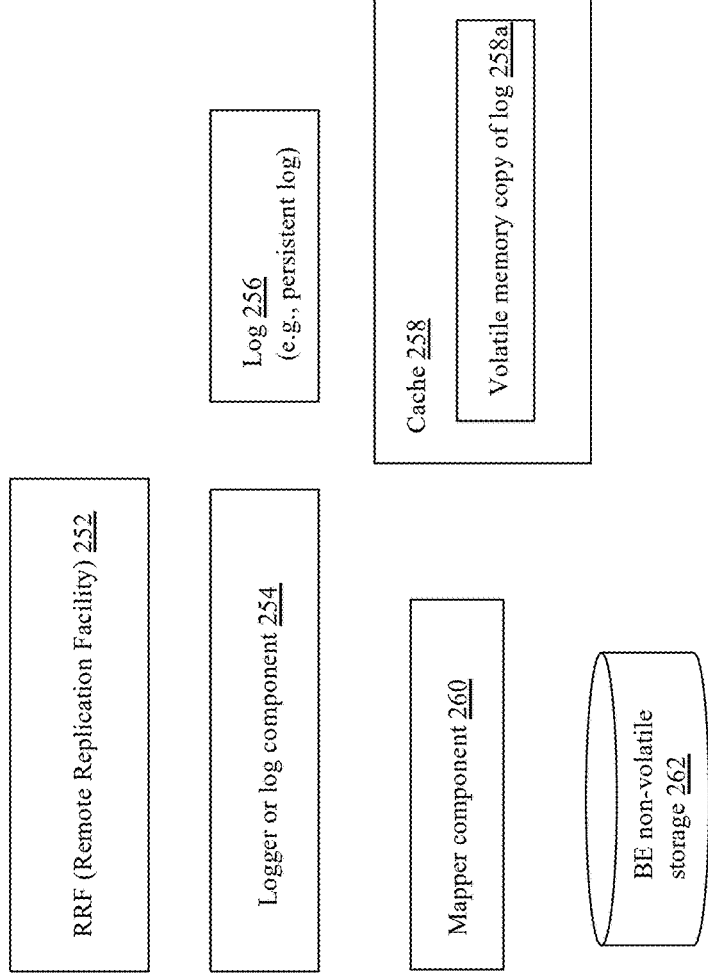
FIG. 5B is an example of components that can be included in a system in at least one embodiment of the techniques of the present disclosure.

Referring to FIG. 5B, shown is an example 250 of components on a storage system that can be used in an embodiment in accordance with the techniques of the present disclosure.

In at least one embodiment the components of 250 can be included in the source storage system configured to perform asynchronous replication using the low RPO techniques in accordance with the present disclosure.

The components 250 can include a remote replication facility or RRF 252, a logger or log component 254, a mapper component 260, a log 256 denoting a persistently stored log of recorded operations, a cache 258, and BE non-volatile storage 262. The cache 258 can generally be a volatile memory cache and can include a volatile memory copy 258a of the log 256. Put another way, in at least one embodiment, element 258a can denote an in-memory copy of the log 256, where the in-memory or volatile memory copy 258a can include the same information as the persistent log 256. In at least one embodiment, the copy 258a of the log can be accessed and used to perform processing described herein rather than the persistent copy 256 of the log. In at least one embodiment, the copy 258a of the log can have a corresponding layout and organization of content that can be different from the persisted log 256, where the organization of 258a can be designed for quicker retrieval, updating and/or management than that of the persisted log 256. In at least one embodiment, the persisted log 256 can be used in the event of system failure or reboot to repopulate the volatile memory copy 258a of the log. In at least one embodiment, committing a record or transaction to the log, such as part of ingest processing of a command or operation, can include storing corresponding records in both the persisted log 256 and the volatile memory copy 258a of the log. In at least one embodiment with a dual node system, committing a record or transaction to the log can also include communicating the committed or recorded operations between the peer nodes to ensure that both nodes have synchronized volatile memory copies of the log.

In at least one embodiment of a dual node system, each node can include node-local instances of 252, 254, 258, and 260. In at least one embodiment of a dual node system, there can be a single persistent log 256 accessed and used by both nodes. Additionally, the storage 262 can denote BE non-volatile storage accessed and used by both nodes.

The RRF 252 can be configured to perform asynchronous replication using the low RPO techniques of the present disclosure. In at least one embodiment, the RRF 252 can also be configured to perform asynchronous replication using an alternative asynchronous technique such as the legacy snapshot difference technique discussed elsewhere herein.

The mapper component 260, sometimes referred to as the mapper, can maintain mapping information of metadata pages used to map logical addresses, such as of user data or content, to corresponding physical addresses or locations of content stored at the logical addresses. The physical addresses or locations can correspond to storage locations in the BE non-volatile storage 262. Consistent with other discussion herein in at least one embodiment, the metadata pages can be organized in a hierarchal tree structure of multiple layers of metadata pages. In at least one embodiment, the hierarchical structure of multiple layers of metadata (MD) pages can include a layer of top MD pages, a layer of mid MD pages, a layer of leaf MD pages, where each top page can include pointers to multiple mid pages, each mid page can include multiple pointers to multiple leaf pages. Each leaf page can include multiple entries each associated with a logical address, where the leaf page entry for a logical address can include a reference, pointer, or address used to access a physical storage location of 262 containing content of the logical address. In at least one embodiment, the reference of the leaf page entry for a logical address can be an indirect pointer to the physical storage location of content stored at the logical address. In at least one embodiment, the mapping information mapping a logical address LA1 to a corresponding physical location PA1 of content stored at LA1 can include a chain of the metadata pages including top, mid and leaf MD (metadata) pages, where the top page points to a mid page, and where the mid page points to a leaf page, and where an entry of the leaf page includes the indirect pointer to PA1. In at least one embodiment, flushing a recorded write I/O of the log where the write I/O writes content C1 to LA1 can include: storing C1 at PA1; and creating and/or updating the mapping information of the chain of metadata pages used to map LA1 to PA1.

In at least one embodiment, flushing a recorded command or operation to take a snapshot can also include allocating and/or updating metadata pages for the new snapshot. In at least one embodiment, write I/Os to a source volume can result in write splits with respect to metadata pages shared with a snapshot of the source volume, where a write split can resulting in allocating one or more new metadata pages to accommodate the snapshot and writes to the source volume. As a result, deleting the snapshot once it has been flushed from the log can include the expensive process of deleting and/or updating metadata pages corresponding to the snapshot and its writes. Thus in at least one embodiment using the low RPO replication technique, retaining a transient snapshot in the log until deleted can use additional cache and log resources for an extended period of time while also avoiding or omitting performing the expensive processing associated with deleting a snapshot after it has been actually created as a result of flushing the log entry of the create snapshot command from the log.

The log component 254 can be configured to: record operations, commands or requests in the log 256, 258a; enforce constraints and dependencies between various operations that can be recorded in the log; and control flushing of the log 256, 258a to the mapper component 260. In accordance with the techniques of the present disclosure with the low RPO technique, the log component 254 can be configured to delay flushing recorded commands or operations, such as a command or operation to take or create transient snapshots, based on an indicator, such as a transient flag (TF) setting of the command to take a transient snapshot of a source volume.

In at least one embodiment, ingest processing of a write I/O and a snapshot related command (e.g., to create a snapshot of a volume or storage object and/or delete an existing snapshot of a volume or storage object) can include recording (e.g., committing) the command or operation in the log. Once the foregoing is recorded in the log, an acknowledgement can be returned to the client or originator of the command or operation just recorded in the log.

In at least one embodiment, the RRF 252 can be the client originating i) the command to create a transient or replication related snapshot and ii) the command to delete an existing transient or replication related snapshot. In at least one embodiment, write I/Os directed to a source volume configured for asynchronous replication using the low RPO techniques can be received at the storage system from a host or other external storage client. Subsequently, recorded operations or commands of the log can be flushed such as by the logger or log component 254. In at least one embodiment, flushing a recorded write I/O that writes content C1 to a first logical address LA1 can include: persistently storing C1 at a physical address or location PA1 on BE non-volatile storage 262; and creating and/or updating corresponding mapping information mapping LA1 to PA1.

Figure 6:
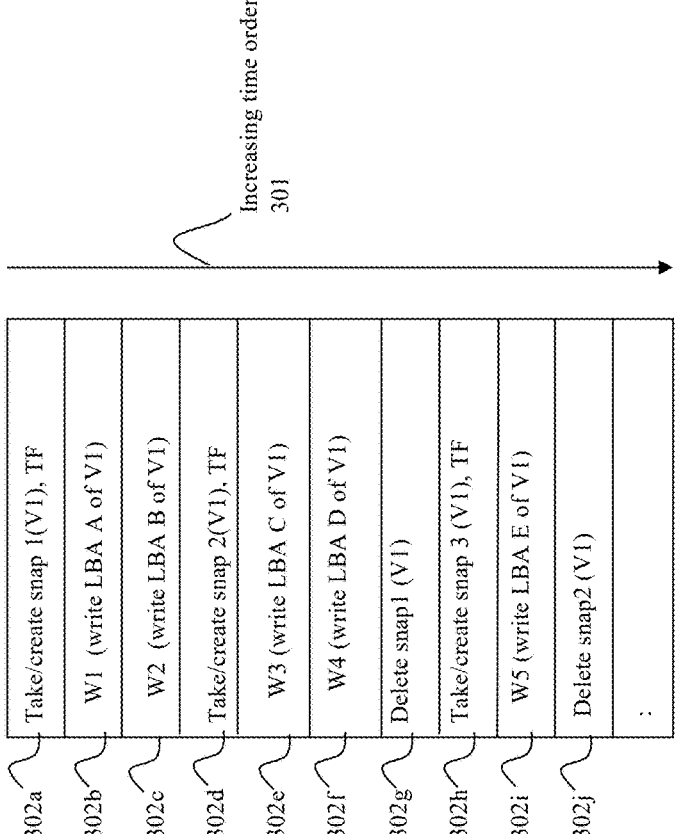

Referring to FIG. 6, shown is an example 300 illustrating use of the log in connection with recording transient or replication related snapshot operations and writes in at least one embodiment in accordance with the techniques of the present disclosure.

In the example 300, operations can be recorded as entries in the log in increasing time order as indicated by the arrow 301. Thus the records 302*a-j* denote operations, requests or commands recorded and committed to the log at various points in time in increasing time order.

Initially, a request or command to take or create a first transient or replication related snapshot, snap1, of the source volume V1, can be made by the RRF performing the low RPO replication techniques. The request to take snap1 of V1 is recorded in the log as record 302*a*, the transient flag (TF) is set for snap1 to signal to delay flushing the record 302*a*. In at least one embodiment, a log entry creating a snapshot can be viewed as a barrier record such that writes subsequent to the log entry for the create snapshot command are not flushed until the log entry for the create snapshot command is first flushed. Thus based on normal ordering of records of the log in at least one embodiment, the logger prevents write records, that occur in the log after a second record taking a snapshot, from being flushed prior to flushing the second record taking/creating the snapshot.

After recording 302*a* in the log, the storage system can receive writes W1 and W2 that are respectively recorded as entries 302*b-c* in the log. W1 and W2 can be writes directed respectively to LBAs A and B of V1 In at least one embodiment, the write records 302*b-c* would normally induce write splits in the mapper 260 if the record 302*a* taking snap1 were allowed to be flushed before the records W1 and W2. In at least one embodiment in accordance with the low RPO replication technique, this can be avoided by delaying flushing of record 302*a* based on the transient flag TF.

Subsequent to recording the entries 302*b-c* in the log, RRF can issue a command or request to take a second transient or replication related snapshot, snap2, of the source volume V1. The request to take snap2 of V1 is recorded in the log as record 302*d*, where snap2 can have the transient flag (TF) set to signal to delay flushing the record 302*d*.

After recording 302*d* in the log, the storage system can receive writes W3 and W4 that are respectively recorded as entries 302*e-f* in the log. W3 and W4 can be writes directed respectively to LBAs C and D of V1 In at least one embodiment, the write records 302*e-f* would normally induce write splits in the mapper 260 if the record 302*d* taking snap2 were allowed to be flushed before the records W3 and W4. In at least one embodiment, this can be avoided by delaying flushing of record 302*d* based on the transient flag TF.

After recording entries 302*e-f* in the log, the RRF can issue a command or request to delete the transient or replication related snapshot, snap1 of V1. Snap1 of V1 is the snapshot instance taken by the recorded command of the record 302*a*. The command to delete snap1 of V1 can be recorded in entry 302*g* of the log. At some later point in time, the logger can associate delete snap1 record 302*g* with the create snap1 record 302*a*, and invalidate the create snap1 record 302*a*. As such in at least one embodiment using the low RPO replication technique, the logger can be viewed as cancelling the creation or taking of snap1 of V1 such that mapper does not perform any processing related to creating or deleting the snap1 of V1. The result of such invalidation by logger is to allow the write records W1 302*b* and W2 302*c* without inducing write splits in the mapper 260. Rather, the writes W1 302*b* and W2 302*c* can be flushed and proceed as ordinary writes.

After recording the record 302*g* in the log, the RRF can issue a command or request to take a third transient or replication related snapshot, snap3, of the source volume V1. The request to take snap3 of V1 is recorded in the log as record 302*h*, where the transient flag (TF) is set for snap3 to signal to delay flushing the record 302*h*.

After recording 302*h* in the log, the storage system can receive write W5 recorded as entry 302*i* in the log. W5 can write to LBA E of V1. In at least one embodiment, the write record 302*i* would normally induce write splits in the mapper 260 if the record 302*h* taking snap3 were allowed to be flushed before the record W5 302*i*. In at least one embodiment of the low RPO replication technique, this can be avoided by delaying flushing of record 302*h* based on the transient flag TF.

After recording 302*i* in the log, the RRF can issue a command or request to delete the transient or replication related snapshot, snap2 of V1. Snap2 of V1 is the snapshot instance taken by the recorded command of the record 302*d*. The command to delete snap2 of V1 can be recorded in entry 302*j* of the log. At some later point in time, the logger can associate delete snap2 record 302*j* with the create snap2 record 302*d*, and invalidate the create snap2 record 302*d*. The result of such invalidation by logger would be to allow the write records W3 302*e* and W4 302*f* without inducing write splits in the mapper 260. Rather, the writes W3 302*e* and W4 302*f* can be flushed and proceed as ordinary writes.

As can be seen from FIG. 6 in at least one embodiment of the low RPO replication technique, sequences including creating and deleting multiple transient snapshots can be managed by invalidation by logger and delaying flushing of transient snapshots marked using the TF flag, which can avoid: creating any mappings (e.g., of metadata pages) for the snapshots, deleting the mappings for the snapshots, performing write splits when there is block sharing with the snapshots, and performing any needed cleanup after the write splits (e.g., deleting unneeded metadata supporting the write splits).

It should be noted that the example of FIG. 6 depicts an ordering in which the deletion of snap1 (302*g*) is placed before the creating of snap 3 (302*h*) thereby leaving snap2 as the only existing snapshot. In this example, the order or placement of delete snapshot commands and create snapshots commands is controlled by the RRF. In some embodiments, the RRF can have at least two transient snapshots at any given time. In this case, RRF can alternatively ensure a corresponding command sequence, for example, such that creating snap3 would alternatively occur prior to deleting snap1. In such an embodiment, there can be one replication cycle between two successive transient snapshots for which content is being replicated, and there can be another replication cycle that is open for which writes or data change are being tracked or collected.

Figure 7:
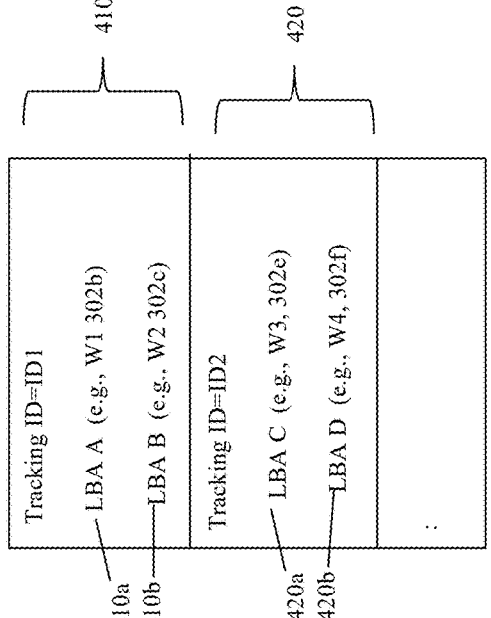
FIG. 7 is an example illustrating use of write tracking in at least one embodiment in accordance with the techniques of the present disclosure.

Referring to FIG. 7, shown is an example 400 of information that can be obtained as a result of write tracking in at least one embodiment of the low RPO replication technique in accordance with the techniques of the present disclosure.

In at least one embodiment, the cache or caching layer can perform write tracking of tagged writes where the cache can identify all writes tagged with a particular tracking identifier (ID). The particular tracking ID can uniquely identify a particular replication cycle between two successive snapshots of a source volume, and all writes tracked with the particular tracking ID can denote the data changes in the replication cycle. Put another way, writes can be tracked in a particular tracking session denoted by the tracking ID where the tracking session tracks writes made between two successive transient snapshots N−1 and N. Additionally generally the writes tracked for the tracking session with the tracking ID denote the writes included in the snapshot N. Based on the foregoing in at least one embodiment, the tracking ID can be uniquely associated with i) a particular source volume of an asynchronously configured volume pair, and ii) a particular snapshot of the particular source volume, where the tracking ID identifies content of the particular snapshot.

The information of 400 can be stored in the cache, such as a volatile memory cache. The information of 400 can include a list of changes to the source volume V1 between successive transient or replication related snapshots taken by RRF. In at least one embodiment, each tracking ID can uniquely identify a corresponding replication cycle between two successive transient snaps. The example 400 includes tracked writes for 2 replication cycles, where each replication cycle can denote data changes or writes made to V1 between two successive transient snapshots N−1 and N, and where such writes or data changes are included in the snapshot N.

In some instances, the cache or memory 400 used for write tracking can be referred to as write tracking memory or cache used in connection with tracking changed locations of volumes between successive snapshots of each such volume for use with the low RPO replication technique.

FIG. 6 illustrates a sequence of commands or operations recorded in the log including 3 commands or requests to take snapshots of V1. With reference back to FIG. 6, let a tracking ID=ID1 denote the data changes or writes included in a first replication cycle or tracking session between snap1 of V1 and snap2 of V1; and let a tracking ID=ID2 denote the data changes or writes included in a second replication cycle or tracking session between snap2 of V1 and snap3 of V1. Based on the foregoing in this example, writes or data changes tracked with tracking ID=ID1 can be those writes made to V1 during the time interval between taking snap1 of V1 and snap 2 of V1. Additionally, writes or data changes tracked with tracking ID=ID2 can be those writes made to V1 during the time interval between taking snap2 of V1 and snap 3 of V1.

The example 400 of FIG. 7 includes element 410 denoting tracked writes tagged with tracking ID=ID1 identifying those writes or data changes made to V1 in the first replication cycle or tracking session between snap1 and snap2 of V1. The element 410 includes: LBA A 410a corresponding to the write W1 302b, and LBA B 410b corresponding to the write W2 302c, where such writes W1 and W2 occur between taking snap 1 (302a) and snap2 (302d), and where such writes W1 and W2 can be tagged with the tracking ID=ID1.

The example 400 includes element 420 denoting tracked writes tagged with tracking ID=ID2 identifying those writes or data changes made to V1 in the second replication cycle or tracking session between snap2 and snap3 of V1. The element 420 includes: LBA C 420a corresponding to the write W3 302e; and LBA D 410b corresponding to the write W4 302f, where such writes W3 and W4 occur between taking snap2 (302d) and snap 3 (302h), where such writes W3 and W4 can be tagged with the tracking ID=ID2.

For a replication cycle or tracking session having a corresponding tracking ID with the low RPO replication technique, RRF can determine the list of locations of data changes or writes having associated content to be replicated in the replication cycle or tracking session by querying the cache for all tracked writes having the corresponding tracking ID. For example, RRF can perform processing to determine the list or set of locations of data changes in the first replication session by querying the cache for all tracked writes having the tracking ID of ID1. In response, the cache can return to RRF a list of LBAs or offsets, and associated lengths, of tracked writes of V1 having the tracking ID of ID1. In this example, the cache can determine that the LBA A 410a and LBA B 410b of V1 have been written to or modified during the first replication cycle or tracking session between snap1 and snap2.

Thus the RRF can determine a first set of data changes to be replicated from the source system to the target system by querying the cache for locations of V1 of tracked writes having the tracking ID=ID1, and then obtaining the data written to such locations, such as LBA A and LBA B of V1, during the corresponding replication cycle. In response to the query for tracked writes associated with tracking ID=ID1, the cache can return to RRF a list of LBA A and LBA B. In at least one embodiment, the content or data written by W1 to LBA A and by W2 to LBA B during the corresponding replication cycle can be retained in the cache until replicated. Thus, RRF can read, from the cache, the write data of LBA A (W1) and LBA B (W2) to be replicated. Once the write data of LBA A and LBA B has been replicated, write data of LBA A and LBA B, as stored in the cache, can be candidates for eviction or removal from the cache. The first set of data changes or differences denotes the locations of V1 that have been modified or written during the corresponding replication cycle between snaps 1 and 2 of V1.

RRF can perform processing to determine the list or set of locations of data changes in the second replication session by querying the cache for all tracked writes having the tracking ID of ID2. In response, the cache can return to RRF a list of LBAs or offsets, and associated lengths, of tracked writes of V1 having the tracking ID of ID2. In this example, the cache can determine that the LBA C 420a and LBA D 420b of V1 have been written to or modified during the second replication cycle or tracking session between snap2 and snap3 of V1.

Thus the RRF can determine a second set of data changes to be replicated from the source system to the target system by querying the cache for locations of V1 of tracked writes having the tracking ID=ID2, and then obtaining the data written to such locations, such as LBA C and LBA D of V1 during the corresponding replication cycle. In response to the query for tracked writes associated with tracking ID=ID2, the cache can return to RRF a list of LBA C and LBA D of V1. In at least one embodiment, the content or data written by W3 to LBA C and by W4 to LBA D during the corresponding replication cycle can be retained in the cache until replicated. Thus, RRF can read, from the cache, the write data of LBA C (W3) and LBA D (W4) of V1 to be replicated. Once the write data of LBA C and LBA D of V1 has been replicated, write data of LBA C and LBA D, as stored in the cache, can be candidates for eviction or removal from the cache. The second set of data changes or differences denotes the locations of V1 that have been modified or written to during the corresponding second replication cycle between snaps 2 and 3 of V1.

Thus in at least one embodiment, low RPO replication processing can include efficiently determining the set or list of changed locations of V1 for a particular replication cycle by querying the cache for the list. Additionally, low RPO replication processing can include efficiently obtaining the content of such changed locations by then reading the content of such changed locations from cache where such content can be retained and can remain in the cache until replicated.

Thus generally in at least one embodiment, asynchronous replication as performed using the low RPO replication techniques described herein can utilize multiple optimization to achieve very low RPOs, such as RPOs that are less than 30 seconds. Such multiple optimizations in at least one embodiment are described elsewhere herein and can include: write tracking; retaining records of the transient snapshots are recorded in the log until deleted; and retaining data to be replicated in cache until replicated.

Referring to FIGS. 8A and 8B, shown is a flowchart 500, 501 of processing steps that can be performed in at least one embodiment of the low RPO replication technique. The steps of FIGS. 8A and 8B describe a sequence of processing steps that can be performed based on the example of FIGS. 6 and 7.

In the step 502, a volume pair can be configured for asynchronous replication. The volume pair can be V1 and V2, where V1 is a source volume on a source storage system and where V2 is a target volume on a target storage system. The asynchronous replication can be performed by the RRF of the source system, where RRF can perform low RPO replication.

As described in more detail below, for example, in connection with FIGS. 11A and 11n, the step 502 can include i) creating a source pool of snapshot objects on the source system for use in connection with replication related snapshots of V1, and ii) creating a target pool of snapshot objects on the target system for use in connection with refreshing V2 with data changes from the replication related snapshots of V1. It should be noted that subsequent steps of FIGS. 8A-8B related to processing performed on the source system. Processing performed on the target system in at least one embodiment of the low RPO replication technique using the target pool of snapshot objects is described in more detail below, for example, in connection with FIGS. 13B-C and FIG. 14. From the step 502, control proceeds to the step 504.

At the step 504, RRF sends a command or request to create snap 1 of V1 resulting in recording entry 302a in the log. Additionally in at least one embodiment, the snapshot snap1 of V1 created can include i) selecting a snapshot object of the source pool of snapshot objects created for use with replication related snapshots of V1 in connection with the low RPO replication technique; and ii) using the selected snapshot object of the source pool to represent the snap1 of V1. In at least one embodiment, the step 504 can include performing processing including finalizing the selected snapshot object, for example, as described below in connection with FIG. 13A. From the step 504, control proceeds to the step 506.

At the step 506, the storage system receives writes W1 and W2 directed to V1 resulting in recording entries 302b-c in the log. From the step 506, control proceeds to the step 508.

At the step 508, RRF sends a command or request to create snap2 of V2 resulting in recording entry 302d in the log. The step 508 can include performing processing, for example, as described above in connection with step 504 but for snap2 rather than snap1 of V1. From the step 508, control proceeds to the step 510.

At the step 510, the storage system receives writes W3 and W4 directed to V1 resulting in recording entries 302e-f in the log. From the step 510, control proceeds to the step 512.

At the step 512, RRF computes the list or set of changed locations to V1 during the replication cycle or tracking session with tracking ID=ID1 thereby denoting the replication cycle between snap1 of V1 and snap2 of V1. RRF can determine the list by querying the cache for the list of tracked writes with tracking ID=ID1. In response, the cache can return the list of changed locations or LBAs of V1 written to or modified during the replication cycle between snap1 and snap2 where such tracked writes are tagged with tracking ID=ID1. In this example, the changed locations can be LBA A and LBA B of V1. RRF can determine a delta set of data differences or changes between snap1 and snap2 by reading from cache the contents of LBAs A and B of V1 as written during the corresponding replication cycle. The data changes of the delta set, including contents of LBAs A and B of V1 as written during the corresponding replication cycle, can be replicated from the source system to the target system and applied to the target volume V2. At this point, cache locations storing contents of LBAs A and B of V1 are no longer retained in cache and can be candidates for removal or eviction. From the step 512, control proceeds to 514.

At the step 514, RRF issues a command to delete snap1 of V1. The logger can respond to the delete command by invalidating and thus canceling the corresponding create snap1 command of record 302a. Invalidating snap1 302a allows writes W1 (302b) and W2 (302c) to be flushed. Invalidating snap1 302a allows the create snap1 record 302a and delete snap1 record 302g to be canceled so that flushing can simply ignore records 302a and 302g without involving mapper (e.g., without inducing write splits, and without creating or deleting metadata for the snapshot or writes W1, W2).

In at least one embodiment in accordance with the techniques of the present disclosure, snap1 of V1 can be represented using the selected snapshot object of the source pool of snapshot objects created for use with replication related snapshots of V1 in connection with the low RPO replication technique. In at least one embodiment, invalidating snap1 of the step 514 does not delete a snapshot object used to represent the snap1 of V1. Rather in at least one embodiment, invalidating of the step 514 can include generally preparing performing processing to prepare snap1's corresponding object of the pool for reuse, for example, as described in more detail below in connection with FIG. 13A. In at least one embodiment, the step 514 can include RRF issuing a command to cleanup the extent of the snapshot object denoting snap1 where, upon completion of cleaning the snap object's extent, the snapshot object of the source pool becomes clean in order to be reused again in connection with a subsequent replication related snapshot of the low RPO technique. From the step 514, control proceeds to the step 516.

At the step 516, RRF sends a command or request to create snap 3 of V1 resulting in recording entry 302*h* in the log. In at least one embodiment, the step 516 can include selecting another snapshot from the source pool and using the selected snapshot object to denote snap3 of V1. The step 516 can include performing processing, for example, as described above in connection with step 504 but for snap3 rather than snap1 of V1. From the step 516, control proceeds to the step 518.

At the step 518, the storage system receives write W5 directed to V1 resulting in recording entry 302*i* in the log. From the step 518, control proceeds to the step 520.

At the step 520, RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3, where such locations are associated with tracked writes having tracking ID=ID2. In this example, the changed locations can be LBA C and LBA D of V1. RRF can determine a delta set of data differences or changes between snap2 and snap3 by reading from cache the contents of LBAs C and D of V1 as written during the corresponding replication cycle. The data changes of the delta set, including contents of LBAs C and D of V1, can be replicated from the source system to the target system and applied to the target volume V2. At this point, cache locations storing contents of LBAs C and D of V1 are no longer retained in cache (e.g., are not guaranteed to remain in cache) and can be candidates for cache removal or eviction. From the step 520, control proceeds to the step 522.

At the step 522, RRF issues a command to delete snap2 of V1. The logger can respond to the delete command by invalidating and thus canceling the corresponding take snap2 command of record 302*d*. Invalidating snap2 302*d* allows writes W3 (302*e*) and W4 (302*f*) to be flushed. Invalidating snap2 302*d* allows the records 302*d* and 302*j* to be canceled so that flushing can simply ignore records 302*d* and 302*j* without involving mapper (e.g., without inducing write splits, and without creating or deleting metadata for the snapshot or writes W3,W4). In at least one embodiment, the step 522 can perform processing similar to that as described above, for example, in connection with the step 514 with the difference that the snapshot object invalidated represents snap2 and the snapshot object is not deleted. Rather as described elsewhere in more detail the snapshot object denoting snap2 can have its corresponding extent cleaned as part of processing performed to make the snapshot object of the pool available for reuse.

In at least one embodiment, the alternative asynchronous replication technique or mode can be the legacy snapshot difference technique discussed in more detail elsewhere herein that does not perform the optimizations of the low RPO replication technique. In at least one embodiment, the legacy snapshot difference technique does not consume or use write tracking memory that is consumed or used in connection with the low RPO replication technique or mode.

In at least one embodiment with the legacy snapshot difference technique, the snapshot difference can be determined between successive two snapshots that have been created and thus flushed from the log to mapper. In this manner with the legacy snapshot difference technique, metadata has been created by mapper for the two transient snapshots and any writes applied to the source volume can result in performing write split processing as noted elsewhere herein that includes allocating/creating one or more new metadata pages for use with the snapshots as writes are applied to the source volume. The legacy snapshot difference technique can include determining the data differences between the two successive snapshots by traversing the metadata pages corresponding to each snapshot. Thus the legacy snapshot difference technique is generally more time consuming than determining the difference between two successive snapshots using the tracked writes in the low RPO technique. In at least one embodiment, the legacy snapshot technique or alternative technique performed can be expected to consume less cache resources and/or log resources than the low RPO technique. With the legacy snapshot difference technique, deleting the transient or replication related snapshots can also be more time consuming and can include performing expensive metadata page updates and/or deletion of metadata pages.

It should be noted that the low RPO replication technique and legacy snapshot difference technique can both generally determine the differences or changes between successive snapshots of a volume. However, as discussed herein in at least one embodiment, the low RPO replication technique uses resources, such as the write tracking cache, and performs optimizations, such as using transient snapshots based on records retained in the log, that are otherwise omitted by the legacy snapshot technique such that the low RPO replication technique is able to achieve much lower RPOs than the legacy snapshot technique.

Thus in at least one embodiment, the low RPO replication technique can provide for much lower RPOs due to the optimizations and corresponding additional resource consumption. In contrast, the alternative asynchronous replication technique such as the legacy snapshot difference technique may not be able to provide such low RPOs but the alternative technique may also consume lesser amounts of system resources such as cache and/or log resources in comparison to the low RPO replication technique. In at least one embodiment, the alternative asynchronous replication technique can be the legacy snapshot difference technique that does not use or consume the write tracking cache or memory, and where the write tracking cache or memory is consumed and used by the low RPO replication technique.

What will now be described are additional details and features that can be performed in at least one embodiment in accordance with the techniques of the present disclosure.

In at least one embodiment, storage objects, such as volumes, logical devices, snapshots, and the like can each be created as a file object or file of a file system where the file can have a corresponding inode and one or more associated extents each of which are mapped to a corresponding portion of a global address space, also referred to as a file system (FS) logical address space. The foregoing is illustrated in more detail in connection with FIGS. 9 and 10 discussed below.

Figure 9:
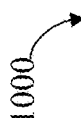
FIGS. 9 and 10 are examples illustrating representations of a storage object in at least one embodiment in accordance with the techniques of the present disclosure.

Referring to FIG. 9, shown is an example 1000 illustrating a storage object 1001 that may be used in connection with an embodiment in accordance with the techniques herein. The storage object 1001 can be, for example, a volume or LUN, or a snapshot of a volume or LUN. The snapshot can be, for example, a replication related snapshot used in connection with asynchronous replication techniques such as the low RPO replication technique. The example 1000 includes the storage object 1001 implemented as file 1004 on file system 1002. The storage object 1001 may be, for example, a volume or LUN, or a snapshot of a volume or LUN having a logical address space as denoted by 110. In at least one embodiment, element 1001 can denote a 100 GB LUN or snapshot of a volume or LUN implemented using file 1004 whereby the file 1004 is a 100 GB file. In this manner, a relative file offset in the file 1004 corresponds to a logical address or offset in the logical address space 1010 of the LUN 101. Consistent with discussion elsewhere herein, physical storage for the LUN may be allocated in chunks of any suitable size in an on-demand manner. For example, the first time there is a write to a target logical address of the thin LUN's logical address space, the physical storage for the target logical address may be allocated and mapped to the thin LUN's logical address space. For example, a block of physical storage (at which the write data is stored) may be mapped to a particular logical address, offset or location of the LUN's logical address space.

In at least one embodiment in accordance with the techniques herein, the file system 1002 may be a UNIX-style file system. In such a file system, an index node (inode) is a data structure used to represent a filesystem object, such as a directory or file 1004. In connection with LUN 1001 implemented as file 1004, the inode 1006 for the file 1004 stores metadata (MD) about the file 104 such as various file attributes and information. Generally, each inode associated with a particular file system object stores attributes and information about the file system object. For example, in at least one embodiment, each inode, such as inode 1006, may be structure including an inode number 1006a, an object type 1006b, a family identifier (ID) 1006c, object extent location 1006d, and possibly other information.

The inode number (#) 1006a of the structure 1006 associated with the file 1004 may be unique with respect to other inode numbers of other inode structure instances. A different inode number may be associated with each different file system object. In this manner, an inode number may be used to uniquely distinguish among different inodes and file system objects.

The object type 1006b may denote the particular type of file system object associated with the inode structure 1006. For example, as noted elsewhere herein, inode types in one embodiment may include a file and a directory. In this example 1000, the inode 1006 is of type file denoting the file 1004 used to implement the LUN 1001 as a file system object in the file system 1002.

The family ID 1006c may be a unique ID associated with the LUN and all its associated related logical objects or related file system objects. For example, in at least one embodiment, a snapshot of LUN 1001 may also be implemented as a second different file, file 2, in the file system 1002. Although not illustrated in FIG. 9, the inode for the file2 may include a different inode number than inode 1006 (associated with file 1004) and the inode for the file 2 may also include the same family ID as the inode 1006.

The object extent location 1006d may be a logical address location or offset in the file system 1002's logical address space denoting the starting or base logical address for the file system object. In at least one embodiment, the element 1006d can denote the starting logical address of a corresponding extent, such as a data extent, for the corresponding file system object 1004 where logical addresses of the extent can be used for storing content or data of the file system object 1004.

The element 1030 may denote the entire logical address range of the file system 1002. In at least one embodiment, the size of 1030 of the FS or global logical address space can be 8 exabytes. In at least one embodiment, the logical address range 1010 of the particular file system object 1004 implementing the LUN 1001 may map to a corresponding portion or extent 1030a of the file system logical address range 1030. The starting or base address for LBA 0 of the LUN 1001 may map to a corresponding base or starting address, such as N, within 1030. In this case, the LUN's logical address space 1010 is mapped to corresponding FS (file system) logical addresses N through M−1, where M denotes the last logical address in the LUN's LBA range 1010. In such a case, any LBA of the LUN 1001 may be mapped to a corresponding logical address in the file system logical address space 1030 by adding the based logical address N. Each particular file system (FS) logical address in 1030 may be mapped, using the MD (metadata) structure 108, to the data block locations storing the contents for the FS logical address. The data block locations may denote the allocated physical storage data blocks (DBs) 1020 storing content for a FS logical address, such as for a FS logical address in the portion 1030a for the LUN 1001.

In at least one embodiment, allocating an extent 1030a can include reserving the corresponding portion of the FS logical address space 1030 for a corresponding storage object 1001.

The MD mapping structure 1008 may include multiple layers of MD nodes or pages that ultimately map to data blocks (DBs) (e.g., physical storage locations) including data or contents. In at least one embodiment, the structure 1008 may be a multiple layer mapping structure accessed to convert a logical address of the file system 1002 (and thus of the file 1004 and LUN 1001) to a physical address of a data block of contents stored at the corresponding logical address. In at least one embodiment, the structure 1008 may include multiple levels or layers of MD nodes or MD pages arranged in a hierarchy such as described, for example, in connection with the mapping information (such as the mapping information of FIG. 2D).

In connection with the LUN 1001 in at least one embodiment, the first time there is a write to an LBA of the LUN's logical address space 1010, there is no existing data block or physical storage mapped to the LBA. As a result, in response to the first write to the LBA, physical storage in the form of a data block may be allocated and mapped to the LUN's logical address space. In this manner, the structure 1008 may map to DBs in a dynamic manner as storage is allocated responsive to first writes to LBAs in the logical address space 1010 of the LUN 1001.

Figure 10:
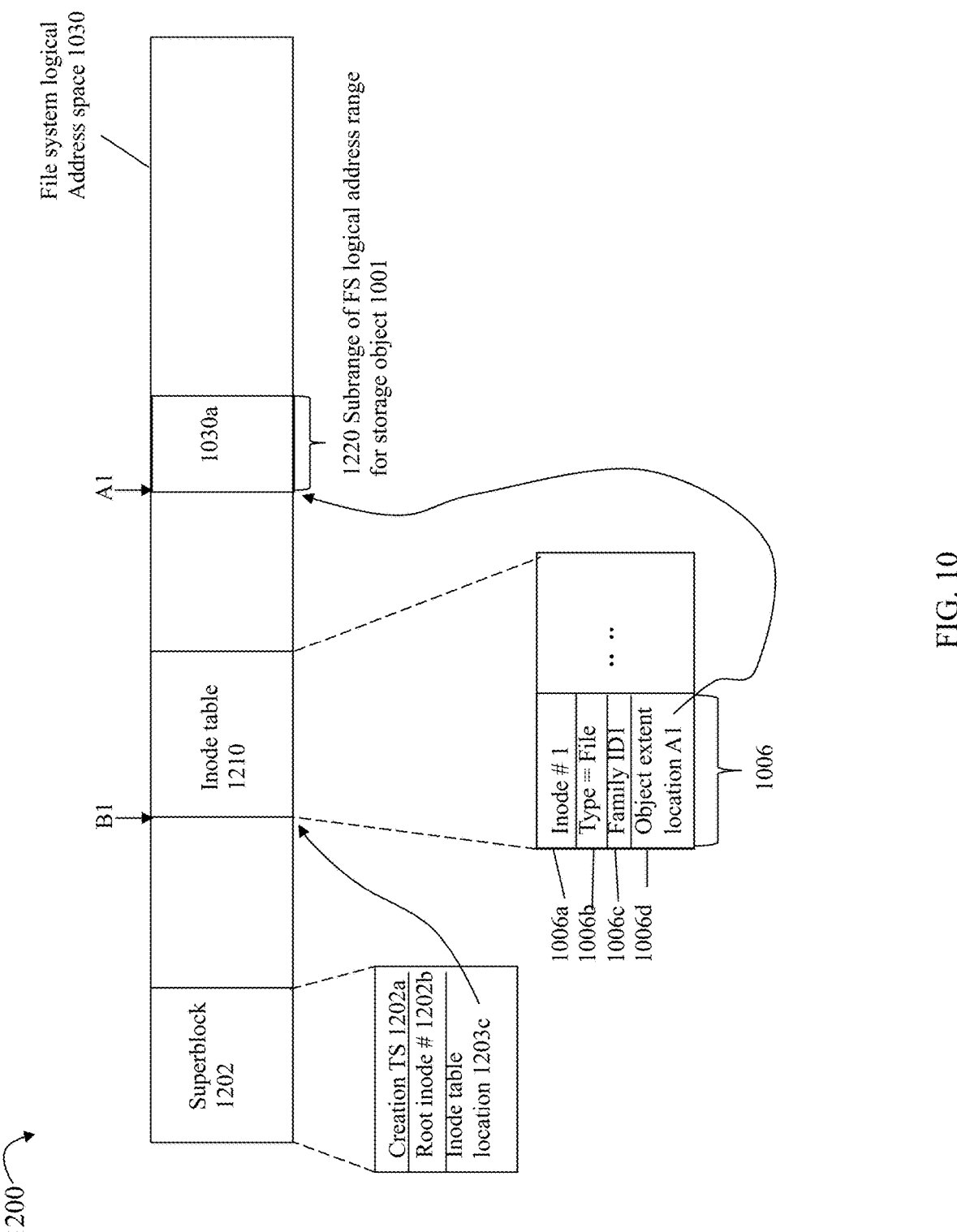

Referring to FIG. 10, shown is an example 1200 of a logical address space of a file system, such as file system 1002 of FIG. 9, in at least one embodiment in accordance with the techniques of the present disclosure. The example 1200 illustrates that the FS logical address space 1030, such as for the file system 1002, may include address space offsets or locations mapped to various structures of the file system 1002.

The example 1200 illustrates in more detail various structures that may be mapped to the FS logical address space 1030 of FIG. 9. The FS logical address space 1030 may include a superblock structure 1202 including various information about the file system. For example, the superblock 1202 may include a creation timestamp (TS) 1202a denoting when the file system is created, a root inode number 1202b associated with the file system's root directory, an extent or offset 1202c, or more generally, a logical address within the FS address space 1030 of where the inode table 1210 is stored. In this example, the entry 1202c indicates that the inode table 1210 is stored at logical address, offset or location Bi in the FS logical address space 1030.

The inode table 1210 may be a table with an entry for each inode structure, such as the structure 1006. As illustrated in the example 1200, the structure inode 1006 is for the LUN 1001 implemented as the file 1004 of the file system 1002. Although not explicitly illustrated, the inode table 1210 may also include an entry of the inode structure for the root inode #1202b. The inode structure 1006 includes an inode number (#) 1 1006a, has an object type 0 of file (1006b), has a family ID 1006c of "family ID1", and has an object extent location 1006d of A1. In this example, element 1006d indicates that the base or starting offset (e.g., logical address) within the FS logical address space for LBA 0 of LUN 1001 is A1. Element 1030a can denote an extent corresponding to the logical address space of LUN 1001 having a base logical address of A1 whereby the content or data of the LUN 1001 is stored at data blocks mapped to FS logical addresses in the portion 1030a.

Element 1220 denotes the subrange of the FS logical address space 1030, where the subrange maps to the logical address range of the LUN 1001 and also where the subrange maps to the data or contents for the LUN 1001. For example, assume DATA1 is stored at LUN 1001, LBA 0. To obtain the contents or data stored at LUN 1001, LBA 0, an embodiment in accordance with the techniques herein may determine the corresponding FS logical address for LUN 1001, LBA 0, which in this example is A1. The desired LBA or offset, 0 in this case, may then be added to the base address to determine the desired FS logical address of A1. As generally described above and in more detail elsewhere herein, the FS logical address A1 may then be mapped, using the MD mapping structure 108, to the data block including the data or content stored at the FS logical address A1.

In at least one embodiment, storage for the file system 1002 (e.g., FIG. 9) may be provisioned in physical storage portions which are then mapped into corresponding portions of the FS logical address space 1030. The file system 1002 may then allocate blocks of storage, such as for inodes, FS objects such as the LUN 1001, snapshots of the LUN 1001, and the like, as needed.

More generally, an extent corresponding to a logical address space portion of the FS logical address space 1030 can be mapped to storage for storing any suitable data or content. For example with reference to element 1006, one or more additional extents can be included in the inode table 1210 and associated with the inode #1 1006a and its corresponding file 1004 denoting the corresponding storage object 1001, such as the LUN or volume, snapshot of a LUN or volume, and the like. For example in at least one embodiment, an additional extent can be allocated and associated with a corresponding storage object 1001 where the additional extent can include attributes, characteristics, and/or other information about the storage object 1001.

In at least one embodiment, allocating an extent 1030a can include reserving the corresponding portion of the FS logical address space 1030 for a corresponding storage object 1001. For example, an extent that is a data extent can be allocated in connection with a storage object 1001 that is a volume or LUN having a corresponding size or storage capacity C1. As such, the size of the extent denoting the data extent for the logical addresses of the storage object 1001 can be equal to C1. As another example, an extent that is a data extent can be allocated in connection with a storage object 1001 that is a snapshot of a volume or LUN having a corresponding size or storage capacity C2. C2 can be equal to the storage capacity or size of the volume or LUN. As such, the size of the extent denoting the data extent for the logical addresses of the storage object 1001 representing the snapshot can also be equal to C2.

In at least one embodiment, a low RPO replication session can be configured and enabled for a volume pair (V1, V2) to perform the optimizations of the low RPO replication technique, where V1 is the source volume and V2 is the target volume, and where snapshots are taken of the source volume V1 and replicated and applied to the corresponding target volume V2. In at least one embodiment, a pool of snap objects can be preallocated and used on a source system or site that includes V1, and another pool of snap objects can be preallocated and used on a destination or target system or site that includes V2.

Consistent with other discussion herein in at least one embodiment, asynchronous replication using the low RPO replication technique can include taking periodic replication related snapshots or snaps (sometimes also referred to as RPO snapshots (snaps) or transient snaps) of V1, transferring the differences (e.g., data changes or differences) between each pair of two successive snapshots of V1 to the target or destination site, and applying the data changes or differences to V2 of the target site. Depending on the context herein, usage of the terms snaps or snapshots can sometimes refer to replication related or transient snapshots and associated snapshot objects.

In at least one embodiment, creating a snapshot of a volume such as V1 can include: i) staging the snapshot, and ii) finalizing the snapshot. In at least one embodiment, staging the snapshot can include creating a corresponding snapshot or snap object. In at least one embodiment, creating the snapshot object can include: allocating a new inode structure, new inode number, and new extent for the snapshot; updating the superblock and/or inode table; and/or updating information about the parent volume V1 such as V1's inode structure, for example, to reference or identify the parent volume's snapshot. Finalizing the snapshot in at least one embodiment can include quiescing or pausing I/Os to V1 such that V1 denotes a particular point in time copy of V1, and associating the snapshot object with the particular point in time copy of V1. Once the snapshot of V1 is finalized, the previously paused I/Os to V1 can be resumed. In connection with the foregoing, all associated processing of the staging can make the staging a relatively slow and time consuming operation.

In at least one embodiment with the low RPO replication technique, the RPO can be expected to be along the order of a few seconds. Therefore in at least one embodiment, the replication related snapshots for the low RPO replication can be expected to be created and deleted frequently on both the source and target sites. In at least one embodiment, the high frequency and associated high costs of creating the snap objects in connection with low RPO replication can pose a bottleneck for the low RPO replication. If the snap creation takes too long, the amount of writes to be tracked for each replication related snapshot increases thereby increasing the risk of running out of write tracking memory, putting more pressure on the write cache and log, and increasing the risk of flushing transient snapshots. All of the foregoing factors can make the low RPO replication technique unsustainable and lead to volumes going out of low RPO replication compliance where such volumes can have a larger than allowable or desirable target RPO.

In at least one embodiment, the creation of snapshots can occur in a predictable pattern while the volume is under low RPO replication. In at least one embodiment of the low RPO replication technique, there can be two replication related snapshots per volume—one snapshot used for the current synchronization (sync) or replication cycle and another second snapshot tracking the writes for the next sync or replication cycle. This predictable pattern can be leveraged to pre-perform the staging step of the snap creation and have snap objects preallocated, initialized, and ready to be finalized as then needed in connection with replication related snapshots. Such preallocated snapshot objects can be included in a pool. When the replication related snap is to be deleted, instead of deleting the corresponding snapshot object and releasing the inode and extent, the extent can be cleaned or initialized (e.g., whereby any existing data is removed, disassociated and/or unmapped from the logical address space portion of the extent) and generally prepared for re-use by replication in connection with a next replication related snapshot. In at least one embodiment for the snapshot object of a deleted snapshot, the inode and extent structures of the snapshot object may not be deallocated, deleted or released but rather can remain associated with the snap object in the pool and can generally be prepared for reuse with another not yet determined replication related snapshot.

In at least one embodiment, if the replication related snapshot is not flushed from the log, processing to clean the related snapshot object and extent can be almost instantaneous and the snap object can be immediately available for reuse. If the replication related snapshot is flushed from the log, the related snap object cannot be reused until the mapping component or mapper has completed its processing for the snap object. In at least one embodiment consistent with other discussion herein, if the snapshot is flushed from the log, the corresponding snapshot object can be associated with mappings or MD pages. In this case, cleaning for a flushed snapshot can include removing, deleting and/or disassociating the MD pages with the snapshot object and its extent. In at least one embodiment the mapping component can prioritize the cleaning of flushed transient or replication related snapshots and corresponding extents over other processing.

In at least one embodiment, a system can stage, and thus preallocate and initialize, a pool of snap objects for a volume when asynchronous replication is enabled for the volume. In at least one embodiment when a first replication related snapshot is flushed from the log and its associated cleaning of a corresponding first snapshot object takes a relatively long time, when a new snapshot object is needed for a next second replication related snapshot, processing can skip the first snapshot object (still being cleaned) and use another snapshot object from the pool for the second replication related snapshot. In this manner, the system can use a next available snapshot object from the pool, for example, if the foregoing scenario occurs due to a temporary increase in I/O workload or system background activities. In at least one embodiment, if the system is struggling to handle the incoming I/O load and ends up in a situation where most or all (e.g., at least a threshold number or percentage) of the pool's snap objects are busy being cleaned, processing can be performed to transition the corresponding volume's asynchronous replication session or configuration out of the low RPO replication mode or technique to an alternative asynchronous replication mode or technique, such as the legacy snapshot difference technique discussed elsewhere herein. Once the low RPO replication mode is disabled for the volume or where the volume is transitioned from the low RPO replication mode to the alternative asynchronous replication mode, the pool of snapshot objects for the volume can be deleted.

In at least one embodiment, there may be instances and conditions in the system that result in a transient or replication related snapshot of the low RPO replication technique being flushed from the log despite best efforts to keep all such transient replication related snapshots of the low RPO replication technique in the log until deleted from the log without flushing. For example, if the amount of free or available space of the log is below a minimum, processing can be performed to increase the amount of free or available space of the log including flushing one or more transient replication related snapshot of the low RPO replication technique from the log. If the amount of free or available cache memory is below a minimum, processing can be performed to increase the amount of free cache memory including flushing one or more transient replication related snapshot of the low RPO replication technique from the log. Flushing a transient replication snapshot from the log may result in also flushing cached data of the snapshot from the log where such cache locations of the flushed cached data can now be free and available for reuse. Thus in at least one embodiment, one or more trigger conditions can occur that force one or more transient replication related snapshots of the low RPO technique to be flushed from the log thereby resulting in mapper performing the more expensive processing associated with creating the snapshot and its associated mapping information of MD pages. In at least one embodiment, no mapping information of MD pages is created for a snapshot until the snapshot is flushed from the log. Put another way, flushing a snapshot from the log includes creating its corresponding mapping information of MD pages. In this manner with the low RPO replication technique, retaining the replication related snapshot in the log and deleting the replication related snapshot from the log before it is flushed from the log results in no mapping information of MD pages being created and associated with the replication related snapshot. However, as may be needed, such replication related snapshots may be flushed from the log based, at least in part, on the amount of free resource (e.g., cache and/or log space) in a system.

Figure 11A:
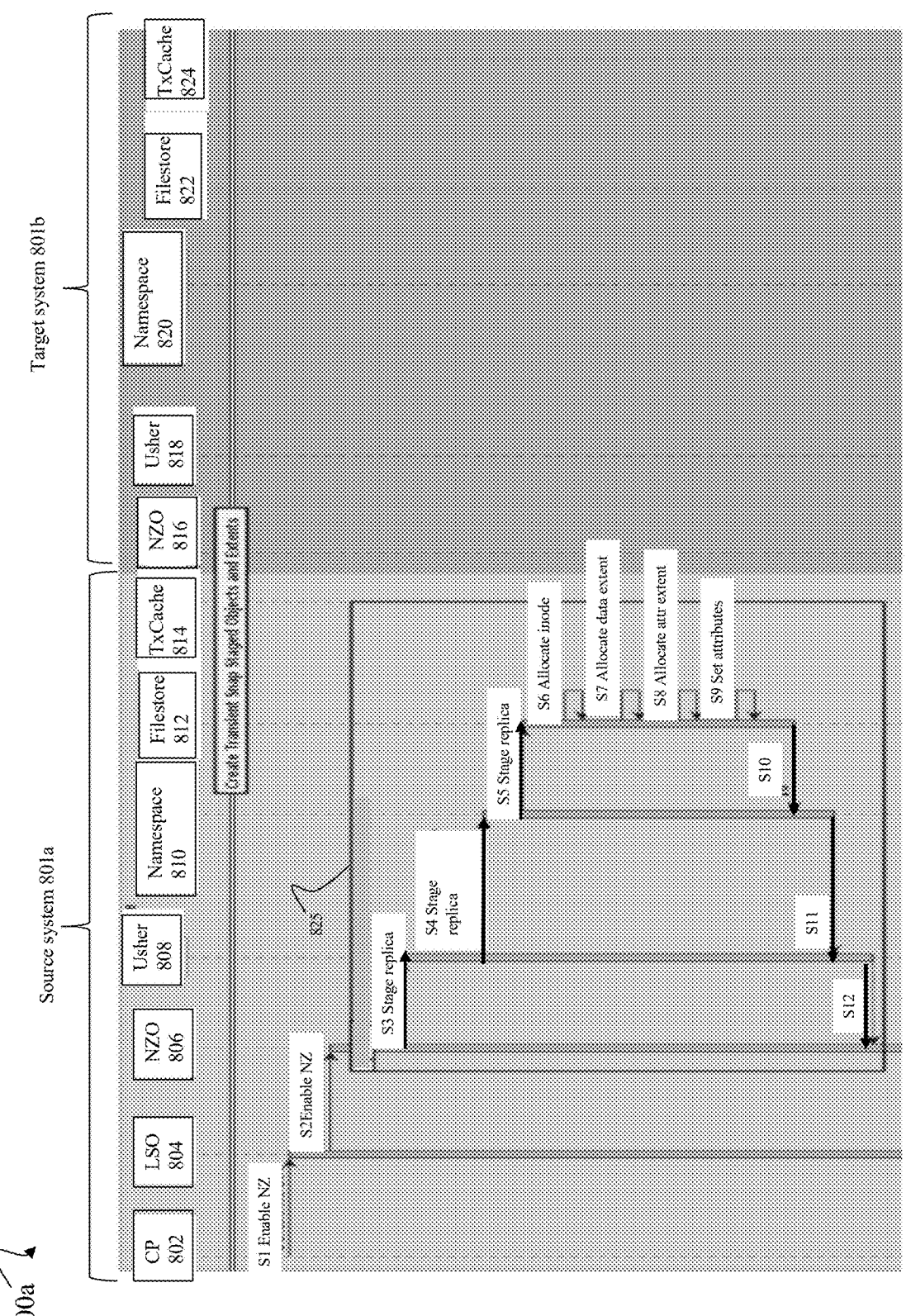
FIGS. 11A, 11B, 13A, 13B and 13C illustrate sequence diagrams of processing steps that can be performed in at least one embodiment in accordance with the techniques of the present disclosure.
Figure 11B:
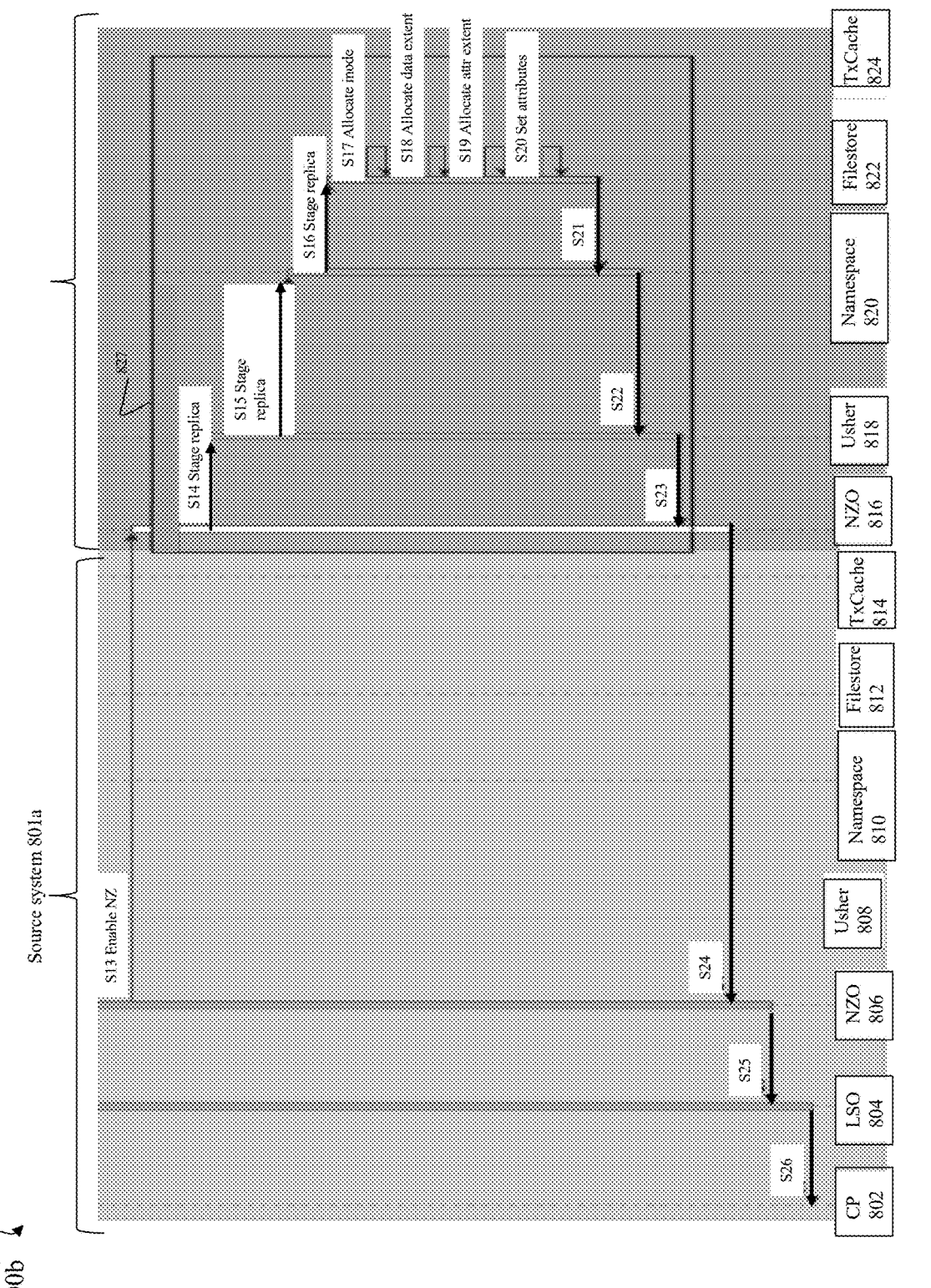

Referring to FIGS. 11A and 111B, shown is a sequence diagram 800a-b illustrating processing that can be performed in connection with creating of a first pool of snap objects on the source system or site and a second pool of snap objects on the target system or site in at least one embodiment in accordance with the techniques of the present disclosure. In particular the processing of FIGS. 11A-B illustrate the creation of the snap object pools in response to enablement of the low RPO replication mode for a configured asynchronous volume pair (V1, V2) where V1 is in the source system and V2 is in the remote target system.

The example 800a illustrates components of the source system 801a and target system 801b in at least one embodiment. The source system 801a can include the following components: CP or control path 802, LSO or layered services orchestrator 804, NZO denoting the low RPO replication orchestrator 806, usher 808, namespace 810, filestore 812, and Txcache 814 denoting a caching layer such as denoted by element 258 of FIG. 5B. The target system 801b can include an NZO 816, usher 8181, namespace 820, filestore 822 and Txcache 824. Thus the systems 801a-b can include different instances of at least some of the same components. Each instance of usher 808, 818 can generally be an I/O handler configured to receive I/O requests and relay them within the respective node, site and/or system. Each instance of NZO 806, 816 can be an orchestrator responsible for overseeing all replication sessions in the low RPO replication mode. In at least one embodiment, the components 804, 806, 808, 810, 812 and 814 can be included in the data path or I/O path of the source system 801*a*. In at least one embodiment, the components 816, 818, 820, 822 and 824 can be included in the data path or I/O path of the target system 801*b*.

In the step S1, the CP 802 can send a request to the LSO 804 to enable the near zero (NZ) or low RPO replication mode for the configured asynchronous volume pair (V1, V2). In response to S1, the LSO 804 can send S2 a request to the NZO 806 of the source system. In at least one embodiment, low RPO replication can be enabled in S1 for a particular asynchronous volume pair (V1, V2). In response to S2, the NZO 806 can initiate processing to create the pool of snapshot objects on the source system for V1. To create each snapshot object of the pool on the source system, the NZO 806 can send S3 a stage replica request to usher 808. In response to S3, usher can send S4 a stage replica request to namespace 810. In response to S4, namespace 810 can send S5 a stage replica request to filestore 812. In response to S5, filestore 812 can perform processing to create the snapshot object of the pool on the source system. In response to S5, filestore 812 can i) allocate S6 a node or snapshot object including allocating a corresponding inode structure; ii) allocate S7 a data extent for the snapshot object created; iii) allocate S8 an attribute (attr) extent for the snapshot object created; and iv) set S9 one or more attributes of the attr extent for the snapshot object. In at least one embodiment, setting the attributes in S9 can include setting one or more appropriate or suitable attributes for the snapshot object created such as to denote a snapshot type such as a transient replication related snapshot used in connection with the low RPO replication mode or technique. Once S6-S9 are completed, control can be returned S10 from filestore 812 to namespace 810, returned S11 from namespace 810 to usher 808, and returned S12 from usher 808 to NZO 806. In at least one embodiment, the NZO 806 can initiate processing of 825 to create each snapshot object of the pool on the source system. In at least one embodiment, the NZO 806 can initiate performing processing of 825 a first time for creating a first snapshot object of the source system pool; initiate performing processing of 825 a second time for creating a second snapshot object of the source system pool; and so on, for each snapshot object of the source system pool. In at least one embodiment, each of the foregoing sets of processing steps 825 can be performed in parallel to thereby create snapshots objects of the source system pool in parallel.

The example 800*b* illustrates processing that can be performed in connection with creating the target system pool of snapshot objects. After returning control in S12 to NZO 806, NZO 806 of the source system can send S13 a request to NZO 816 of the target system to enable NZ or low RPO replication for V2. In response to 513, the NZO 816 can initiate processing to create the pool of snapshot objects on the target system for V2. The steps S14-S23 as performed on the target system can be respectively similar to processing performed in the steps S3-S12 on the source system.

To create each snapshot object of the pool on the target system, the NZO 816 can send S14 a stage replica request to usher 818. In response to S14, usher can send S15 a stage replica request to namespace 820. In response to S15, namespace 820 can send S16 a stage replica request to filestore 822. In response to S16, filestore 822 can perform processing to create the snapshot object of the pool on the target system. In response to S16, filestore 822 can i) allocate S17 a node or snapshot object including allocating a corresponding inode structure; ii) allocate S18 a data extent for the snapshot object created; iii) allocate S19 an attribute (attr) extent for the snapshot object created; and iv) set S20 one or more attributes of the attr extent for the snapshot object. In at least one embodiment, the attributes set S20 can include setting one or more appropriate or suitable attributes for the snapshot object created such as to denote a snapshot type such as a transient replication related snapshot used in connection with the low RPO replication mode or technique. Once S17-S20 are completed, control can be returned S21 from filestore 822 to namespace 820, returned S22 from namespace 820 to usher 818, and returned S23 from usher 818 to NZO 816. In at least one embodiment, the NZO 816 can initiate processing of 827 to create each snapshot object of the pool on the target system. In at least one embodiment, the NZO 816 can initiate performing processing of 827 a first time for creating a first snapshot object of the target system pool; initiate performing processing of 827 a second time for created a second snapshot object of the target system pool; and so on, for each snapshot object of the target system pool. In at least one embodiment, each of the foregoing sets of processing steps 827 can be performed in parallel to thereby create snapshots objects of the target system pool in parallel.

Following S23, the NZO 816 of the target system can return S24 control to the NZO 806 of the source system. Control can be further returned S25 to the LSO 804, and returned S26 to the CP 802.

Consistent with other discussion herein in at least one embodiment, creating a snapshot can generally be performed in two phases, stages or parts—i) a staging phase and ii) a finalizing or final phase. In the staging phase, processing is performed to create the snapshot object which generally includes allocating or creating all persistent structures. In at least one embodiment, the staging phase can include allocating a new inode structure and new extent for the snapshot object being created. Finalizing the snapshot in the final phase can create the actual replica or point in time copy of the parent volume for the snapshot. The staging phase can be the more time consuming of the phases in connection with snapshot object creating, for example, due to the locks that need to be acquired in connection with allocation of the various structures since such structures can be allocated from global resources used by many different processes. With reference back to FIG. 11A, the steps S3-S12 can be included in the staging phase where such steps S3-S12 are performed to stage or create each object of the pool of snapshot objects on the source system for V1 prior to an actual demand or request for a snapshot object for use with a replication related or transient snapshot in connection with the low RPO technique. With reference back to FIG. 11B, the steps S14-S23 can be included in the staging phase where such steps S14-S23 are performed to stage or create each object of the pool of snapshot objects on the target system for V2 prior to an actual demand or request for a snapshot object for use with a replication related or transient snapshot in connection with the low RPO technique.

In at least one embodiment, the source system pool of snapshot objects used for a particular V1 can have a lifetime or duration corresponding to the time period of when the low RPO replication mode or technique is performed or enabled for V1, such as when enabled for the configured asynchronous volume pair (V1, V2). Thus when the low RPO replication mode or technique is no longer enabled or being performed for the volume pair (V1, V2), the corresponding source system pool of snapshot objects for V1 can be deleted or removed.

In at least one embodiment, the target system pool of snapshot objects used for a particular V2 can have a lifetime or duration corresponding to the time period of when the low RPO replication mode or technique is performed or enabled for V2, such as when enabled for the configured asynchronous volume pair (V1, V2). Thus when the low RPO replication mode or technique is no longer enabled or being performed for the volume pair (V1, V2), the corresponding target system pool of snapshot objects for V2 can be deleted or removed.

In at least one embodiment for a volume pair (V1, V2) enabled for asynchronous replication with the low RPO replication technique or mode, successive replication related transient snapshots can be created for V1 where each such replication related transient snapshot is represented using a corresponding snapshot object of the source system pool. The corresponding snapshot object for a snapshot or snap of V1 can have a corresponding allocated data extent with an associated logical address range Range1, where Range1 can be equal to the storage capacity of V1 and thus also of the snap of V1. In a similar manner, successive replication related transient snapshots can be created for V2 where each such replication related transient snapshot is represented by a corresponding snapshot object of the target system pool. The corresponding snapshot object for a snapshot or snap of V2 can have a corresponding allocated data extent with an associated logical address range Range2, where Range2 is equal to the storage capacity of V2 and thus also of the snap of V2.

In at least one embodiment, if, for example, processing in connection with the low RPO technique determines that LBA 10 of V1 has changed between successive snapshots N and N−1, then snap N of V1 can include the changed or written content DD for the logical address LBA 10 of V1. In at least one embodiment, the data extent for snap N of V1 can include a logical address LA1 corresponding to the logical address LBA 10 of V1. LA1 can be mapped, by a chain of MD pages of the mapping information or mapping layer, to a corresponding physical address or location of data blocks containing the changed or written content DD of snap N of V1.

In at least one embodiment, description herein of cleaning an extent, such as a data extent, of a snapshot object of a pool can include disassociating or unmapping the extent from all mapping information or MD pages such that the logical addresses reserved for the extent are not associated with any mapping information and not associated with any corresponding content or data whereby the extent, such as the data extent, can be reused. In at least one embodiment, cleaning the extent of a snapshot object of a pool may not include deallocating and may not include returning the reserved corresponding logical address portion of the extent. Rather cleaning the extent of a snapshot object can result in removing any/all associated data or content of the extent's corresponding logical address portion without deallocating the extent's logical address portion. The cleaned extent and its logical address portion can remain associated with the snapshot object of the pool whereby the snapshot object of the pool is available for reuse in connection with a subsequent replication related snapshot.

Although the techniques of the present disclosure using a pool of preallocated and initialized snapshot objects are described with reference to the low RPO replication technique or mode for asynchronous replication, more generally, the techniques of the present disclosure using the pool of snapshots objects can also be utilized in connection with other asynchronous replication techniques and modes. However generally, a larger benefit can be realized in connection with asynchronous replication techniques such as the low RPO replication technique which include creating or taking replication related snapshots at a high frequency or rate due to the corresponding low RPO obtained.

In at least one embodiment, there can be one pool of snapshot objects created for each volume configured for asynchronous replication with the low RPO technique or mode enabled. The foregoing in at least one embodiment is based, at least in part, on customizations made to the snapshot objects of the pool that can vary with the particular volume. For example, consistent with other discussion herein, the logical address range size of the data extent of the snapshot object can be equal to the logical address range size of the particular volume. As such, each snapshot object of the pool can have an extent with a corresponding logical address range size equal to that of the corresponding volume. In at least one embodiment, for each volume pair (V1, V2) configured for asynchronous replication using the low RPO technique or mode, V1 can have a corresponding pool of preallocated snapshot objects on the source system including V1, and V2 can have a corresponding pool of preallocated snapshot objects on the target system include V2.

In at least one embodiment, processing can cycle through the snapshots of the pool such as in a sequential consecutive manner to determine the next snapshot object selected for use in connection with a replication related snapshot of a particular replication cycle. For example, each snapshot object of the pool can have an associated unique integer identifier (ID) of a sequence of consecutive integers. The sequence can have a number of integers or span an integer range corresponding to the number of snapshot objects of the pool. For example, consider a pool of 5 snapshot objects. Each snapshot object can be associated with or assigned a corresponding unique integer from the consecutive sequence of integers 0, 1, 2, 3, 4. In at least one embodiment, processing can use and reuse snapshot objects of the pool by repeatedly cycling through the consecutive sequence of integers of the snapshot objects from 0-4 until a free or available snapshot object is located. For example, assume that snapshot objects 0 and 1 were previously used or reused respectively for snapshots N and N+1. Subsequently for the snapshot N+2, processing can next attempt to use or reuse snapshot object 2. If the snapshot object 2 is unavailable or still in use, then processing can next attempt to use or reuse object 3, and so on, until a free snapshot object of the pool is located. Of course, an embodiment can place processing limits on the foregoing, for example, such as a maximum number of attempts to locate a free or available snapshot object of the pool. Consistent with other discussion in at least one embodiment, a snapshot object can be unavailable or in use if it is still being used in connection with processing for an associated snapshot. For example in at least one embodiment, one or more snapshot objects of the pool can be unavailable for reuse at a point in time when each such snapshot object is being processed by the mapper or mapping component such as when an associated snapshot has been flushed from the log. In this case when a replication related snapshot is flushed from the log as discussed herein as opposed to not being flushed from the log, mapping information of MD pages can be created for the flushed snapshot by mapper. As a result, cleaning the flushed snapshot's data extent by mapper can take additional time to remove or delete the associated mapping information of MD pages. As a result, the snapshot object of the pool for the flushed snapshot may not yet be available for reuse in connection with the next replication related snapshot whereby processing can further traverse or cycle through the pool for an available snapshot object based, at least in part, on the consecutive sequence of integers associated with the snapshot objects of the pool.

Figure 12A:
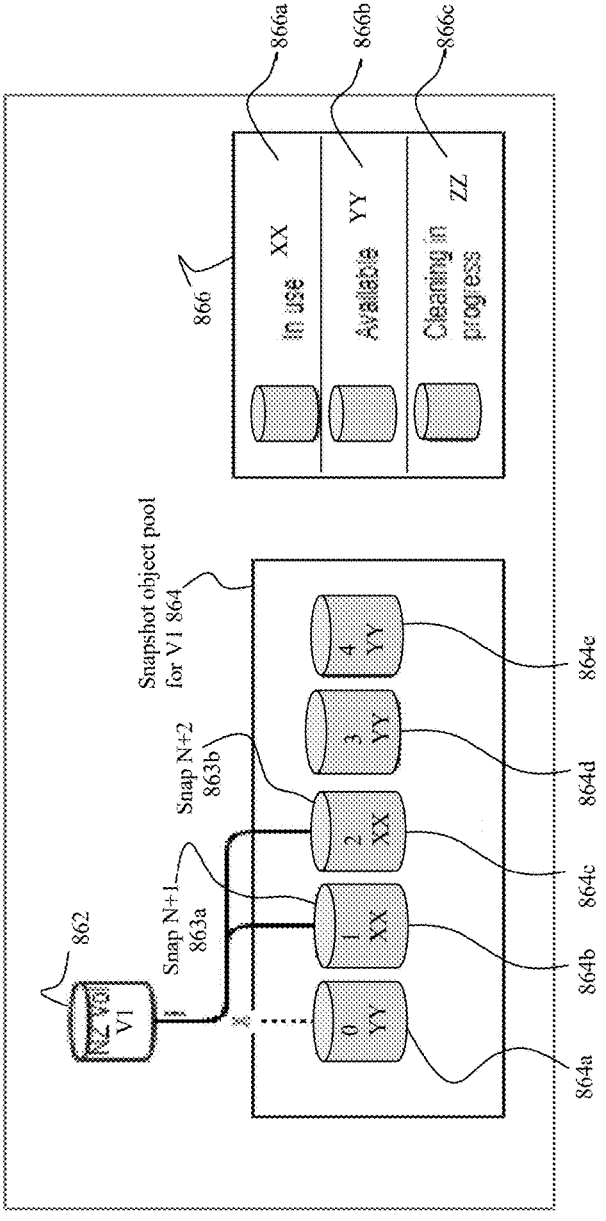
FIGS. 12A and 12B are examples illustrating use of a snapshot object pool in at least one embodiment in accordance with the techniques of the present disclosure.

Referring to FIG. 12A, shown is an example 860 illustrating processing and the state of the snapshot objects of the pool at a first point in time T1 in at least one embodiment in accordance with the techniques of the present disclosure.

In the example 860, processing described above, such as in connection with FIGS. 11A and 11B, can be performed to create the pool 864 of 5 snapshot objects 864a-e for the volume V1 862 that is enabled for low RPO replication. The element 866 denotes possible states 866a-c of each of the 5 snapshot objects 864a-e of the pool 864: in use XX 866a, available or free YY 866b, and cleaning in progress ZZ 866c. In at least one embodiment, the states of in use XX 866a and cleaning in progress ZZ 866c can generally be included in a broader state denoting unavailability of a snapshot object.

Prior to the time T1, replication related snapshot N can be taken and associated with the snapshot object 864a. Snapshot N of V1 can be deleted from the log without being flushed from the log whereby the corresponding snapshot object 864a can be processed for reuse and returned to the pool as denoted by the available or free state YY of the snapshot object 864a. The processing of the snapshot object 864a prior to returning 864a to the pool to make it available for reuse can include cleaning the extent associated with the object 864a. Cleaning the extent, in particular the data extent, can include unmapping the extent of the object 864a from any associated data or content. Cleaning the extent can include releasing or deleting any MD pages of mapping information used to map logical addresses of the extent to corresponding storage location of content stored at such logical addresses. Cleaning the extent and the processing of the snapshot object 864a to make it available for reuse can also include other processing. In this example 860, since snapshot N was deleted without being flushed from the log, no such mapping information or MD pages may have been created. As a result of no mapping information or associated MD pages, the object 864a can be returned to the pool quickly since the amount of time needed to clean the extent of object 864a is minimal.

In the example 860 at time T1, the snapshot difference or data changes between replication related snapshots N+1 (863a) and N+2 (863b) can be in the process of being transferred from the source system to the target system. Snapshot N+1 863a can be represented using the snapshot object 864b, and snapshot N+2 863b can be represented using the snapshot object 864c. As a result at time T1 in the example 860, the snapshot objects 864b-c can each have a corresponding state of in use XX. In at least one embodiment, the in use state 866a with respect to a snapshot object can indicate that the snapshot object is currently being used in connection with a replication related snapshot, such as snaphots N+1 and N+2, for content that is being transferred to the target system in a replication cycle (e.g., denoting the snapshot differences between snapshots N+1 and N+2).

At time T1, the remaining snapshot objects 864d-e can be free or available for use as denoted by YY.

Figure 12B:
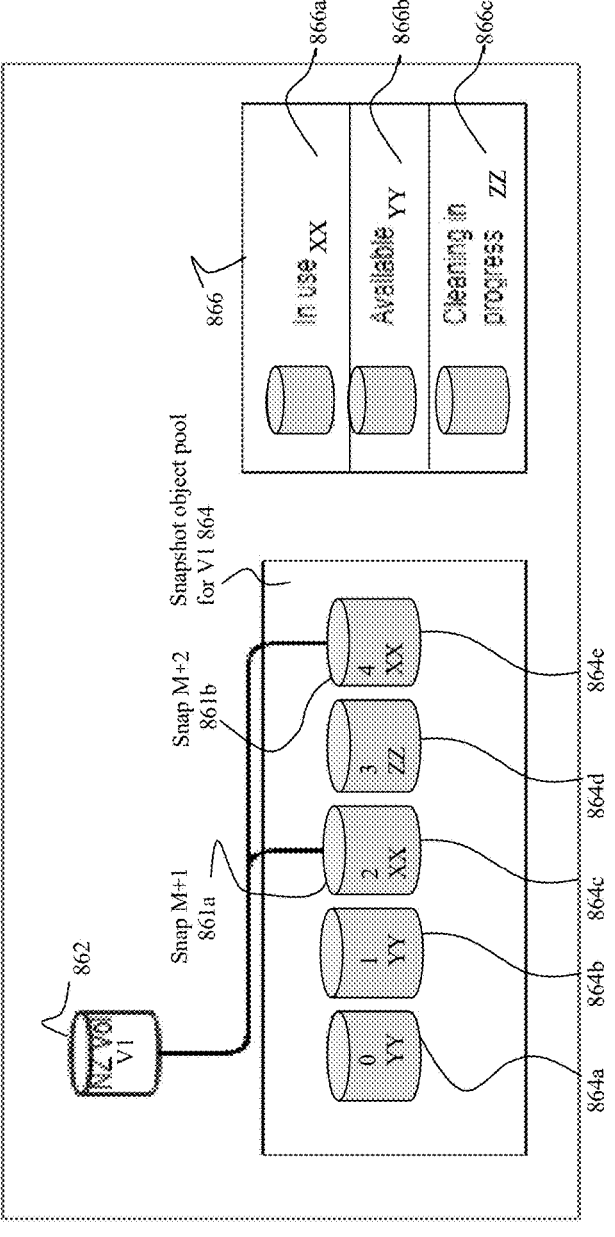

Referring to FIG. 12B, shown is another example 861 illustrating processing and the state of the snapshot objects of the pool at a second point in time T2 in at least one embodiment in accordance with the techniques of the present disclosure.

In the example 861, processing described above, such as in connection with FIGS. 11A and 11B, can be performed to create the pool 864 of 5 snapshot objects 864a-e for the volume V1 862 that is enabled for low RPO replication. The element 866 denotes possible states 866a-c of each of the 5 snapshot objects 864a-e of the pool 864: in use XX 866a, available or free YY 866b, and cleaning in progress ZZ 866c. In at least one embodiment, the states of in use XX 866a and cleaning in progress ZZ 866c can generally be included in a broader state denoting unavailability of a snapshot object.

At the time T2, snapshot objects 0 864a and 1 864b can be available YY. Prior to the time T2, another replication related snapshot Snap1 was represented using the snapshot object 864d and the snapshot Snap1 was flushed from the log. At time T2, the snapshot Snap1 has been deleted but the associated snapshot object 864d previously associated with the deleted Snap1 may still be in the process of being cleaned and generally processed to make the object 864d available for reuse so that 864d can later be returned to the pool in the available state YY. In this case since Snap1 was flushed from the log, the mapper or mapping component may have created mapping information of MD pages used to map logical addresses of the extent of the snapshot object 864d with corresponding storage locations. As a result, cleaning the snapshot object 864d's extent can include unmapping the extent of the object 864d from any associated data or content. Cleaning the extent of 864d can include deleting the MD pages of mapping information used to map logical addresses of the extent to corresponding storage location of content stored at such logical addresses. In this case, since the snapshot Snap1 was deleted after being flushed from the log, the mapping information of MD pages has been created. As a result cleaning the extent of the object 864d in the example 861 can include deleting such MD pages and mapping information prior to transitioning the object 864d to the available state YY. Thus at time T2 in the example 861, the object 864d can have an associated state of cleaning in progress ZZ to denote that the extent of object 864d is in the process of being cleaned and is thereby unavailable for reuse at time T2.

At the time T2, the snapshot difference or data changes between replication related snapshots M+1 (861a) and M+2 (861b) can be in the process of being transferred from the source system to the target system. Snapshot M+1 861a can be represented using the snapshot object 864c, and snapshot M+2 861b can be represented using the snapshot object 864e. When traversing or cycling through the pool objects based on increasing corresponding consecutive integer identifiers, processing can use snapshot object 864c (having the integer identifier 2) in connection with representing snapshot M+1 861a. Next, processing can examine the state of the next snapshot object 864d having the next consecutive integer identifier 3. It can be determined that object 864d is unavailable for use or reuse based on its corresponding state of cleaning in progress ZZ. As a result, processing then examines the next snapshot object 864e having the next consecutive integer identifier 4. It can be determined that at time T2 the object 864e is available based on its state YY such that i) 864e is then associated with the snapshot M+2 861b, and ii) the state of the object 864e is updated from YY to in use XX as denoted in FIG. 12B. Thus FIG. 12B denotes the state of the objects 864a-e at time T2 after locating and associating snapshot M+2 861b with the snapshot object 864e. It should be noted that the object 864d will be available for reuse after time T2 once the necessary processing to prepare the object 864d for reuse, including the cleaning of its extent, has completed.

In connection with FIGS. 12A and 12B, replication related snaps of V1 are associated with, and represented using, corresponding snapshot objects of the pool 864. As described above in connection with FIGS. 11A and 111B, each snapshot object of the source system pool and the target system pool can be staged where the staging phase can be performed for such pool snap objects. Subsequently, once a snapshot object of one of the pools is selected for use in connection with a next replication related snapshot, the selected snapshot object can be finalized whereby the final phase processing can be performed to reuse the snapshot object for the next replication related snapshot. What will now be described below is processing that can be performed in connection with finalizing and reusing pool snapshot objects in at least one embodiment in accordance with the techniques of the present disclosure.

Figure 13A:
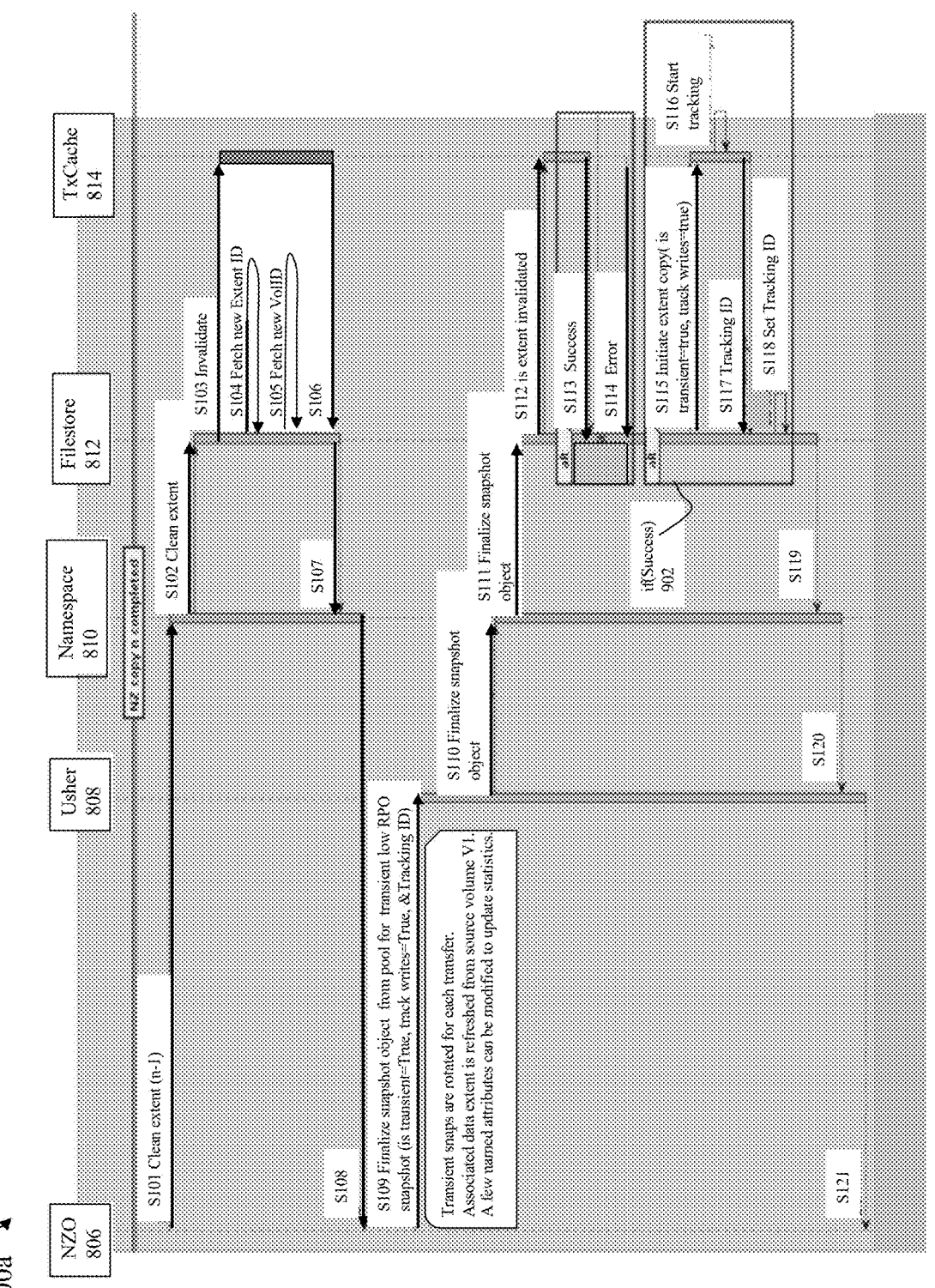

Referring to FIG. 13A, shown is an example 900a of a sequence diagram of processing that can be performed at the beginning of a new asynchronous replication cycle using the low RPO replication technique in at least one embodiment in accordance with the present disclosure.

The example 900a processing can be performed on the source system to reuse or use a snapshot object from the pool of snapshot objects of the source system previously created such as by performed processing of FIG. 11A. Assume snapshot object X1 of the pool represents snapshot N−1 of V1, and snapshot object X2 of the pool represents snapshot N of V1. Assume that the current replication cycle has completed transferring or replicating data changes between snapshot N−1 and snapshot N of V1 from the source to the target system.

As a result, the data of snapshot N of V1 has been copied to the target system and processing of FIG. 13A can be performed to prepare the snapshot object X1 currently representing snapshot N−1 for reuse. Put another way, the snapshot N−1 can now be deleted and its associated snapshot object X1 is no longer needed whereby the snapshot object X1 can be prepared for reuse and returned as a free available snapshot object to the pool.

In response to completing the replication cycle copying snapshot N of V1 to the target system, NZO 806 can send S101 a clean extent request to clean the extent of the snapshot object X1 which is associated with deleted snapshot N−1. NZO 806 can send S101 the clean extent request to namespace 810. In response, namespace 810 can send S102 a clean extent request to clean the extent of snapshot object X1 to filestore 812. Filestore 812 can send S103 a request to the Txcache 814 to invalidate the extent of the snapshot object X1. In response, Txcache 814 can perform processing to invalidate the extent and when completed can asynchronously return S106 to filestore 812. In at least one embodiment, such invalidation of the extent can include Txcache 814 communicating with the mapper or the mapping component clean the extent. As discussed elsewhere herein, the extent can be a data extent which can have associated mapping information of MD pages used to map logical address of the extent to corresponding storage location of content stored at corresponding logical addresses of the extent. Cleaning the extent can include deleting any such mapping information of MD pages associated with the extent. In at least one embodiment, whether there is any such mapping information can depend, at least in part, on whether the corresponding snapshot is deleted without being flushed from the log, or after being flushed from the log.

Filestore 812 can obtain a new extent ID in S104 and a new volume ID in S105. The same extent of the snap object X1 can be reused. However, in at least one embodiment, the new extent ID and new volume ID can be allocated and used in connection with the next associated snapshot. Put another way, S104 and S105 can preallocate the new extent ID and new volume ID that will be used in connection with the next snapshot of V1 associated with or represented using the snapshot object X1. In at least one embodiment, such new ID instances can be obtained for each new snapshot associated with the snapshot object X1 for ease of use in identifying particular snapshots such as, for example, in connection with debugging, space accounting, and the like. The IDs allocated in S104 and S105 are being preallocated, are not yet associated with any snapshot of V1, and will be associated with the next replication related snapshot of V1 corresponding to the snapshot object X1.

In response to Txcache 814 returning (S106) to filestore 812, filestore 812 can return (S107) to namespace 810. In response, namespace 810 can return (S108) to NZO 806.

NZO 806 can perform processing to locate or select an available or free snaphot object X3 from the pool of the source system for the next snapshot N+1 of V1. In at least one embodiment, the snapshot object X3 can be determined as described elsewhere herein (e.g., FIGS. 12A-B) such as by determining the next free or available snapshot object of the pool with the next consecutive integer ID. Generally, the ID of the last or most recently used snapshot object can be tracked such that the snapshot object having the next consecutive ID can be evaluated as a candidate. If the candidate snapshot object is unavailable, then processing can continue to evaluate the next candidate or snapshot object with the next consecutive ID. The foregoing can be repeated until an available or free snapshot object of the pool is identified. For example, assume there are 5 objects in the pool with corresponding integers IDs 0-4, where snapshot object X1 for snapshot N−1 can have the ID=1, and where snapshot object X2 for snapshot N can have the ID=2. In this case processing can examine the state of snapshot object X3 (ID=3) of the pool, and if snapshot object X3 is available, the final phase processing can be performed for the snapshot object X3 of the pool. Alternatively, if snapshot object X3 is unavailable, the search for an available snapshot object can continue by examining or evaluating snapshot object X4 having the ID of 4. Assume in this example that snapshot object X3 is the next available snapshot object. In this case, NZO 806 can send S109 a request to usher 808 to finalize the snap object X3 for the snapshot N+1 of V1.

It should be noted that the logic described above to determine the next available snapshot object of the source system pool to use for the next snapshot N+1 of V1 is not illustrated in FIG. 13A. In at least one embodiment, the above logic can be performed, such as generally prior to sending the finalize request in S109 to perform final processing of the selected snapshot object for the current replication related snap of V1.

In response to receiving the request S109, usher 808 can issue S110 a request to namespace 810 to finalize the selected snapshot object X3. Generally, finalizing the selected snapshot object includes performing the final phase described elsewhere herein to create the replica or point in time copy of V1 used as the V1 snapshot corresponding to snapshot object X3. In response to receiving the request S110, namespace can issue S111 a request to filestore 812 to finalize the selected snapshot object X3. Filestore 812 can issue a query S112 to Txcache 814 to determine whether the extent associated with snapshot object X3 is invalidated. Generally, if snapshot object X3's extent is invalidated, it means that the extent has been cleaned and the snapshot object X3 is now available for reuse.

At S109, it can be assumed that the selected snapshot object X3 is a valid snapshot object ready for reuse (e.g., has a clean extent). The query at S112 can be performed in at least one embodiment as an additional check to verify or validate the snap object X3 is ready for reuse. If Txcache 814 returns success in S113, it means that the snap object X3 is available and ready for reuse. If Txcache 814 returns an error in S114, it means that the snap object X3 is not available and not ready for reuse. For example, if S114 returns an error, it can indicate that cleaning is in progress for the extent of snap object X3. In at least one embodiment, the steps S115, S116, S117 and S118 of 902 can be conditionally performed only if success is returned in S113. Alternatively, if an error is returned in S114, the foregoing the steps S115, S116, S117 and S118 of 902 are not performed.

Thus the steps of 902 may only be performed if the selected snap object X3 has been verified as available and ready for reuse by returning success in S114.

In the step S115, filestore 812 issues a request to Txcache 814 to create a replica or point in time copy of the source volume V1 where such replica or point in time copy denotes the snapshot created and associated with snap object X3. S115 can initiate an extent copy(is transient=true, track writes=true) operation to copy the extent of the source volume V1 to the extent of snap object X3, thereby creating the point in time copy of V1 as reflected in the extent of snap object X3. In at least one embodiment, the source volume V1 can also have a corresponding extent representing logical addresses of V1 which are mapped to corresponding content of the point in time copy. Thus in at least one embodiment, the extent copy of S115 can include associating the logical addresses of snap object X3's extent with the same corresponding content of the point in time copy as denoted by V1's extent. Put another way, for each logical address LA of V1's extent mapped to corresponding content, LA of snap object X3's extent is also mapped to the same corresponding content.

In at least one embodiment, in response to the request of S115, processing performed can also include recording a corresponding record in the log to take or create a transient snapshot (e.g., such as illustrated in FIG. 6). Additionally, the request of S115 can indicate that writes should be tracked as denoted by "trackwrites=true" in S115. As such, the step S116 can be performed to start tracking writes for the particular volume V1 for the next snapshot N+2 in accordance with the low RPO replication mode or technique whereby such writes can be included in the snapshot N+2 of V1. Consistent with other discussion herein in at least one embodiment of the low RPO replication technique, a unique tracking ID can be associated with the particular volume and replication cycle or snapshot, such as V1 and snapshot N+2 of V1. The tracking ID can be used by the cache to track or record writes to V1 for use in connection with determining data changes or writes for snap N+2 of V1. In S117, Txcache 814 can return the tracking ID for the particular volume and snapshot instance, such as V1 and snapshot N+2. In S118, filestore can set the tracking ID for the particular volume and snapshot instance, such as V1 and snapshot N+2. Following S118, control can be returned (S119) from filestore 812 to namespace 810, returned (S120) from namespace 810 to usher 808, and returned (S121) from usher 808 to NZO 806.

If an error is returned in S113, the steps of 902 are not performed and control can proceed to S119 to return an error back up the call chain (S120, S121) to NZO 806. In response to receiving an error, NZO 806 can perform processing to select another snapshot object from the pool of the source system and can repeat processing beginning with S109 to finalize the new selected snapshot object for use with the current replication related snapshot.

What will now be described in more detail is processing that can be performed at the target system or site 801b in at least one embodiment in accordance with the techniques of the present disclosure using in connection with a volume pair (V1, V2) configured for asynchronous replication using the low RPO replication mode or technique. As discussed above such as in connection with FIG. 11B, a pool of snapshot objects can also be created and used on the target site or system.

During a replication cycle N, the source system determines the data differences between the two most recently captured snapshots of the source volume V1. These data differences are sent to the target system and written to a shadow snapshot (SS) of the target volume V2 in the replication cycle N while the target volume V2 maintains a consistent copy of the source volume V1 corresponding to the previous replication cycle N−1. Thus after writes or data changes of replication cycle N are written to SS of the target system but not yet applied to V2, i) V2 can be characterized as containing version N−1 of V1 with all writes or data changes applied up through and including replication cycle N−1, and ii) SS can be characterized as containing version N of V1 with all writes or data changes applied up through and including replication cycle N.

At the end of each replication cycle, the target volume V2 can be refreshed with the data from the SS so that V2 is also updated to contain the V1 data from replication cycle N. After the refresh, both V2 and SS denote identical point in time data copies, where both SS and V2 contain version N of V1 with all writes or data changes applied up through and including replication cycle N. In at least one embodiment, the refresh operation to refresh V2 can include internally performing steps similar to creating a new snapshot. Refresh processing can include essentially creating or taking a transient snapshot of SS that i) uses the SS as the parent or source of the snapshot, and ii) uses a preallocated snapshot object from the pool of the target system.

Refresh processing can include finalizing a selected snapshot object of the target system pool for SS to create a point in time copy of SS associated with the selected snapshot object. Put another way, the selected snapshot object of the pool is a replica or copy of SS. Refresh processing can include creating a replica or point in time copy of SS; and associating the point in time copy of SS with V2's inode structure. SS can have an associated extent E0 of logical addresses mapped to corresponding content at a point in time. In connection with processing to create the replica of SS, the extent E1 of a selected snapshot object OBJn of the target system snap object pool can be updated to map to the same corresponding content as E0 of SS. In this manner, the point in time copy of SS, as denoted using E0 of SS, can also be denoted by the extent E1 of the selected snapshot object OBJn of the target system pool of snap objects. In at least one embodiment, i) E1 can correspond to a point in time copy or version N of V1; and V2 can be associated with a second extent E2 corresponding to a prior point in time copy or version N−1 of V1. Refresh processing can include i) swapping E1 with E2 so that a) OBJn is associated with E2 (e.g., OBJn references E2 rather than E1); and b) V2 is associated with E1 (e.g., V2's inode references E1 rather than E2); and then ii) cleaning E2 now associated with OBJn whereby OBJn remains unavailable for reuse until the E2 cleaning is completed.

Thus in at least one embodiment, refresh processing can include i) defining and/or updating the extent E1 of OBJn to denote a snapshot or point in time copy of the SS extent corresponding to version N of V1, where E1 can then be associated with V2's inode; and ii) also deleting an old extent E2 which was previously associated with V2 and which corresponds to the version N−1 of V1. Since this refresh operation has similar characteristics to processing performed on the source system using the pool of snapshot objects for V1, a snapshot object pool of preallocated or staged snapshot objects can also be used in connection with refresh processing on the target system with the low RPO replication technique. The foregoing is described in more detail with reference to the example 900b-c of FIGS. 13B and 13C. The components 816, 818, 820, 822 and 824 can be included in the target system or site 801b as described above.

Figure 13B:
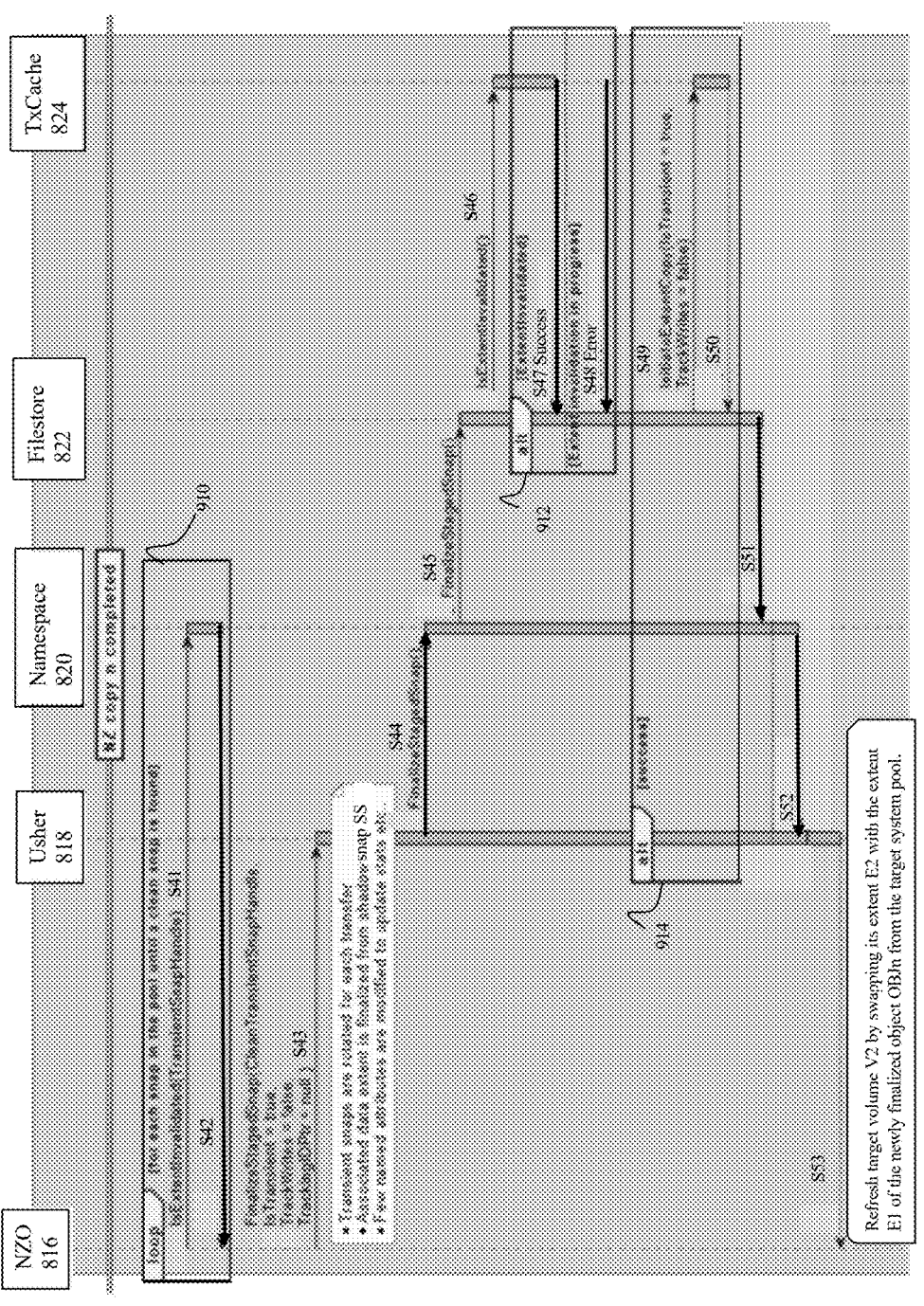
Figure 13C:
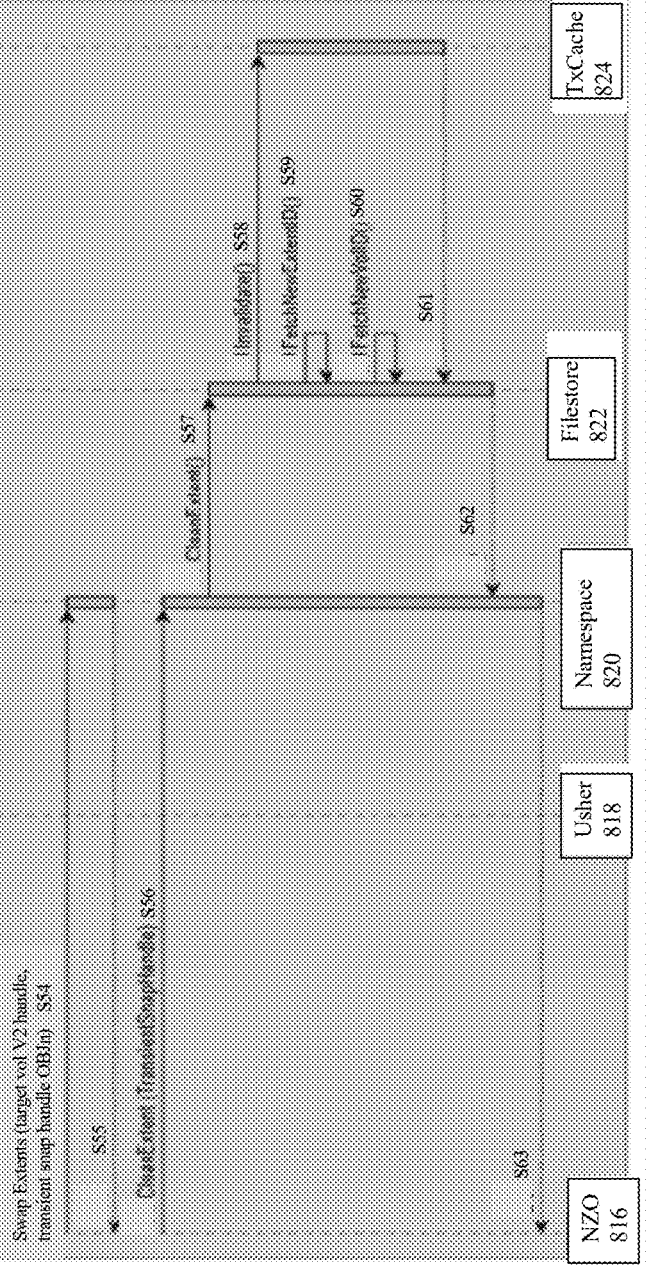

In at least one embodiment, the processing of FIGS. 13B and 13C can be performed in response to completing the copying of data changes or writes of sync or replication cycle N from the source system 801a to the target system 801b. The content or data changes of replication cycle N can be written to SS as described above. Subsequently, processing of FIGS. 13B and 13C can be performed. More generally, the processing of FIGS. 13B and 13C can be performed responsive to the target system receiving a complete set of data changes or writes for a replication cycle of the low RPO replication technique.

Referring to FIG. 13B, the processing of loop 910 can be performed for each snap object in the target system pool until an available snapshot object is identified. NZO 816 can issue S41 a request to usher 818 for a next candidate object from the target system pool to determine whether the candidate object is available or free for use. The step S41 request can be an is extent invalidated request similar to the request of S112 of FIG. 13A. The step S41 is a query as to whether the extent of the extent associated with the candidate snap object of the target pool is invalidated. Generally, if the candidate snap object's extent is invalidated, success can be returned (S42) meaning that the extent has been cleaned and the candidate snapshot object is now available for reuse. Otherwise, failure or error can be returned (S42) meaning that the candidate snap object is unavailable. Thus the processing of the loop 910 can include performing S41 for each next candidate snap object of the target pool until success is returned (S42). The snap objects of the target pool can have assigned consecutive integer IDs and can be traversed and reused in a manner similar to the source system pool of snap objects as described elsewhere herein, for example, in connection with FIGS. 12A-12B.

Once an available snap object OBJn of the target system pool is identified, processing can be performed to finalize OBJn from SS or shadow snap, where SS is a point in time copy of the target volume V2 including content from the most recently completed replication or sync cycle N. Finalizing (e.g., performing the final phase or stage) for OBJn commences with NZO 816 issuing S43 a request to usher 818 to finalize the snap object OBJn. In at least one embodiment, parameters of the finalize request S43 can include "istransient=true" denoting that the snapshot or replica of SS to be created is a transient snapshot. The finalize request S43 can also indicate not to track writes (e.g., track writes=false) and not to utilize a tracking ID (e.g., tracking ID Ptr=null). In response to receiving the request of S43, usher 818 can issue S44 a finalize staged snap or snapshot object to namespace 820. In turn, namespace 820 can issue S45 a request to finalize the stage snap or snapshot object OBJn to filestore 822. Filestore 822 can query S46 Txcache 824 as to whether OBJn's extent is invalidated using the is extent invalidated request. As discussed above, for example, in connection with 910 and S112 of FIG. 13A, Txcache 824 can return (S47) success if OBJn's extent is clean whereby OBJn is available and ready for reuse. Otherwise, Txcache 824 can return (S48) an error indicating that OBJn is unavailable such as due to OBJn's extent cleaning being in progress. The steps of 914 can be conditionally performed responsive to success being returned in S47 rather than an error in S48. If OBJn is available and ready for reuse (e.g., S47 returns success), then filestore 822 can send S49 an initiate extent copy request to Txcache 824 to create a replica or point in time copy of SS by performing an extent copy of SS's extent E0 to OBJn's extent E1. Consistent with discussion above, the initiate extent copy request of S49 results in the snap object OBJn being a replica or point in time copy of SS whereby the logical addresses of E1 of OBJn are all updated to map or point to the same corresponding contents as corresponding logical addresses of E0 of SS. Control can be returned (S50) back up the call chain in S51, S52 and S53.

If S48 returns an error rather than success in S47, 914 processing is not performed and the error can be returned back up the call chain in S51, S52 and S53.

Next, with reference to FIG. 13C, processing can be performed to refresh the target volume V2 by swapping its extent E2 with the extent E1 of the newly finalized snap object OBJn from the target system pool. NZO 816 can send S54 a request to namespace 820 to swap the foregoing extents. Once the foregoing extents are swapped so that V2 is now associated with E1 (rather than E2) and OBJn is now associated with E2 (rather than E1), control can be returned (S55) to NZO 816.

NZO 816 can issue a clean extent request (S56) to namespace 820 to clean the extent E2 now associated with OBJn, whereby E2 denotes the point in time copy or version N−1 of V2. Namespace 820 can issue (S57) a clean extent request to filestore 822. Filestore 822 can perform processing to invalidate and thus clean E2 by issuing an invalidate request S58 to Txcache to invalidate E2. The invalidate request of S58 can be similar to the invalidate request processing described in connection with S103 on the source system including deleting and disassociating any mapping information of MD pages of E2. When invalidating of E2 is completed, Txcache 814 can asynchronously return control (S61) to filestore 812. As part of cleaning E2, filestore 812 can issue requests S59 and S60 to respectively object a new extent ID and a new Vol ID. S59 and S60 can be similar respectively to S104 and S105 of FIG. 13A. Once control is returned in S61 to filestore 822, control can be returned back up the call chain in S62 and S63.

Figure 14:
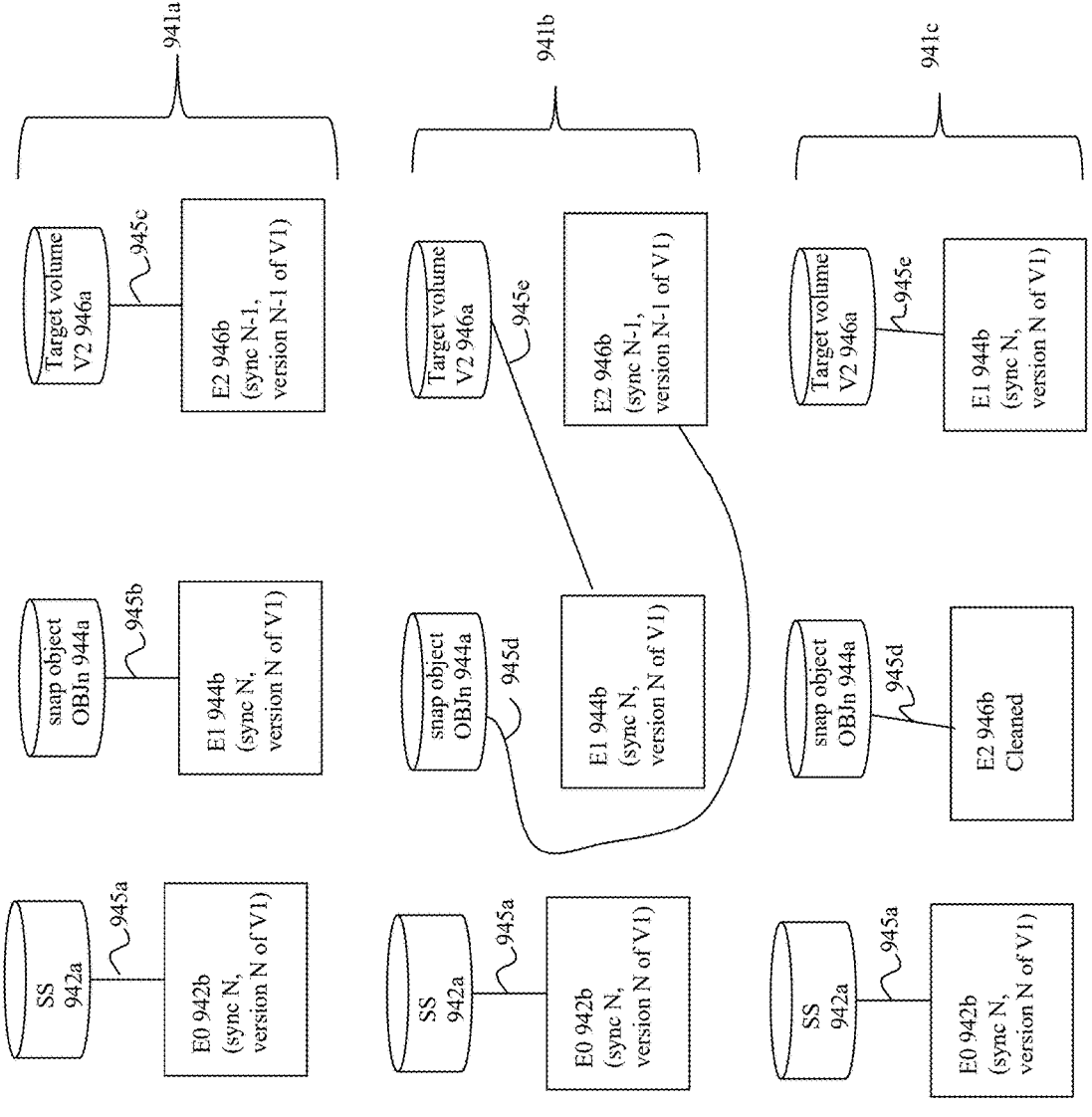
FIG. 14 is an example denoting various states of objects and structures on the target system in at least one embodiment in accordance with the techniques of the present disclosure.

Referring to FIG. 14, shown is an example 940 illustrating the state of the target system at various points in time in connection with processing of FIGS. 13B-C in at least one embodiment in accordance with the techniques of the present disclosure.

The element 941a can denote the state of components on the target system at a first point in time T11 after finalizing or completing the final phase processing for the selected snapshot object OBJn of the target system pool. In 941a, i) SS 942a can be associated (945a) with extent E0 942b representing sync N or version N of V1 (and thus version N of the target volume V2); ii) snap object OBJn 944a can be associated (945b) with extent 1 944b; and iii) the target volume V2 946a can be associated (945c) with extent E2 representing the sync N−1 or version N−1 of V1 (and thus version N−1 of V2).

With reference back to FIG. 13B, T11 as denoted by 941a corresponds to having completed processing of all steps of FIG. 13B whereby control has been returned in S53 to NZO 816. In particular, the extent copy of S49 which creates a replica or point in time copy of SS (using SS as the source) results in copying E0 942b to E1 944b so that the extents E0 942b and E1 944b denote the same point in time copy of SS corresponding to sync N or version N of the V1 (and thus version N of V2).

The element 941b can denote the state of components on the target system at a second point in time T12 subsequent to T11 after completing the swap extent processing of S54 of the refresh the target volume V2 with the newly finalized snap object OBJn from the target system pool. After swapping extents E1 and E2 as illustrated in 941b: i) the snap object OBJn 944a is associated (945d) with E2 946b; and ii) the target volume V2 is associated (945e) with E1 944b. Thus at time T11, the target volume V2 946a has a corresponding extent E1 944b denoting the sync N or version N of V1 (and thus version N of V2).

The element 941c can denote the state of components on the target system at a third point in time T13 subsequent to T12 after cleaning the extent E2 946b, and more generally, after completing processing of FIG. 13C whereby the snap object OBJn 944a is now available and ready for reuse.

In connection with the illustration and examples of FIG. 14, it should be noted that other structures have been omitted for the sake of simplicity. For example consistent with other discussion herein such as in FIG. 10, each storage object 942a, 944a and 946a can have an associated inode structure that references or points to a corresponding extent associated with the storage object. In FIG. 14, such inode structures are omitted for simplicity of illustrating the associations and relationships between storage objects and corresponding extents where each extent denotes a logical address range of a corresponding storage object.

What will now be described are flowcharts of processing steps that can be performed in at least one embodiment in accordance with the techniques of the present disclosure summarizing processing described above.

Referring to FIGS. 15A and 15B, shown is a flowchart 1100, 1101 of processing that can be performed in at least one embodiment in accordance with the techniques of the present disclosure.

At the step 1102, a request can be received at the source system to enable low RPO replication for a volume pair (V1, V2) configured for asynchronous replication. V1 can be a source volume of the source system. V2 can be a target volume of a target system. V1 and V2 can be configured to have i) the same storage capacity and ii) the same logical address range and thus same size logical address range. From the step 1102, control proceeds to the step 1104.

At the step 1104, processing can create a source pool of snapshot (snap) objects on the source system for use with taking transient or replication related snapshots of V1. Each snap object of the source pool has an associated extent that is a data extent with a logical address range R1 and size SIZE1 which correspond respectively to the logical address range and size of V1. Creating the source pool can include performing a staging phase for each snap object of the source pool. Staging a snap object SNAP1 of the source pool can include: i) allocating an inode, ii) allocating the extent, and iii) associating the inode with the extent. The extent can denote a reserved portion of a global logical address space used for the associated snap object SNAP1. The extent logical addresses can correspond to LBAs or logical addresses of a yet to be created replication related snapshot. From the step 1104, control proceeds to the step 1106.

At the step 1106, processing can create a target pool of snapshot (snap) objects on the target system for use with refreshing V2 with an updated version of V1 after completion of each replication cycle. Each snap object of the target pool has an associated extent that is a data extent with a logical address range R1 and size SIZE1 which correspond respectively to the logical address range and size of V2. Creating the target pool can include performing a staging phase for each snap object of the target pool. Staging a snap object of the target pool can include: i) allocating an inode, ii) allocating the extent, and iii) associating the inode with the extent. The extent can denote a reserved portion of a global logical address space used for the associated snap object. The extent logical addresses can correspond to LBAs or logical addresses of a yet to be created replication related snapshot. From the step 1106, control proceeds to the step 1108.

At the step 1108, a current replication cycle N may have completed where data changes or content of the current replication cycle N have been copied from the source to the target system. The replication cycle N can denote data changes, writes or differences between snap N of V1 and snap N−1 of V1, where snap N of V1 can denote the data changes copied in the current replication cycle. From the step 1108, control proceeds to the step 1110.

At the step 1110, in response to completing replication cycle N, processing can be performed to commence a new next replication cycle N+1. Processing performed on the source system can include preparing the source pool snapshot object SNAP1, denoting snap N−1 of V1, for reuse. Preparing SNAP1 for reuse can include cleaning the extent of SNAP1 including deleting any associated mapping information of MD pages. Once SNAP1 has been prepared for reuse (including completing the cleaning of its extent), SNAP1 can be made available for reuse in connection with replication related snapshots of V1 by setting its state to available.

In the step 1110, processing can be performed to select an available snap object OBJX from the source pool, where OBJX will be used to represent the next replication related snap N+1 of V1. OBJX can be a snap object of the source pool selected for use or reuse for snap N+1 of V1.

In the step 1110, processing can be performed to finalize the snapshot object OBJX for use with the next replication related snapshot N+1 of V1. Finalizing OBJX can include creating a replica or point in time copy of V1 and associating the replica of V1 with OBJX whereby the replica is the snapshot N+1 of V1.

In the step 1110, write tracking can be commenced for the next replication cycle and data changes to be included in the next replication related snapshot N+2 expected to be taken at a later point in time.

Referring to FIG. 16, shown is another flowchart 1300 of processing steps that can be performed in at least one embodiment in accordance with the techniques of the present disclosure. FIG. 16 includes steps that can be performed at the target system or site.

At the step 1302, the data changes of snap N of V1, and thus replication cycle N, are copied from the source to the target system and written to the shadow snap or SS. SS can denote a readable and writeable snapshot or point in time copy of the target volume V2, where SS can denote version N of V1. V2 can correspond to the prior version N−1 of V1 corresponding to the previous sync or replication cycle N−1. From step 1302, control proceeds to the step 1304.

At the step 1304, in response to completing the copying of the data changes of replication cycle N to SS, processing can be performed including: i) selecting an available snap object SNAP0 from the target pool; ii) finalizing SNAP0 by associating SNAP0 with a replica or point in time copy of SS; and iii) refreshing V2 using SNAP0, and thus the content or data of SS. SS can have an associated extent E0 denoting version N of V1. The target volume V2 can have an associated extent E2 denoting version N−1 of V1.

In the step 1304, finalizing SNAP0 can include updating SNAP0's extent E1 to denote the same point in time copy (version N of V1) as E0 of SS.

In the step 1304, refreshing the target volume V2 using SNAP0 can include swapping the extents of SNAP0 and V2. Swapping can include i) updating V2 to be associated with E1 (denoting the new version N of V1) rather than E2 (the older version N−1 of V1); and ii) updating SNAP0 to be associated with E2 (denoting the older version N−1 of V1) rather than E1 (denoting the new version N of V1).

In the step 1304, after refreshing, processing can be performed to generally prepare SNAP0 for reuse. Preparing SNAP0 for reuse can include cleaning E2 associated with SNAP0 to delete any associated mapping information of MD pages. Once SNAP0 is prepared for reuse, including completing the associated cleaning of E2, SNAP0 can be marked as available and can be reused in connection with subsequent replication cycles.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
receiving a request to enable a low RPO (recovery point objective) replication mode for a volume pair (V1, V2) configured for asynchronous replication, wherein V1 is a source volume of a source system and V2 is a target volume of a target system;
in response to receiving the request, creating a source pool of snapshot objects for use in connection with taking replication related snapshots of V1;
taking a plurality of replication related snapshots of V1, wherein for each of the plurality of replication related snapshots, said taking includes:
selecting a snapshot object from the source pool; and
finalizing the snapshot object for use with said each replication related snapshot, including creating a replica of V1 and associating the replica of V1 with the snapshot object selected from the source pool;
completing a plurality of asynchronous replication cycles each denoting a set of data changes to V1 determined with respect to two successive replication related snapshots of V1; and
for each of the plurality of asynchronous replication cycles, copying a set of data changes of said each asynchronous replication cycle from the source system to the target system and applying the set of data changes to V2.

2. The computer-implemented method of claim 1, wherein said selecting the snapshot object from the source pool includes:
reusing the snapshot object of the source pool wherein the snapshot object was previously used in connection with representing one or more prior replication related snapshots of V1.

3. The computer-implemented method of claim 1, wherein said completing the plurality of asynchronous replication cycles includes:
completing an asynchronous replication cycle N denoting a first set of data changes between snapshot N of V1 and snapshot N−1 of V1, wherein the snapshot N−1 of V1 is represented using a first snapshot object of the source pool; and
responsive to said completing the asynchronous replication cycle N, performing first processing to prepare the first snapshot object for reuse in connection with another subsequent replication related snapshot, including cleaning a first extent of the first snapshot object, wherein the first extent corresponds to a first logical address space of the first snapshot object and denotes content of a point in time copy corresponding to the snapshot N−1 of V1, wherein said cleaning the first extent includes deleting any mapping information of metadata (MD) pages which are associated with the first extent and used to map fist logical addresses of the first extent to corresponding first content stored at the first logical addresses.

4. The computer implemented method of claim 3, wherein said creating the source pool includes creating the first snapshot object comprising:
allocating a first extent; and
allocating a first index node (inode) structure that references the first extent, and wherein the first snapshot object is associated with the first inode structure that references the first extent, and wherein said first processing does not deallocate the first extent and does not deallocate the first inode structure so that the first extent and the first inode structure can be reused in connection with representing one or more subsequent replication related snapshots of V1.

5. The computer-implemented method of claim 4, further comprising:
determining that the first processing to prepare the first snapshot object for reuse has completed; and
responsive to said determining that the first processing has completed whereby the first snapshot object is ready for reuse, marking the first snapshot object as available for reuse in connection with representing a subsequent replication related snapshot of V1.

6. The computer-implemented method of claim 1, further comprising:
in response to receiving the request, creating a target pool of snapshot objects for use on the target system in connection with updating V2 to include the sets of data changes that are i) replicated in the plurality of asynchronous replication cycles from the source system to the target system, and ii) determined using a low RPO replication technique enabled by the low RPO replication mode.

7. The computer-implemented method of claim 6, wherein for each of the plurality of asynchronous replication cycles, performing second processing including:

writing the set of data changes of said each asynchronous replication cycle to a shadow snapshot on the target system.

8. The computer-implemented method of claim 7, wherein the plurality of asynchronous replication cycles includes an asynchronous replication cycle N, and the method includes:

writing a first set of data changes of the asynchronous replication cycle N to the shadow snapshot, wherein after said writing the first set of data changes, i) the shadow snapshot denotes version N of V1, and ii) V2 denotes version N−1 of V1 corresponding to asynchronous replication cycle N−1;

selecting a second snapshot object of the target pool; and finalizing the second snapshot object, including associating the second snapshot object with a replica of the shadow snapshot after performing said writing.

9. The computer-implemented method of claim 8, further comprising:

refreshing V2 using the second snapshot object including updating V2 to denote version N of V1.

10. The computer-implemented method of claim 9, wherein the shadow snapshot is associated with a first extent E0 denoting version N of V1, the second snapshot object is associated with a second extent E1, and wherein said finalizing the second snapshot object includes:

updating E1 of the second snapshot object using E0 so that E1 denotes version N of V1.

11. The computer-implemented method of claim 10, wherein prior to said refreshing, i) V2 is associated with a third extent E2 denoting version N−1 of V1, and ii) the second snapshot object is associated with E1 denoting version N of V1.

12. The computer-implemented method of claim 11, wherein said refreshing includes:

associating V2 with E1 rather than E2 so that V2 denotes version N of V1; and associating the second snapshot object with E1 rather than E2 so that the second snapshot object denotes version N−1 of V1.

13. The computer-implemented method of claim 12, further comprising:

after said refreshing, performing third processing to prepare the second snapshot object for reuse in connection with refreshing V2 with another updated version of V1 after completion of another corresponding asynchronous replication cycle.

14. The computer-implemented method of claim 13, wherein said third processing includes:

cleaning E1 associated with the second snapshot object, including deleting any mapping information of MD pages associated with the E1.

15. The computer-implemented method of claim 14, further comprising:

after completing the third processing whereby the second snapshot object is prepared for reuse, marking the second object as available for reuse in connection with refreshing V2 with updated version of V1 corresponding to a subsequent asynchronous replication cycle.

16. The computer-implemented method of claim 6, wherein the target pool includes a first set of snapshot objects each assigned an integer identifier (ID) denoting an integer from a sequence of consecutive integers, and wherein said selecting the second snapshot object from the target pool includes:

rotating through the second set of snapshot objects in accordance with their respective assigned integer IDs to locate an available snapshot object of the second set.

17. The computer-implemented method of claim 1, wherein the source pool includes a first set of snapshot objects each assigned an integer identifier (ID) denoting an integer from a sequence of consecutive integers, and wherein said selecting the second snapshot object from the source pool includes:

rotating through the first set of snapshot objects in accordance with their respective assigned integer IDs to locate an available snapshot object of the first set.

18. A system comprising:

one or more processors; and one or more memories comprising code stored thereon that, when executed, performs a method comprising:

receiving a request to enable a low RPO (recovery point objective) replication mode for a volume pair (V1, V2) configured for asynchronous replication, wherein V1 is a source volume of a source system and V2 is a target volume of a target system;

in response to receiving the request, creating a source pool of snapshot objects for use in connection with taking replication related snapshots of V1;

taking a plurality of replication related snapshots of V1, wherein for each of the plurality of replication related snapshots, said taking includes:

selecting a snapshot object from the source pool; and finalizing the snapshot object for use with said each replication related snapshot, including creating a replica of V1 and associating the replica of V1 with the snapshot object selected from the source pool;

completing a plurality of asynchronous replication cycles each denoting a set of data changes to V1 determined with respect to two successive replication related snapshots of V1; and for each of the plurality of asynchronous replication cycles, copying a set of data changes of said each asynchronous replication cycle from the source system to the target system and applying the set of data changes to V2.

19. One or more non-transitory computer-readable media comprising code stored thereon that, when executed, performs a method comprising:

receiving a request to enable a low RPO (recovery point objective) replication mode for a volume pair (V1, V2) configured for asynchronous replication, wherein V1 is a source volume of a source system and V2 is a target volume of a target system;

in response to receiving the request, creating a source pool of snapshot objects for use in connection with taking replication related snapshots of V1;

taking a plurality of replication related snapshots of V1, wherein for each of the plurality of replication related snapshots, said taking includes:

selecting a snapshot object from the source pool; and finalizing the snapshot object for use with said each replication related snapshot, including creating a replica of V1 and associating the replica of V1 with the snapshot object selected from the source pool;

completing a plurality of asynchronous replication cycles each denoting a set of data changes to V1 determined with respect to two successive replication related snapshots of V1; and for each of the plurality of asynchronous replication cycles, copying a set of data changes of said each asynchronous replication cycle from the source system to the target system and applying the set of data changes to V2.

\*  \*  \*  \*  \*